United States Patent [19]

Sakano et al.

[11] Patent Number: 5,798,844
[45] Date of Patent: Aug. 25, 1998

[54] DUPLICATOR HAVING FUNCTION CONCERNING SPECIFIC MARK PUT ON RECORDING SHEET AND IMAGE FORMING APPARATUS HAVING FUNCTION OF PROCESSING CONFIDENTIAL DOCUMENTS

[75] Inventors: Yukio Sakano, Fuchu; Yasuhiro Tabata, Kawasaki; Nobufumi Nomura, Chiba, all of Japan

[73] Assignee: Ricoh Company, Ltd., Tokyo, Japan

[21] Appl. No.: 275,746

[22] Filed: Jul. 20, 1994

[30] Foreign Application Priority Data

| Jul. 23, 1993 | [JP] | Japan | 5-182787 |
| Jul. 23, 1993 | [JP] | Japan | 5-182788 |
| Jul. 23, 1993 | [JP] | Japan | 5-182789 |
| Oct. 7, 1993 | [JP] | Japan | 5-251900 |
| Feb. 1, 1994 | [JP] | Japan | 6-010552 |

[51] Int. Cl.⁶ .................. H04N 1/00; H04N 1/32
[52] U.S. Cl. .................. 358/405; 358/468; 358/401
[58] Field of Search .................. 358/405, 403, 358/401, 407, 468, 404, 444, 450, 453, 501, 524, 441, 434, 296, 540, 526, 538; 395/113, 112; 380/18, 51, 55; 382/112

[56] References Cited

U.S. PATENT DOCUMENTS

| 4,243,734 | 1/1981 | Dillon | 430/8 |
| 4,265,469 | 5/1981 | Mowry, Jr. et al. | 355/133 |
| 4,586,811 | 5/1986 | Kubo et al. | 399/366 |
| 4,640,601 | 2/1987 | Deguchi et al. | 399/6 |
| 4,739,377 | 4/1988 | Allen | 355/133 |
| 5,155,601 | 10/1992 | Toyama | 358/407 |
| 5,216,724 | 6/1993 | Suzuki et al. | 382/135 |
| 5,293,253 | 3/1994 | Kida et al. | 358/404 |
| 5,351,136 | 9/1994 | Wu et al. | 358/440 |
| 5,363,202 | 11/1994 | Udagawa et al. | 358/401 |
| 5,386,303 | 1/1995 | Kihara | 358/405 |
| 5,444,518 | 8/1995 | Hashiguchi et al. | 358/501 |
| 5,465,160 | 11/1995 | Kamo et al. | 358/450 |
| 5,481,377 | 1/1996 | Udagawa et al. | 358/401 |
| 5,631,723 | 5/1997 | Arimoto | 358/501 |
| 5,646,749 | 7/1997 | Omi et al. | 358/501 |

FOREIGN PATENT DOCUMENTS

| 33 47 932 | 11/1983 | Germany . |
| 34 10 775 | 9/1985 | Germany . |
| 39 05 155 | 9/1990 | Germany . |
| 32322 | of 1979 | Japan . |
| 300285 | of 1989 | Japan . |
| 2 155 860 | 10/1985 | United Kingdom . |
| WO 85/01128 | 3/1985 | WIPO . |
| WO 85/01129 | 3/1985 | WIPO . |

*Primary Examiner*—Edward L. Coles
*Assistant Examiner*—Fan Lee
*Attorney, Agent, or Firm*—McDermott, Will & Emery

[57] ABSTRACT

A specific mark adding unit adds a specific mark to a read-in image and a specific mark detecting unit detects the specific mark present in a read-in image. Further, a control unit changes a mode in which a read-in image is duplicated from an ordinary duplicating mode into a specific duplicating mode, the mode changing being made if the specific mark detecting unit has detected the specific mark present in the read-in image. The specific mode comprises a mode in which the read-in image is invalidated in data before being used in the duplicating operation. A unit is further provided causing the specific-mark adding function of the specific mark adding unit either to be activated or not to be activated. A unit is further provided causing the mode changing function of the mode changing unit either to be activated or not to be activated.

15 Claims, 35 Drawing Sheets

FIG.25A    FIG.25B
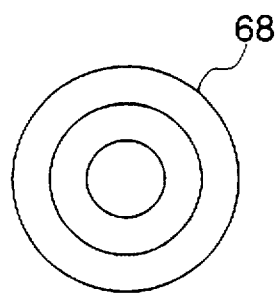
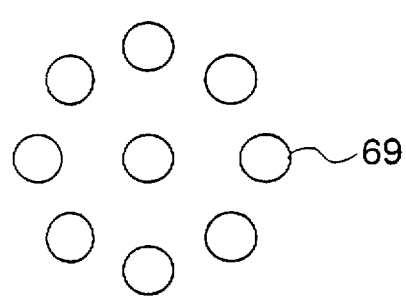
FIG.26A  FIG.26B  FIG.26C  FIG.26D
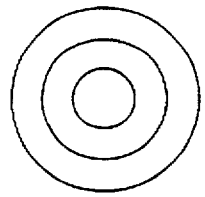
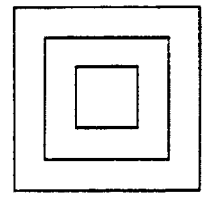
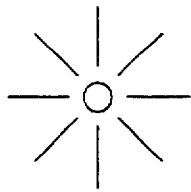
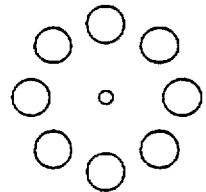

FIG.28A
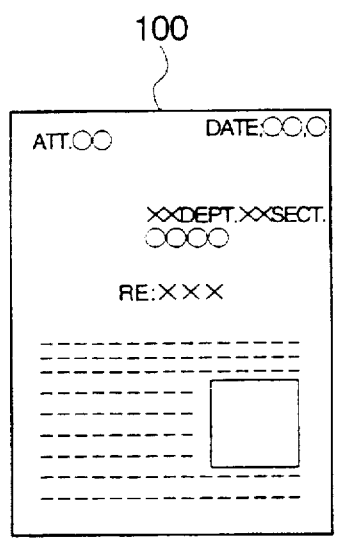
FIG.28B
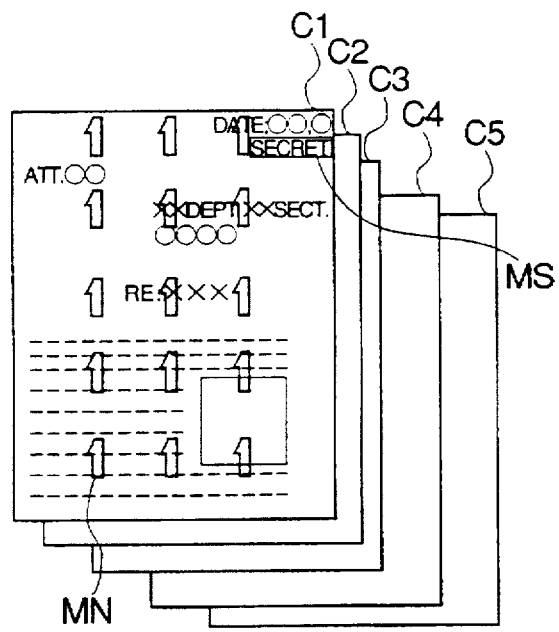
FIG.28C
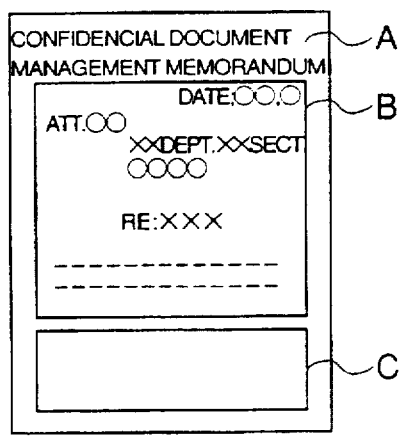
FIG.28D
| SECRET NUMBER | DESTINATION |
| --- | --- |
| 01 | |
| 02 | |
| 03 | |
| 04 | |
| 05 | |

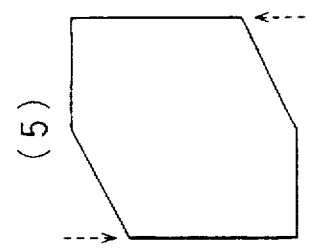
FIG.44E (5)
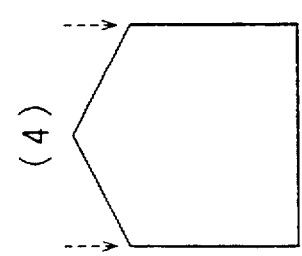
FIG.44D (4)
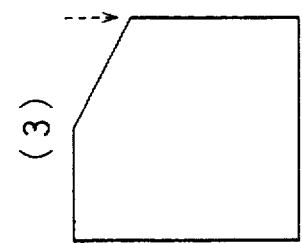
FIG.44C (3)
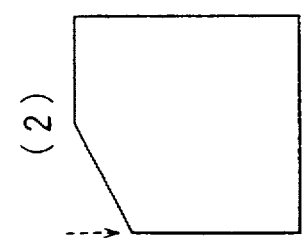
FIG.44B (2)
FIG.44A A→ (1)
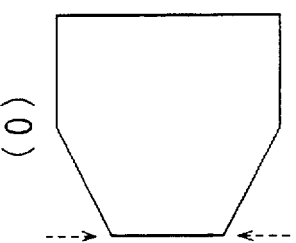
FIG.44J (0)
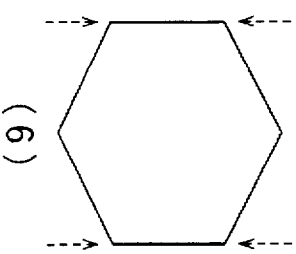
FIG.44I (9)
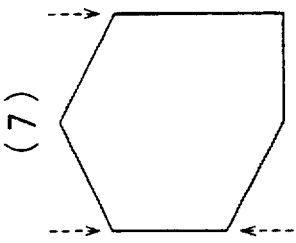
FIG.44H (8)
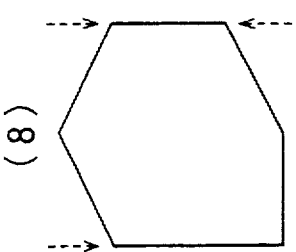
FIG.44G (7)
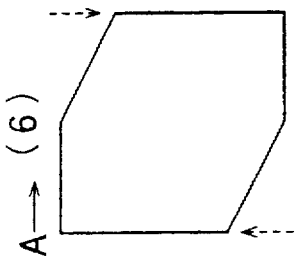
FIG.44F A→ (6)

FIG.45A (1) 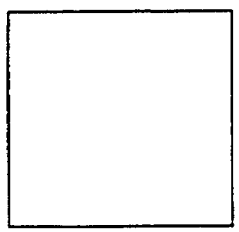
FIG.45B (2) 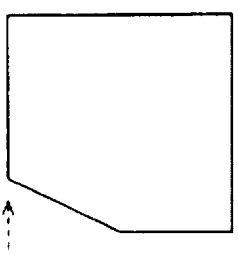
FIG.45C (3) 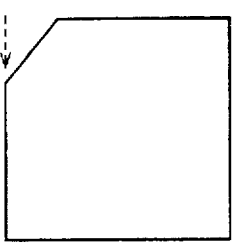
FIG.45D (4) 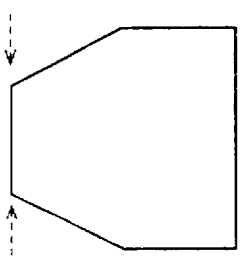
FIG.45E (5) 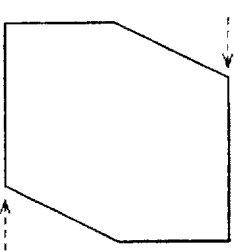
FIG.45F (6) 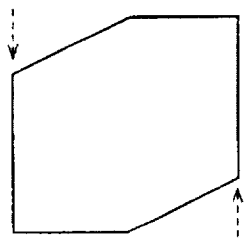
FIG.45G (7) 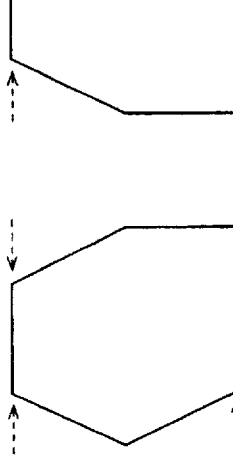
FIG.45H (8) 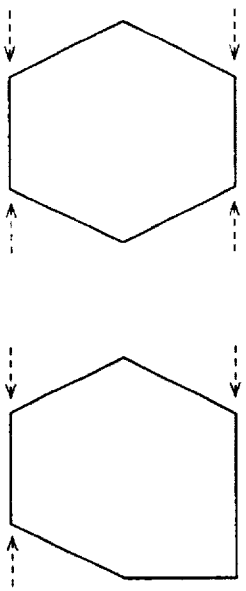
FIG.45I (9) 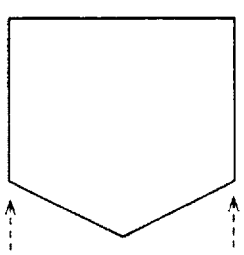
FIG.45J (0) 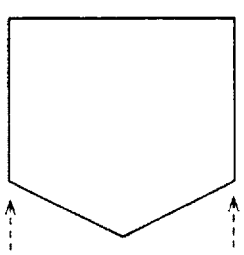

FIG.46A (1) 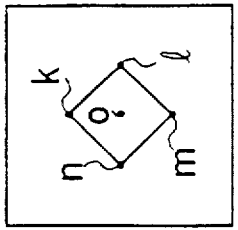
FIG.46B (2) 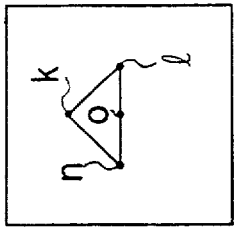
FIG.46C (3) 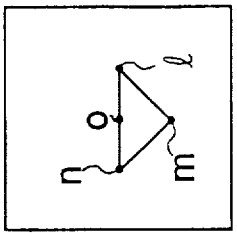
FIG.46D (4) 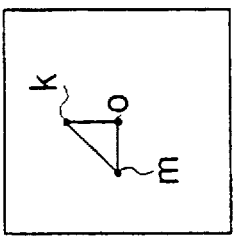
FIG.46E (5) 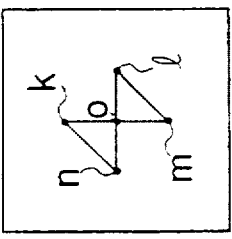
FIG.46F (6) 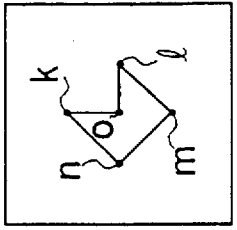
FIG.46G (7) 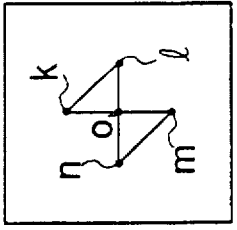
FIG.46H (8) 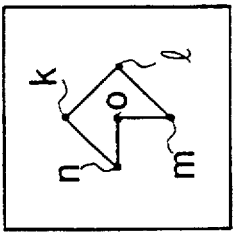
FIG.46I (9) 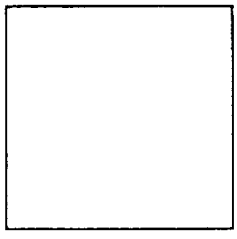
FIG.46J (0) 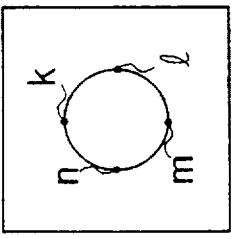

FIG.47A (1)
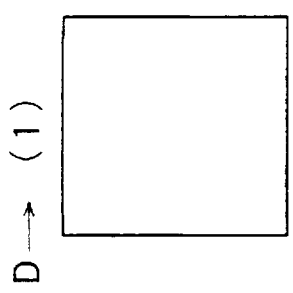
FIG.47B (2)
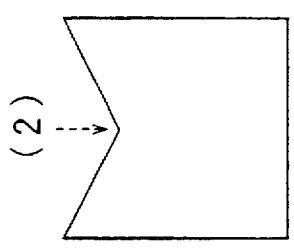
FIG.47C (3)
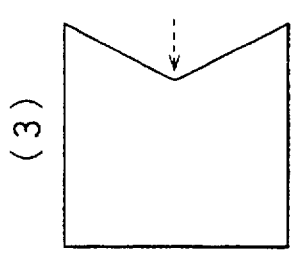
FIG.47D (4)
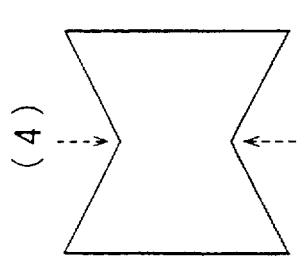
FIG.47E (5)
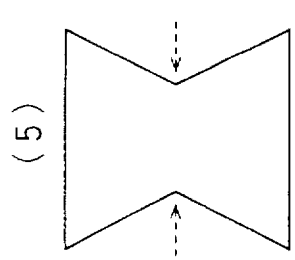
FIG.47F (6)
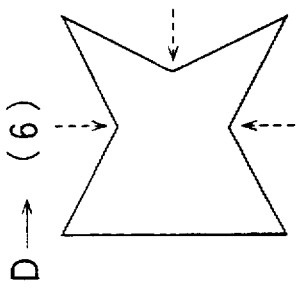
FIG.47G (7)
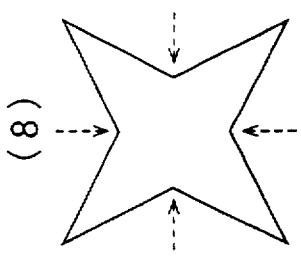
FIG.47H (8)
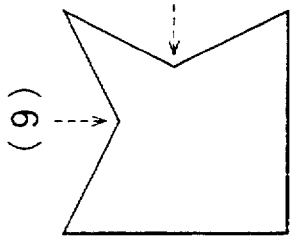
FIG.47I (9)
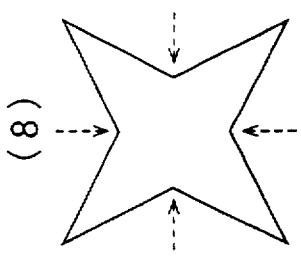
FIG.47J (0)
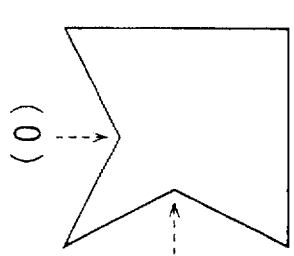

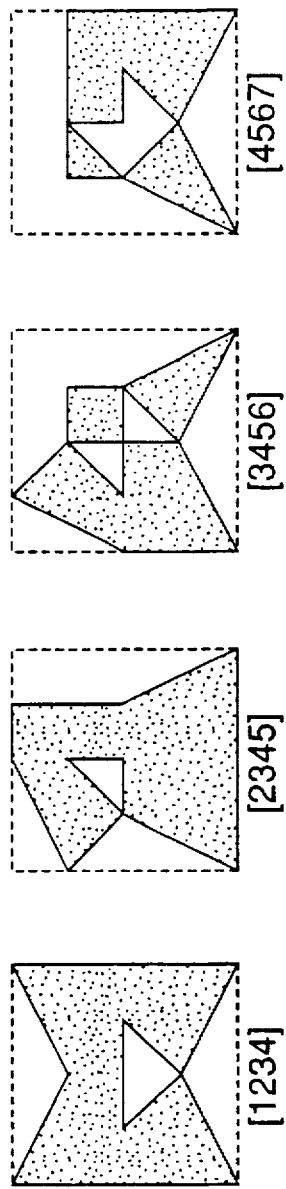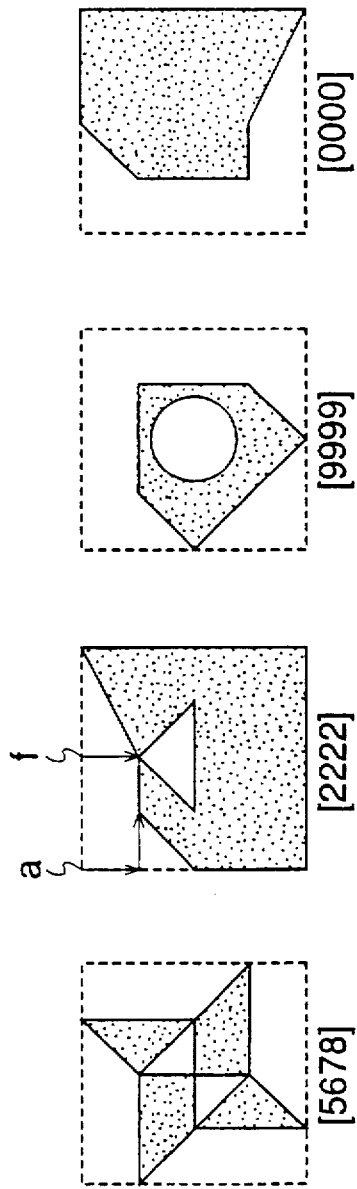

5,798,844

DUPLICATOR HAVING FUNCTION CONCERNING SPECIFIC MARK PUT ON RECORDING SHEET AND IMAGE FORMING APPARATUS HAVING FUNCTION OF PROCESSING CONFIDENTIAL DOCUMENTS

BACKGROUND OF THE INVENTION

1. Field of the Invention

The present invention relates to a duplicator for adding a specific mark to a read-in image, for detecting such a specific mark included in a read-in image so as to change a manner in which the read-in image is duplicated if the read-in image is detected to include the specific image. The present invention further relates to an image forming apparatus, having a function of image duplicating and a function of confidential document management.

2. Related Art

As a result of image forming apparatus's coming into wide use having a function of image duplication, such as a duplicator, image duplicating operations are everyday affairs. In such a situation, leaking of secrets due to duplication is a problem.

In order to prevent a confidential document from being duplicated by an unauthorized person, it is possible to previously store information representing a secrecy notice mark such as the expression SECRET in an image forming apparatus. The apparatus checks whether a mark such as the thus stored secrecy notice mark is present in a read-in image when the apparatus has read the read-in image in. Then, if such a mark is detected, the apparatus compares the detected mark with the previously stored secrecy notice mark. The apparatus prevents the read-in image from being duplicated if the detected mark corresponds to the stored secrecy notice mark. However, there is a problem such that there are various types of secrecy notice marks such as that mentioned above which have been generally used. Thus, storing of all the types of secret marks in an image forming apparatus is a troublesome task.

In general, a duplicator reads an original image in and the thus read-in image is duplicated in a sheet at a position approximately the same as the position at which the original image has been read in or at a position quite different from the position at which the original image has been read in. Japanese Laid-Open Patent Application No.54-32322 discloses a duplicator for determining that a read-in image is an image of a secret document if a specific pattern is detected in the read-in image. Thus, the duplicator stops the duplication operation thereof. However, putting such a specific pattern on a general confidential document is a troublesome task. Further, detecting of such a specific pattern having an arbitrary shape and/or characters may be difficult. It is also difficult to precisely distinguish the specific pattern from resembling patterns.

Japanese Laid-Open Patent Application No.1-300285 discloses a duplicator for repeating a specific-pattern reading operation. The duplicator controls the duplication operation using a result of the repeated specific-pattern reading operation. Such repeated reading operations require a considerable time period which degrades the efficiency of using the duplicator.

In general, a duplicator reads an original image by scanning the original image in a sub-scan direction. Then a size changing manipulation may be arbitrarily performed on the signal obtained as a result of the above read-in operation. Then, the signal is used to print the corresponding image on a sheet. If a specific-pattern reading operation is carried out in a duplicator using the above image processing steps, a signal which has already undergone a size changing manipulation in at least a main-scan direction and the sub-scan direction is used to detect a specific pattern. In this case, since the signal used has specific-pattern information which has already undergone the size changing manipulation, it is difficult to precisely detect the specific pattern from the signal.

SUMMARY OF THE INVENTION

An object of the present invention is to provide a duplicator for easily producing a document having a specific pattern (mark), such as mentioned above, formed therein.

In order to achieve the above object, a duplicator according to the present invention comprises:

specific mark adding means for adding a specific mark to a read-in image;

specific mark detecting means for detecting the specific mark present in a read-in image; and control means for changing a manner in which a read-in image is duplicated from an ordinary duplicating manner into a specific duplicating manner, the manner changing being made if said specific mark detecting means has detected the specific mark present in said read-in image.

It is preferable that the above duplicator has an ON/OFF function of switching on/off the above function of the specific mark adding means. Thus, an operator can control the duplicator through the ON/OFF function so that a specific mark is formed only on a copy of a specific document.

Further, it is also preferable that the above duplicator has another ON/OFF function of switching on/off the above function of the control means. Thus, an operator can control the duplicator through the ON/OFF function so that a document having the specific mark formed thereon can be specially duplicated.

Another object of the present invention is to provide a duplicator for producing a document having a specific mark, such as mentioned above, which mark can be easily and precisely detected.

In order to achieve the above object, a duplicator according to the present invention comprises specific mark adding means for adding a specific mark to a read-in image, said specific mark comprising one which has a characteristic through which said specific mark can be easily detected and also can be precisely distinguished from resembling things.

Another object of the present invention is to provide a duplicator to easily and precisely detect such a specific mark.

In order to achieve the above object, a duplicator according to the present invention comprises:

size-changing means for changing the size of a read-in image in at least one of a main-scan direction and sub-scan direction;

specific mark detecting means for detecting a specific mark present in a read-in image, said specific mark detecting means using data representing said read-in image, which data has not yet undergone the size changing operation by means of said size-changing means in at least one of said main-scan and sub-scan direction; and manner changing means for changing a manner in which a read-in image is duplicated from an ordinary duplicating manner into a specific duplicating manner, the manner changing being made if said specific mark detecting means has detected the specific mark present in said read-in image.

Another duplicator comprises:

size-changing means for changing the size of a read-in image in at least one of a main-scan direction and sub-scan direction;

specific mark detecting means for detecting a specific mark present in a read-in image, said specific mark detecting means comprising characteristic extracting means for extracting a characteristic of data representing said read-in image, characteristic generating means for generating a characteristic of said specific mark and determining means for determining whether said read-in image includes said specific mark; and manner changing means for changing a manner in which a read-in image is duplicated from an ordinary duplicating manner into a specific duplicating manner, the manner changing being made if said specific mark detecting means has detected the specific mark present in said read-in image.

Another object of the present invention is to provide an image forming apparatus having a novel confidential document management function of changing an original confidential document into a document which can be prevented from being duplicated by an unauthorized person. Thus the image forming apparatus has a novel confidential document management function.

Another object of the present invention is to provide an image forming apparatus having a novel confidential document management function of allowing duplicating of the thus unduplicatable document if predetermined authorizing information is input.

Another object of the present invention is to provide an image forming apparatus having a novel confidential document management function of printing a confidential document management sheet containing information such as information associated with a duplicated confidential document, the number of copies produced by duplicating the confidential document.

Another object of the present invention is to provide an image forming apparatus having a novel confidential document management function of using a prevent/authorize figure which prevents a document, which has the prevent/authorize figure formed in the document, from being duplicated by an unauthorized person. The duplication may be authorized by inputting the proper authorizing information. It can be prevented that the prevent/authorize figure is further formed in the document which results from the duplication which has been allowed as a result of the proper authorizing information being input. If the prevent/left figure has been repeatedly formed in the document, the document may be difficult to read.

In order to achieve the above objects, an image forming apparatus according to the present invention comprises:

mode selecting means for selecting a confidential document duplicating mode;

secrecy notice mark adding means for adding a secrecy notice mark in a read-in image in said secret document duplicating mode;

secrecy notice mark detecting means for checking whether said secrecy notice mark is present in a read-in image; and control means for preventing a read-in image from being duplicated if said secrecy notice mark detecting means has detected said secrecy notice mark.

The above secrecy notice mark detecting means detects the secret mark any time the image forming apparatus reads in an image even in a mode in which the thus read-in image is not duplicated.

It is preferable that said secrecy notice mark further adds a serial number to said read-in image when said read-in image is duplicated as a result of the lifting of the prevention by said controlling means, said serial number corresponding to a duplication repetition order in which said read-in image is duplicated. Thus, for example, the serial number, numeral '1' is printed together with the read-in image on the copy if the copy is produced as a result of first duplicating the read-in image. Similarly, the numeral '2' is printed together with the read-in image on the copy if the copy is produced as a result of second duplicating the read-in image.

It is preferable that the authorizing information is added by said secrecy notice mark adding means to said read-in image so that the thus added authorizing information is converted into a form in which said added authorizing information cannot be read by a simple view. Such a form in which said added authorizing information cannot be read by a simple view is such that the form of authorizing information obtained as a result of coding the authorizing information or that obtained as a result of changing a hardly-to-be-clearly-viewed color of the information. Thus, the formation of the authorizing information present in the resulting copy cannot be read by an unauthorized person but can be read by the person who has input the authorizing information. Further, it is also possible to form the secrecy notice information including the authorizing information such that a part of the mark is included in a form. The form of the mark part, such as expressions SECRET, STRICT SECRECY and COMPANY-CONFIDENTIAL, which can be formed in stamps, can be read by a simple view. It is also possible to enable selection of arbitrary one from among stamps SECRET, STRICT SECRECY, COMPANY-CONFIDENTIAL and so forth.

Another image forming apparatus according to the present invention comprises:

confidential document duplication mode selecting means for selecting a confidential document duplication mode;

prevent/authorize figure information, representing a prevent/authorize figure, inputting means for inputting prevent/authorize figure information;

converting means for converting said prevent/authorize figure information into prevent/authorize figure signal;

printing means for, in said confidential document duplication mode, adding the data representing a read-in image and said prevent/authorize figure signal together and printing said read-in image having said prevent/authorize figure together represented by the signal resulting from the addition; and wherein:

the prevent/authorize figure has a function of preventing the printed image including said prevent/authorize figure from being further duplicated; and said prevent/authorize figure information has a function of lifting the prevention of the duplication.

The above prevent/authorize figure information may consist of a series of symbols such as an alphanumeric code. If an operator inputs such prevent/authorize figure information to the image forming apparatus, the image forming apparatus converts, in a predetermined manner, the thus input information into the prevent/authorize figure. A general person cannot obtain the original prevent/authorize figure by viewing the figure.

It is assumed, for example, that the prevent/authorize figure information consists of four alphanumeric symbols such as 'ABC', 'WXYZ', '9010', '6787', 'AP80' or the like. The prevent/authorize figure may comprise a polygon with or without another internal polygon located within the first polygon, for example.

The shapes of such polygons are determined by the above prevent/authorize figure information. It is also possible to form the above polygon-combination prevent/authorize figure such that halftone dots are put within the outer polygon, or within the external polygon and outside the internal polygon.

One or a plurality of such prevent/authorize figures may be formed in the single sheet of copy. However, it is preferable to make the density of the prevent/authorize figure thinner in the copy so that the contents of the document other than the lift/prevent figure can be easily read.

Another image forming apparatus according to the present invention comprises:

prevent/authorize figure detecting means for detecting a prevent/authorize figure present in a read-in image; and control means for preventing the read-in image from being duplicated, which read-in image has been detected to include the prevent/authorize figure; and wherein prevent/authorize figure information representing the prevent/authorize figure has a function of allowing the duplication.

Another image forming apparatus according to the present invention comprises:

prevent/authorize figure detecting means for detecting a prevent/authorize figure present in a read-in image;

inverse converting means for converting the prevent/authorize figure, if it has been thus detected, into the prevent/authorize information representing said prevent/authorize figure;

authorizing information inputting means for inputting authorizing information; and determining means for determining whether or not the thus input authorizing information corresponds to said prevent/authorize figure information; and control means for preventing said read-in image from being duplicated if said determining means has determined that said authorizing information does not correspond to said prevent/authorize figure information and allowing said read-in image to be duplicated if said determining means has determined that said authorizing information corresponds to said prevent/authorize figure information.

Another image forming apparatus according to the present invention comprises:

confidential document duplication mode selecting means for selecting a confidential document duplication mode;

prevent/authorize figure information, representing a prevent/authorize figure, inputting means for inputting prevent/authorize figure information;

converting means for converting said prevent/authorize figure information into the prevent/authorize figure signal;

printing means for, in said confidential document duplication mode, adding the data representing a read-in image and said prevent/authorize figure signal together and printing said read-in image having said prevent/authorize figure together represented by the signal resulting from the addition; and prevent/authorize figure detecting means for detecting a prevent/authorize figure, such as the prevent/authorize figure represented by said prevent/authorize figure information, present in a read-in image;

inverse converting means for converting said prevent/authorize figure, which has been thus detected, into the prevent/authorize information representing said prevent/authorize figure;

determining means for determining whether or not authorizing information, which may be input through said prevent/authorize figure information inputting means, corresponds to said prevent/authorize figure information representing the prevent/authorize figure information detected in said read-in image; and control means for preventing said read-in image from being duplicated if said determining means has determined that said authorizing information does not correspond to said prevent/authorize figure information and allowing said read-in image to be duplicated if said determining means has determined that said authorizing information corresponds to said prevent/authorize figure information, said control means preventing the output of said converting means from being printed together with said read-in image if said control means thus allows the duplication of said read-in image.

The above control means may be made of a CPU or a computer.

How such confidential documents are handled will now be described. First, a single document is produced and the document is duplicated on demand so as to produced the demanded copies. The first produced document will be referred to as an original confidential document hereinafter. In the present invention, the above confidential document duplication mode is a mode in which an original confidential document is duplicated.

The above image forming apparatus according to the present invention produces copies so that each of the copies automatically has a secrecy notice mark formed therein. The thus obtained demanded number of copies are secondary confidential documents. However, if the original confidential document is destroyed or is stored in strict secrecy after taking the copies, secrecy leakage caused by directly duplicating the original confidential document can be completely prevented. If so, it is sufficient to consider the above secondary confidential documents. That is, a secrecy leakage caused by duplication of the secondary confidential documents can be effectively prevented by properly managing the secondary confidential documents so as to prevent an unauthorized person from taking copies of the secondary confidential documents.

Since the above image forming apparatus according to the present invention automatically puts the secrecy notice marks on the copies produced in the confidential document duplication mode, the resulting copies become effectively confidential documents. The effectively confidential documents are prevented from being duplicated as a result of the secrecy notice marks being detected.

There is a case where an authorized person intends to take a copy of such an effectively confidential document. In order to handle such a case suitably, the image forming apparatus according to the present invention has a function of lifting such a duplication preventing situation under a certain condition. The certain condition is a condition in which authorizing information such as that described above has been input to the apparatus. This function can come into effect if only an authorized person has such authorizing information. Such an authorized person is a person having a certain authority or a manager of the apparatus, for example. Such authorizing information is a personal code number, for example.

The image forming apparatus according to the present invention carries out the secrecy notice mark detection not only in the ordinary duplication mode but also in the confidential document duplication mode. Since an original confidential document has no such a secrecy notice mark, duplication of the document is not prevented. However, if an operator sets an effectively confidential document such as described above on the image forming apparatus so as to duplicate it in the confidential document duplication mode, the secrecy notice mark contained in the effectively confidential document is detected so that the document is prevented from being duplicated in the apparatus.

A prevent/authorize figure such as described above put on a copy in the image forming apparatus according to the present invention has the corresponding prevent/authorize figure information. Thus, a person who has carried out the duplication can find the corresponding prevent/authorize figure information when the person views the figure. However, an unauthorized person cannot find the corresponding prevent/authorize figure information using the figure. If an unauthorized person can easily find the corresponding prevent/authorize figure information using the figure, the general person may use the thus found information as the corresponding authorizing information to duplicate the relevant effectively confidential document for the purpose of secrecy leakage.

The image forming apparatus according to the present invention having the function of producing such an effectively confidential document may not have a function of preventing such an effectively confidential document from being duplicated by an unauthorized person. If the apparatus has the first function but does not have the second function, the apparatus may be used as an apparatus for producing such effectively confidential documents. In this case, use of the apparatus should be strictly controlled so as to prevent secrecy leakage due to the duplication using the apparatus.

The image forming apparatus according to the present invention having the function of obtaining prevent/authorize figures such as described above may have a memory having a considerable capacity to previously store a large number of figures as the candidates of the prevent/authorize figures. The capacity of the memory can be reduced or eliminated by using a method in which the prevent/authorize figures are produced each time using the corresponding prevent/authorize figures as production instructions and are obtained as a result of selecting proper ones from among candidates stored in the memory.

The image forming apparatus according to the present invention having the function of preventing confidential documents from being duplicated by an unauthorized person may not have the function of including such prevent/authorize figures. The apparatuses, each having the first function but not the second function, may be used as apparatuses which may be used by general persons within a certain area such as an area within a certain company, an area within a certain office or the like. In this case, no other image forming apparatus is provided in the certain area. Thus, effectively confidential documents can be completely prevented from being duplicated by an unauthorized person within the certain area.

The image forming apparatus according to the present invention preferably has a function of counting the number of times an operator repeatedly inputs prevent/authorize figure information in order to duplicate an effectively confidential document. This function is effective for a situation which will now be described. If a person who attempts to duplicate an effectively confidential document for the purpose of secrecy leakage, the person may try random codes to be used as the relevant authorizing information. Thus, the person inputs random codes many times to the image forming apparatus. In order to appropriately respond to such a situation, the image forming apparatus according to the present invention counts the number of times the operator inputs improper codes into the apparatus. Then, if the thus counted number of times has reached a predetermined number, three times for example, the apparatus stops (inactivates) the duplication function of the apparatus and no predetermined person can activate the thus stopped duplication function of the apparatus. It is possible for the apparatus to have a function of entering into a salesman calling state when the apparatus has inactivated the duplication function as mentioned above. The salesman calling state is a state in which the term CALL SALESMAN is indicated on a display provided on the apparatus.

The image forming apparatus according to the present invention having the above function of preventing the output of the converting means from being printed together with a read-in image if the duplication of the read-in image is allowed appropriately, is effective as follows. The effectively confidential document has the prevent/authorize figure therein as described above. The apparatus may put the prevent/authorize figure again on the relevant document image which already has the figure therein when the duplication of the document image has been allowed due to the proper authorizing information having been input. If the apparatus puts the figure on the image, the resulting printed image has the doubled prevent/authorize figures formed therein. The doubled figures may prevent the printed image from being easily read. Thus, the apparatus prevents the prevent/authorize figure from being put on the image if the duplication is allowed due to the proper authorizing information having been input.

Thus, it is preferable to form such a prevent/authorize figure in a coded form preventing general person's reading.

Other objects and further features of the present invention will become more apparent from the following detailed description when read in conjunction with the accompanying drawings.

BRIEF DESCRIPTION OF THE DRAWINGS

FIGS. 22, 23A, 23B, 24, 25A, 25B, 26A, 26B, 26C and 26D illustrate shapes of duplication preventing marks used in duplicators in the thirteenth, fourteenth, fifteenth, sixteenth, seventeenth, eighteenth, nineteenth and twentieth embodiments of the present invention;

FIGS. 28A and 28B illustrate an original confidential document and sheets obtained as a result of duplicating the above confidential document in the above duplicator in the twenty-first embodiment;

FIGS. 28C and 28D illustrate a confidential document management sheet obtained from the duplicator in the twenty-first embodiment;

FIGS. 43, 44A through 44J, 45A through 45J, 46A through 46J, 47A through 47J and 48A through 48H illustrate prevent/authorize figures production in the duplicator in the twenty-fifth embodiment.

DESCRIPTION OF THE PREFERRED EMBODIMENTS

Figure 2:
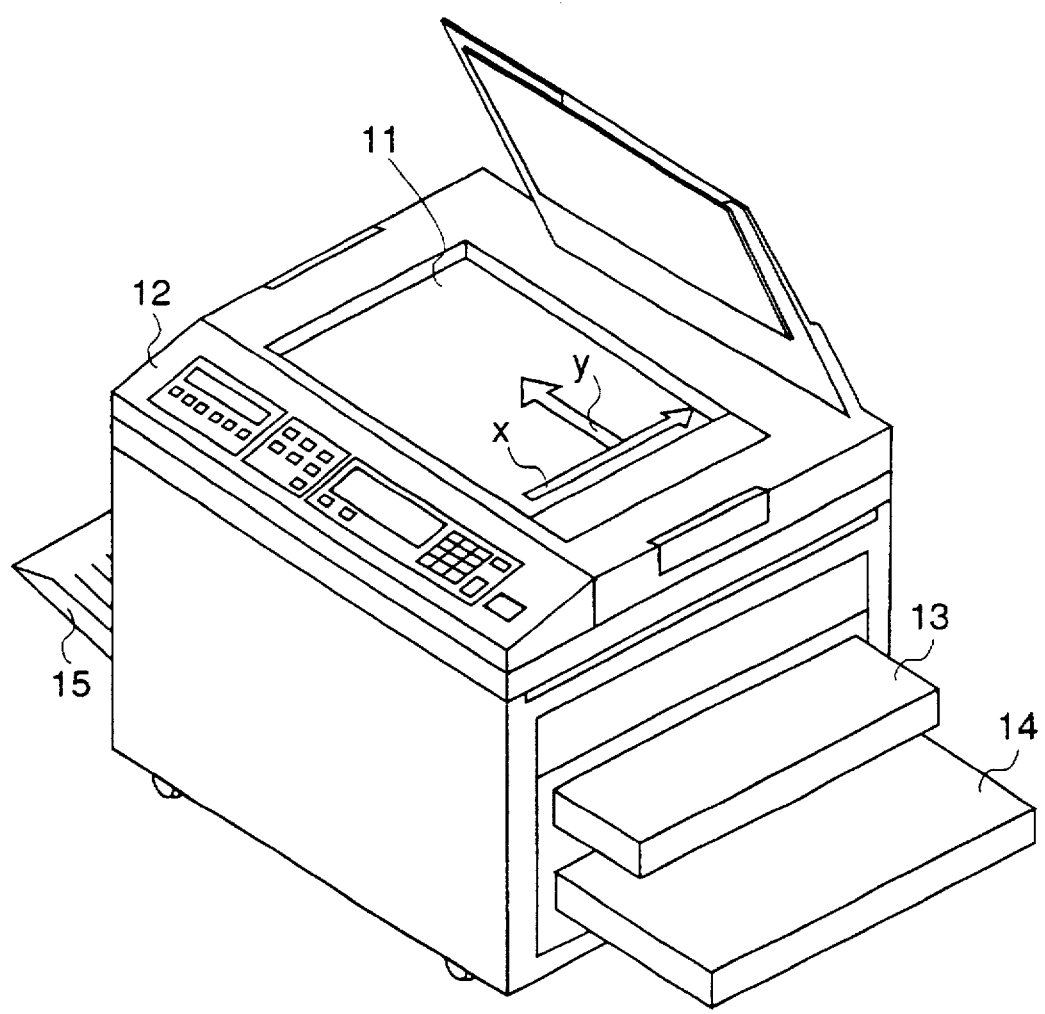
FIG. 2 shows a perspective external appearance of each of the above duplicators and a duplicator in a ninth embodiment of the present invention.

With reference to FIG. 2, general functions of a duplicator in a first embodiment of an image forming apparatus according to the present invention will now be described. An original sheet in a state where a surface to be read-in faces downward is set on an original sheet table 11. An operator inputs appropriate duplication instructions into the duplicator through an operation unit 12 which displays various matters regarding duplication operations performed in the duplicator. The image present on the above surface of the original sheet is read by a reading unit provided in the duplicator, which reading unit thus supplies the corresponding image data. An image processing unit provided in the duplicator performs various image processes on the image data, the image processing unit thus supplying the processed image data. A writing unit provided in the duplicator uses the above image data so as to record the is corresponding reproduced image on a recording sheet selectively provided from either sheet supply cassette 13 or 14. The duplicator ejects the sheet having the reproduced image formed thereon as a copy to a tray 15.

The above reading unit reads an image present on a sheet's surface facing the original sheet table 11 with scanning the image in a main scan direction x and in a sub-scan direction y shown in FIG. 2. The main scan directional scanning is performed electronically through a CCD line sensor and the sub-scan directional scanning is performed through relative position variation between the image and the CCD line sensor. The image reading by means of the reading unit and the image writing by means of the writing unit are performed with quantization of an image into pixels. The resolution in the main scanning and sub-scanning is 400 dpi (dot per inch).

Figure 3:
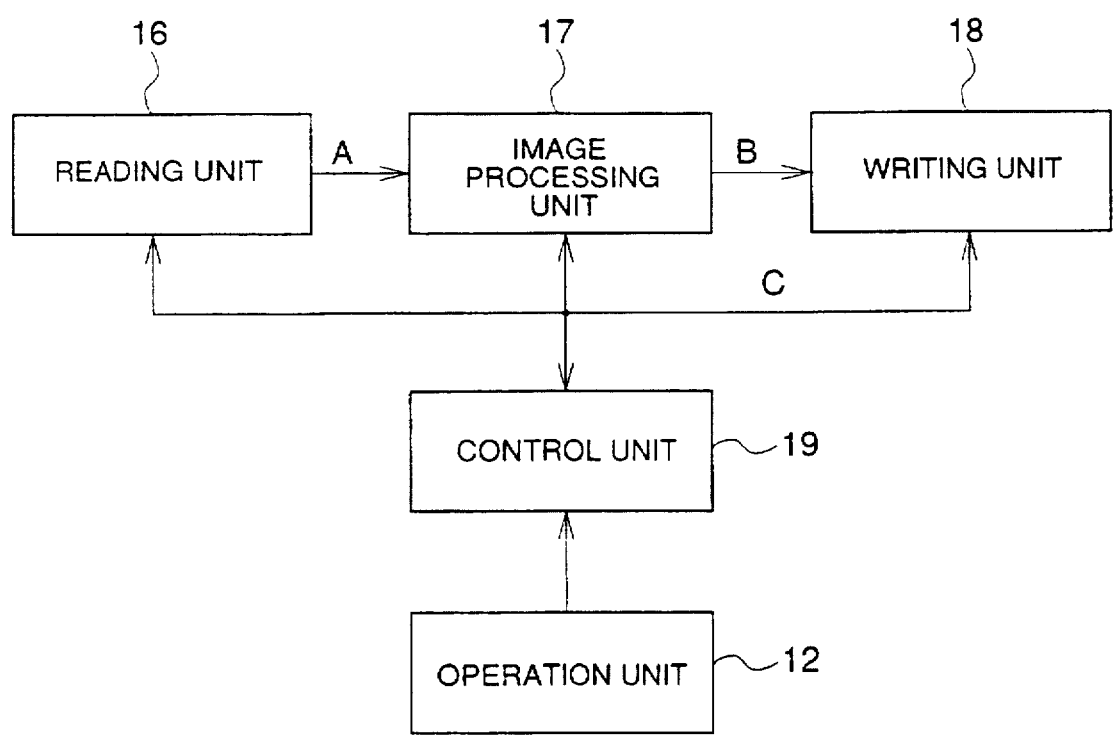
FIG. 3 shows a block diagram illustrating image data flow starting from original image reading and ending at reproducing of the corresponding image and image data control signal flow, in the duplicator in each of the above first, second, third, fourth, fifth, sixth, seventh, eighth, ninth, tenth, eleventh, twelfth, thirteenth, fourteenth, fifteenth, sixteenth, seventeenth, eighteenth, nineteenth and twentieth embodiments.

With reference to FIG. 3, an image data flow starting from the image reading and ending at the reproduced image recording and a corresponding control signal flow will now be described. The reading unit 16 reads an image formed on an original sheet as described above through the CCD line sensor which thus supplies the relevant image signal. The reading unit 16 appropriately processes the image signal so that amplification, A/D-conversion, shading-correction and so forth may be performed, the reading unit 16 thus supplying the image data A shown in the figure. An image processing unit 17 appropriately processes the image data A so that filtering processing, size changing processing, tone processing and so forth may be performed, the image processing unit 17 thus supplying the image data B.

The writing unit 18 uses a laser printer in which the image data B is used to modulate a laser beam, a photosensitive body is electrified and exposed to the laser beam so that a corresponding electrostatic latent image is formed on the photosensitive body. The electrostatic latent image is then developed and transferred to a recording sheet, the image transferred to the sheet being then fixed. Thus, the writing unit 18 records the thus reproduced image on the recording sheet. Through the operation unit 12, an operator may input image-duplication condition setting instructions such as tone processing mode setting, recording image density setting, size changing rate setting, duplication-preventing-mark output mode setting and so forth. The operation unit 12 thus supplies the relevant signal to a control unit 19 which, in accordance with the supplied signal, appropriately supplies the relevant control signal C so as to suitably control the reading unit 16, image processing unit 17 and writing unit 18.

Figure 1:
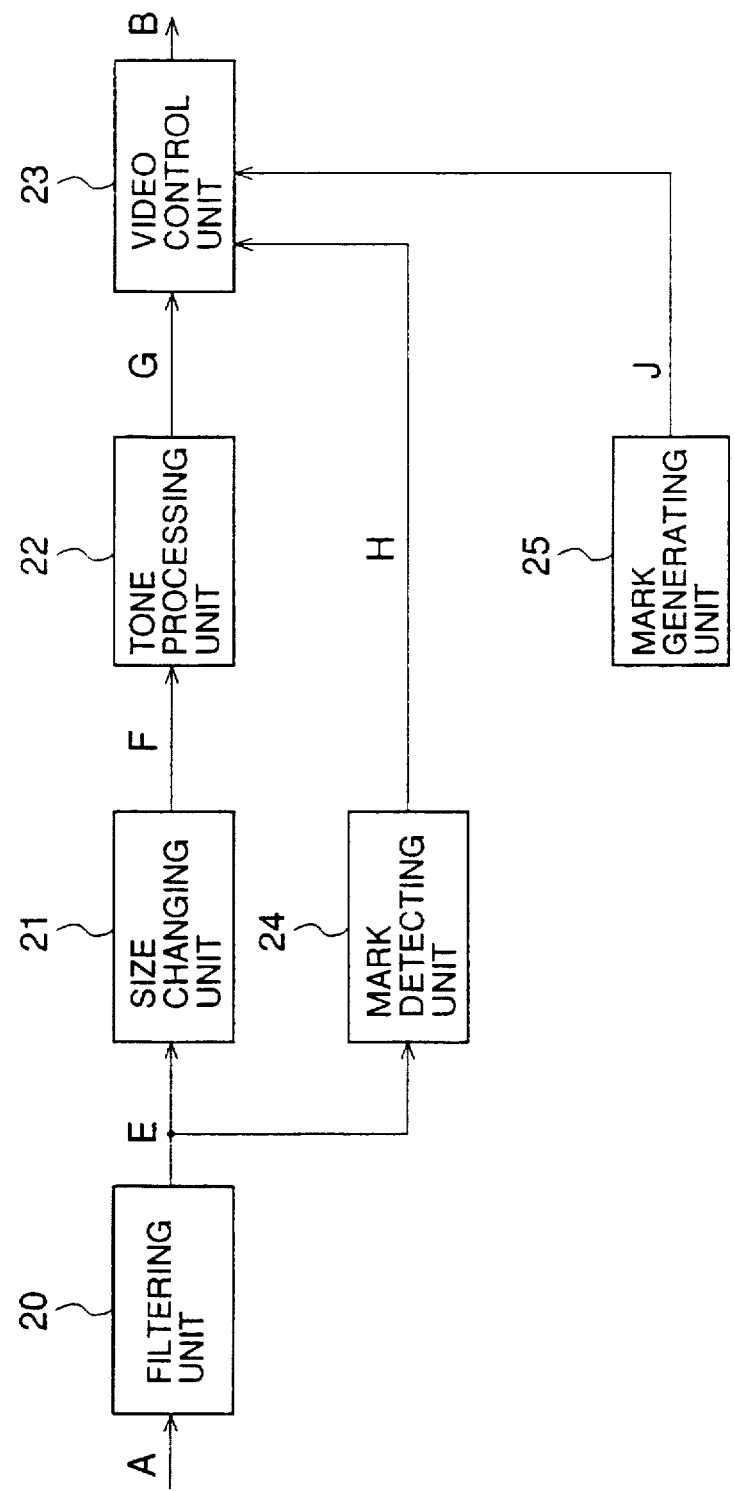
FIG. 1 shows a block diagram of an image processing unit in each of a first, second, third, fourth, fifth, sixth, seventh, eighth, tenth, eleventh, twelfth, thirteenth, fourteenth, fifteenth, sixteenth, seventeenth, eighteenth, nineteenth and twentieth embodiments of a duplicator according to the present invention.

With reference to FIG. 1, portions, particularly essential to the present invention, in the above image processing unit 17 will now be described. In FIG. 1, the image signal A is that output by the reading unit 16 and the image data B is that output by the image processing unit 17, the same as those shown in FIG. 3. Each of image data signals A, B, E, F and G is a signal in which image data is multi-tone-quantized with respect to density for each pixel.

A filtering unit 20 performs a correction of MTF (modifying transfer filtering) on the image data A, thus supplying the processed image data E. A size changing unit 21 logically (or electronically) processes the data E so as to enlarge or reduce the image represented by the data E in the main scan direction as it is instructed. The size changing in the sub-scanning direction may be performed through appropriately controlling the velocity of relative position variation between the image and the CCD line sensor in the reading unit 16. Such velocity control is performed by the control unit 19.

A tone processing unit 22 performs gamma conversion on the image data F supplied by the size changing unit 21 so that the density relationship between the original image and the reproduced image may be a predetermined relationship. The tone processing unit 22 further processes the image data so that the resulting image data may have characteristics appropriate to the characteristics of the writing unit 18, thus supplying the image data G. A video control unit 23 modifies the image data G using signals H and J which will be described, supplying the image data B to the writing unit 18.

A mark detecting unit 24 checks the supplied image data E and may detect a duplication preventing mark in the image represented by the image data E. The unit 24 supplies a mark detection signal H if the unit 24 detects a duplication preventing mark. The video control unit 23 cancels the supplied image data G so as to supply the image data B having the value "0", if the mark detection signal is supplied by the mark detecting unit 24. The value "0" of the image data B represents the white image, that is, this image data B causes the writing unit 18 to print out nothing as the relevant reproduced image. A mark generating unit 25 supplies a mark image signal J if a mark generating mode is set in the duplicator. The video control unit 23 integrates the image data G with the mark image signal J if it is supplied thereto so as to supply the image data B corresponding to the thus integrated data.

The mark detecting unit 24 analyzes the image data E supplied by the filtering unit 20 so as to determine whether or not any duplication preventing mark is present in the relevant original image. If a mark is present, the unit 24 outputs the mark detection signal H having the value "1". The mark generating unit 25 supplies the image signal J for a purpose of producing the reproduced image obtained by adding a special image to an original image, the signal J representing the special image. Examples of such special images are page numbers, duplication preventing mark and so forth.

Figure 4:
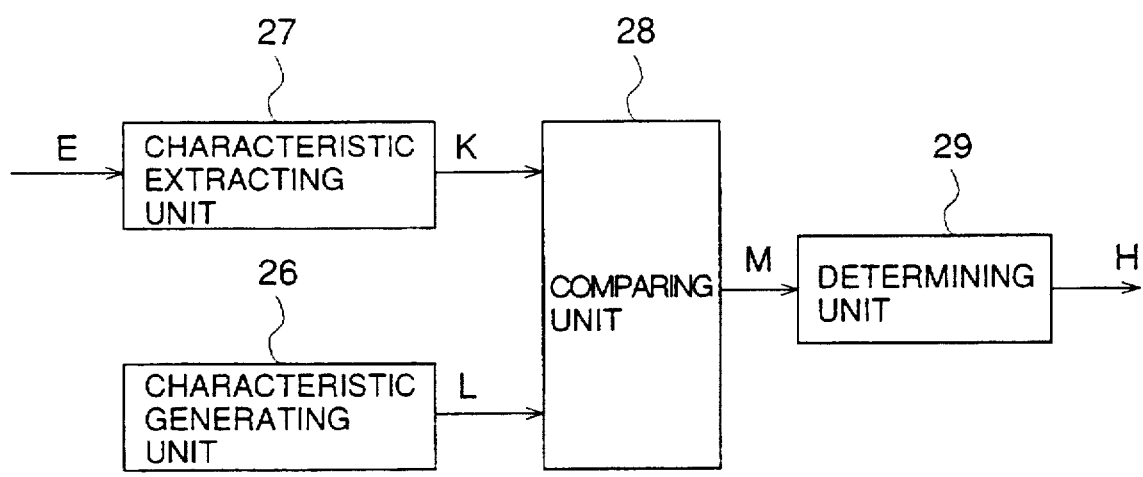
FIG. 4 shows a block diagram illustrating a formation of each of a mark detecting unit shown in FIG. 1 and a mark detecting unit shown in FIG. 18.

With reference to FIG. 4, the mark detecting unit 24 will now be described. A characteristic generating unit 26 generates a reference characteristic data L. The reference characteristic data L indicates a predetermined shape, density and so forth of a duplication-preventing mark, and a position and arrangement of the mark in a relevant reproduced image. The reference characteristic data L has been produced in consideration of a special condition associated with the supplied image data E as will be described. The special condition is that, if an operator inputs size changing instructions to the duplicator, the supplied data has already undergone sub-scan directional size changing (in the reading unit 16 as mentioned above) and has not undergone main scan directional size changing (to be performed in the size changing unit 21 as mentioned above).

A character extracting unit 27 extracts characteristics from the image data E, the characteristics being ones in a sort same as those of the above reference characteristic data L, thus supplying the extracted data K. A comparing unit 28 compares the extracted data K with the reference characteristic data L, thus supplying the compared result M. A determining unit 29 performing overall examination for the presence of the duplication-preventing mark using the above compared result M, thus supplying the duplication-preventing mark detection signal H having the value "1" if it is present.

Figure 5:
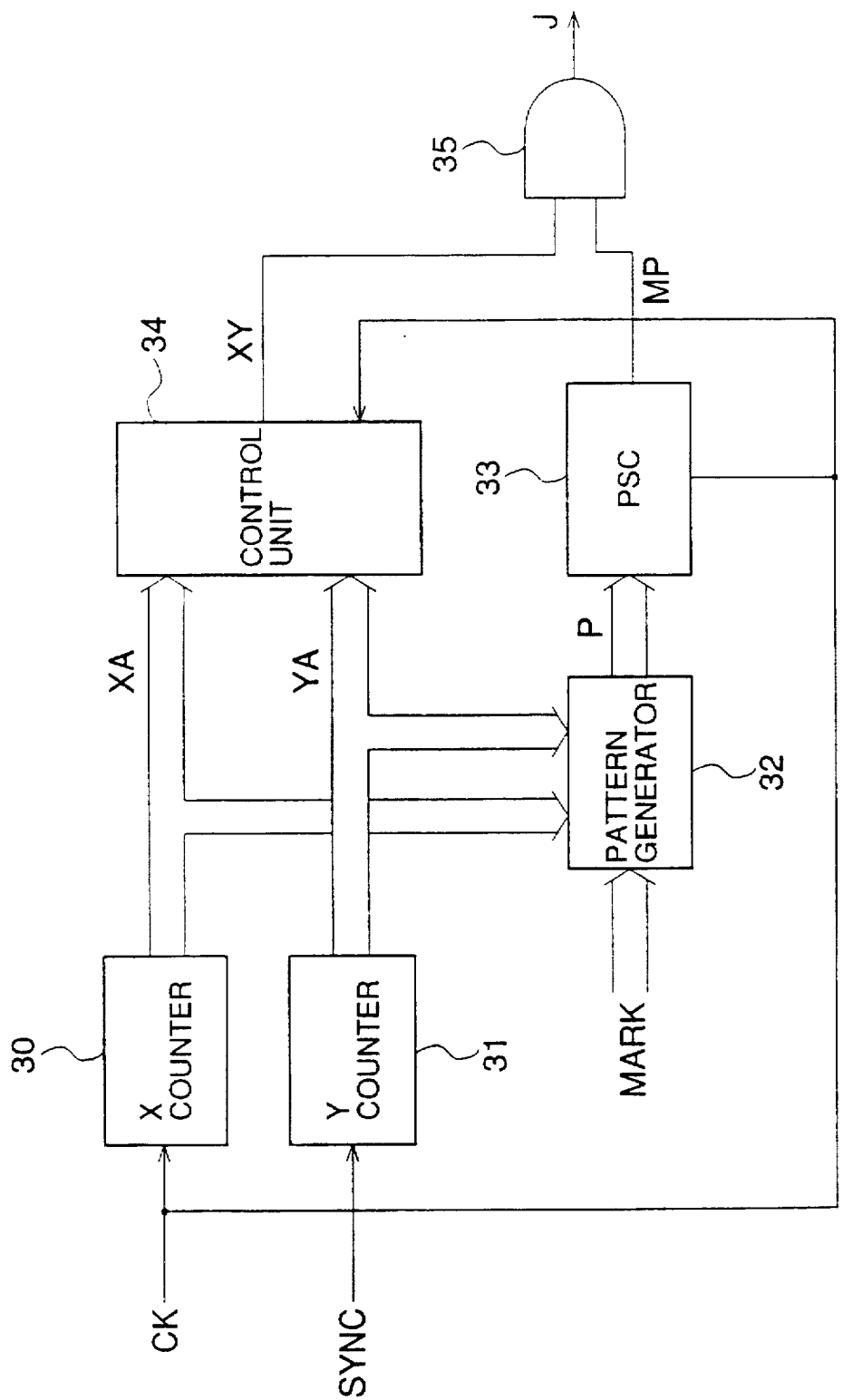
FIG. 5 shows a block diagram illustrating a formation of each of a mark generating unit shown in FIG. 1 and a mark generating unit shown in FIG. 18.

With reference to FIG. 5, the mark generating unit 25 will now be described. A signal CK shown in the figure is a main-scan directional pixel-clock signal. An X counter 30 counts the clock pulses in the signal CK so as to generate a signal XA indicating on-recording-sheet main-scan directional pixel addresses. A signal SYNC shown in the figure is a main-scan directional line-synchronization signal. A Y counter 31 counts the clock pulses in the signal SYNC so as to generate a signal YA indicating on-recording-sheet sub-scan directional pixel addresses.

Addresses in a pattern generator 32, being a ROM (read only memory), is specified by the above signals XA and YA and a MARK signal shown in the figure. The generator 32 thus supplies the mark pattern data P stored in the thus specified address. The pattern generator 32 may generate various characters, symbols, and marks as the mark pattern data P such as a duplication preventing mark, page numbers, and so forth. Anyone of characters, symbols, and marks will be referred to as a mark or the like, hereinafter.

The above MARK signal is an address specification signal and a signal indicating a 4-bit code indicating particular pattern data stored in the generator 32. In an example, the code '0, 0, 0, 1' indicates the duplication preventing mark. The mark pattern data P is a parallel-8-bit signal and is parallel-to-serial-converted into the relevant serial signal MP, having data for each pixel, through a PSC (parallel-to-serial converting) unit 33. A control unit 34 determines a position at which a relevant mark or the like is to be printed on a relevant recording sheet and generates a signal XY having the value "1" for a period corresponding to the above position on the recording sheet. An AND device 35 performs the logical AND operation on the above signals MP and XY so as to generate a signal J being an image signal indicating a relevant mark or the like to be printed.

Figure 6:
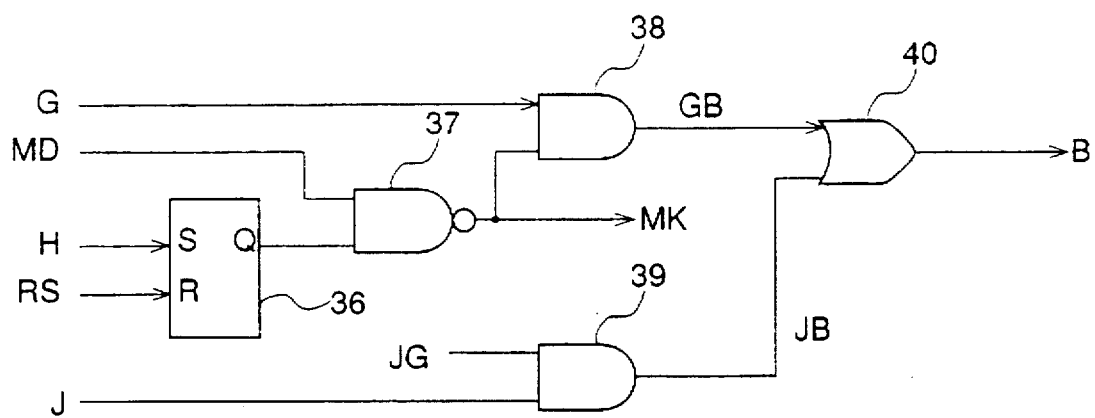
FIG. 6 shows a circuit diagram illustrating an internal formation of each of a video control unit shown in FIG. 1 and a video control unit shown in FIG. 18.

With reference to FIG. 6, essential parts in the above-mentioned video control unit 23 will now be described. The signals B, G, H and J shown in the figure are the same as those shown in FIG. 4. The unit 23 includes an RS flip-flop device 36, NAND gate device 37, AND gate device 38, 39, and OR device 40. The indication of a signal MD is determined according to the relevant instructions input through the operation unit 12 shown in FIGS. 2 and 3. The signal MD is a signal for setting a mode in which a duplication preventing function is validated. In the above mode, a once read-in image is not reproduced, by canceling the relevant image data, if a duplication preventing mark has been detected.

It is possible and included in the scope of the present invention that any of the embodiments described in the specification, having the function through which an operator may switch on/off activity of a duplication preventing function such as described above, may be modified so as to have functions such as that as follows: If the mark detecting unit 24 shown in FIG. 1 detects the duplication preventing mark after the activity of the duplication preventing function has been switched off, the mark generating unit 25 generates a certain mark being printed together with the relevant reproduced image through the writing unit 18 shown in FIG. 3. The presence of the certain mark is easily notified after being printed on a recording sheet. The certain mark is further a mark such that a person, finding the mark, can identify the duplicator having printed the mark.

A signal RS is a pulse signal generated by a control unit 19 shown in FIG. 1. The signal RS is generated at a time the image duplication operation starts and it resets the flip-flop device 36 for each time an image duplication operation is performed. A signal JG is generated by the control unit 19 shown in FIG. 1. The value "1" in the signal JG indicates an instruction to output relevant image data of a read-in image and the mark image signal J as a result of integrating the image data with the signal J.

How the video control unit 23 shown in FIG. 6 operates will now be described. If an operator puts a sheet having an original image formed thereon on the original sheet table 11 and presses a duplication start key provided on the operation unit 12 shown in FIG. 2, the duplicator starts a duplicating operation. Thus, the signal RS is generated so that the flip-flop device 36 is reset. The above image is being scanned through the suitable functions of the duplicator so that the mark detecting unit 24 shown in FIG. 1 checks whether or not the relevant image includes an image of a duplication preventing mark. If the unit 24 detects the presence of a duplication preventing mark, the state of the mark detection signal H is changed from "0" into "1".

The state change to "1" into the signal H sets the flip-flop device 36 so that the output signal of the device 36 comes to have the value "1". If the above mode in which the duplication preventing function is validated has been previously set, the signal MD comes to have the value "1". Thus, the output signal MK of the NAND gate device 37 come to have the value "0". The value "0" in the signal MK causes the output signal GB of the AND gate 38 to have the value "0" independently of the value in the image data G relevant to the read-in original image. The value "0" in the signal GB means that no significant image is reproduced relevant to the current image data G. On the other hand, if the above mode has not been set, that is, the duplication preventing function is not valid, MD=0 so that the output signal MK of the NAND gate device 37 becomes to have the value "1". Thus, the image data G is passed through AND gate device 38. Further, if the integrating mode, in which the mark image signal J is integrated with and then is output together with the data of the read-in original image, is not activated, J=0 so that the output signal JB of the AND gate device 39 comes to have the value "0".

Thus, the duplication preventing function is valid and the above integrating mode is not activated, the duplicator prints no reproduced image on the recording sheet after the mark detecting unit 24 has detects a duplication preventing mark in the original image. On the other hand, the duplication preventing function is valid and the above integrating mode is activated, JG=0 so that the mark image signal J, representing a selected mark or the like, is passed through the AND gate device 39 and then through the OR device 40, the signal J being thus output as the signal B. Thus, the selected mark or the like is printed on the recording sheet. The output signal MK of the NAND gate device 37 is supplied to the control unit 19. If the signal MK has the value "0" as mentioned above, the control unit 29 causes the operation unit 12 to display thereon that the currently read-in original image is an image inhibited from being duplicated, and to give a relevant warning sound.

On the other hand, if there is no duplication preventing mark in the image formed on the sheet set on the table 11, The mark detection signal H has the value "0" so that the output signal MK of the NAND gate device 37 has the value "1". Thus, the relevant image data G is passed through the AND gate device 38 so that the original image is reproduced and the corresponding image is printed on a recording sheet.

Figure 7:
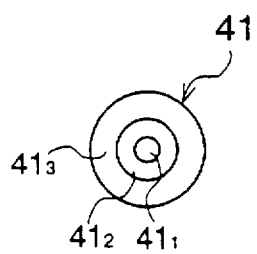
FIG. 7 shows a duplication preventing mark used in the above duplicator in the first embodiment.

With reference to FIG. 7, an example of a duplication preventing mark will now be described. As shown in the figure, the duplication preventing mark 41 consists of three concentric circles $41_1$, $41_2$ and $41_3$. The above mark generating unit 25 generates the image signal J indicating the above mark 41, the pattern data of the mark 41 having been previously stored in the above pattern generator 32. The mark detecting unit 24 checks the image data E so as to determine whether or not a read-in original image includes an image identical to the above mark 41. If the identical image is present, the mark detecting unit 24 outputs the mark detection signal H having the value "1".

The characteristic generating unit 26 in the above mark detecting unit 24 generates the characteristic data L representing the characteristics of the above mark 41. The characteristic extracting unit 27 extracts the characteristics of the given image data E and then outputs the above characteristics as the extracted data K. The thus supplied extracted data K is used so that the data L is compared with the extracted data K through the comparing unit 28. The extracted data K is a type of data, the type being the same as that of the characteristic data L. The comparing unit 28 supplies the result M indicating the result of the above comparison. The determining unit 29, in the above-described manner using the above result M, determines whether or not the image represented by the image data E includes an image identical to the above mark 41. The unit 29 generates the value "1"in the signal H if the identical image is present.

Figure 8:
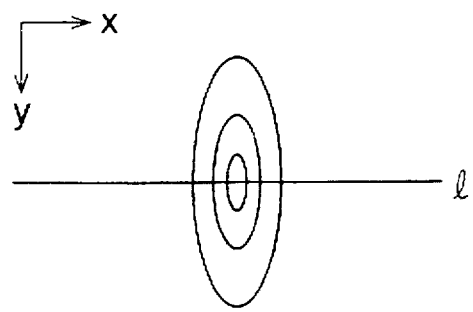
FIG. 8 illustrates the image represented by image data obtained by reading the above duplication preventing mark in an enlarging duplication mode, in the above duplicator in the first embodiment.
Figure 9:
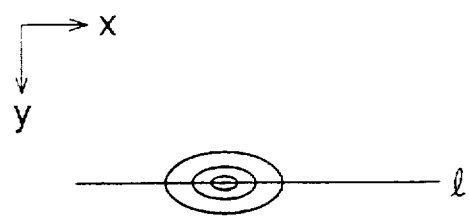
FIG. 9 illustrates the image represented by image data obtained by reading the above duplication preventing mark in a reducing duplication mode, in the above duplicator in the first embodiment.

With reference to FIGS. 8 and 9, cases will now be described, where the duplicator in the first embodiment of the present invention reads the above mark 41 in a size-enlarging duplicating mode and in a size-reducing duplicating mode. The image data E is image data not yet undergoing the image size changing process in the size changing unit 21, as shown in FIG. 1, the unit 21 changing the size of an image represented by a given data in the sub-scan direction y as described above. Thus, the size of each of the images represented by the data E has been changed in the sub-scan direction y through the reading unit 16 shown in FIG. 3 but has not been changed in the main-scan direction x, as shown in FIGS. 8 (size-enlarging duplicating mode) and 9 (size-reducing duplicating mode).

As shown in FIGS. 8 and 9, the images in the data E have the same pattern on the line 1, shown in the figures, along the main-scan direction x. This is because the sizes of the images in the data E have not been changed in the above direction x as described above. Further, since the mark 41 consists of the concentric circles $41_1$ through $41_3$, even if a sheet on which the mark 41 has been formed is placed on the original sheet table 11 obliquely in any direction, the images in the data E are fixed, the images having been obtained from the thus obliquely placed mark 41. If the characteristic extracting unit 27 has a function of extracting the sub-scan directional pattern of a mark from the image data E, a line memory is required to be provided in the unit 27, the construction of the unit 27 being thus complicated and the unit 27 being thus costly. In contrast to this, the characteristic extracting unit 27 in the duplicator in the first embodiment of the present invention uses the main-scan directional pattern, that is, the pattern on the line 1 shown in FIGS. 8 and 9, from the data E so as to determine the presence of the mark 41. Thus, it is possible to simplify the construction of the characteristic extracting unit 27 and thus to reduce the cost of the unit.

Figure 10:
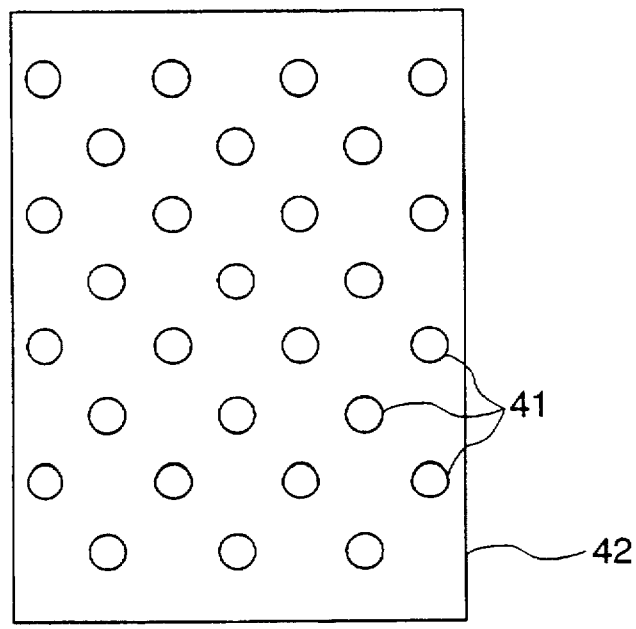
FIG. 10 illustrates a recording sheet on which duplication preventing marks have been recorded by the above duplicator in the first embodiment.

With reference to FIG. 10, a manner will now be described, as to how the duplication preventing mark 41 is recorded on a recording sheet in the duplicator in the first embodiment of the present invention. FIG. 10 only indicates the marks 41 recorded on a recording sheet 42 and indication of an image reproduced from an original image formed on a sheet placed on the original sheet table 11 is omitted for the sake of simplicity. As shown in the figure, a plurality of marks 41 are dispersed in the recording sheet 42, each small circle representing the mark 41 shown in FIG. 7. Such a dispersed arrangement of marks enables at least one of the marks to be read by the duplicator even if the sheet is placed on the table 11 so that only a part of the sheet can be read in by the duplicator or even if the sheet is placed on the table 11 after a part of the sheet has been covered/masked by another sheet.

Further, such a dispersed and arrangement of marks enables the mark detecting unit 24 to accurately detect the marks as follows. The determining unit 29 shown in FIG. 4 may have a function in that the unit 29 determines the presence of the marks if a predetermined number of the marks have been detected as a result of comparison through the comparing unit 28. Thus, it is possible to improve accuracy in the duplication-preventing mark detection and to prevent erroneous determination.

A duplicator in a second embodiment of the present invention will now be described with reference to FIG. 11. The duplicator uses a set of duplication preventing marks 43 shown in FIG. 11 instead of the duplication preventing marks 41 shown in FIGS. 7 and 10. Excepting differences, in the constructions/functions, made so as to use either the marks 41 or the marks 43, the duplicators in the first and second embodiments of the present invention are substantially identical, except where modification is made according to a particular description which may be made. Each mark of the set of marks 43 shown in FIG. 11 consists of a halftone dot as shown in the figure, pitch between adjacent dots being the distance of 16 pixels and each dot consisting of 2×2 pixels. Since such a set of halftone-dot marks is used as the duplication preventing mark in the duplicator in the second embodiment, the mark detecting unit 24 in the duplicator has a function of detecting such duplication preventing marks using mark characteristics such as presence of halftone dots, the inter-dot pitch, the number of dots present in a predetermined area, and so forth. Thus, the characteristics of the duplication preventing mark to be used in the mark detection can be simplified and thus the detection can be made simply. It is noted that, in this embodiment, an outline shape of such a set of duplication preventing marks, that is, a square in the FIG. 11 example, is not checked in the duplication preventing mark detection. That is, an outline shape thereof can be arbitrarily determined and the mark detection detects mark characteristics such as presence of halftone dots, the inter-dot pitch, the number of dots present in a predetermined area, and so forth as mentioned above of such a set of marks 43 but does not check the outline shape of the set of the marks.

Figure 11:
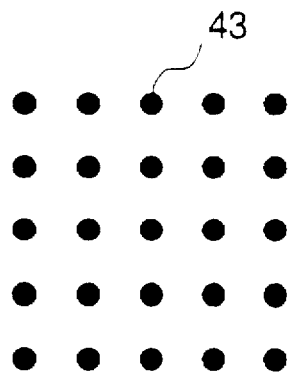
FIGS. 11, 12, 13, 14, 15 and 16 illustrate shapes of duplication preventing marks used in duplicators in the second, third, fourth, fifth, sixth, and seventh embodiments of the present invention.

The duplication preventing mark used in the above duplicator in the second embodiment is not limited to the mark shown in FIG. 11. Alternatively, it is also possible and included in the scope of the present invention that one of various marks is used in the duplicator as the duplication preventing mark to be detected by the mark detecting unit 24 and to be generated by the mark generating unit 25. The various marks are formations, each including a specific spatial frequency component in a particularly large amount. Such formations are those including a formation shown in FIG. 11 and a formation shown in FIG. 20.

Figure 12:
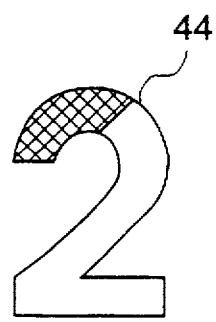

A duplicator in a third embodiment of the present invention will now be described with reference to FIG. 12. The duplicator uses a duplication preventing mark 44 such as that shown in FIG. 12 instead of the duplication preventing mark 41 shown in FIG. 7. Excepting the differences, in the constructions/functions, made so as to use the different marks 41 and 44, the duplicators in the first and third embodiments of the present invention are substantially identical, further except where modification is made according to a particular description which may be made. The mark 44 in the third embodiment of the present invention may consist of a specific image such as an image of numeral, symbol, character, or the like. The mark 44, for example, consists of the numeral '2', shown in the figure, consisting of halftone dots. Since such a halftone-dot numeral, for example, mark is used as the duplication preventing mark in the duplicator in the third embodiment, the mark detecting unit 24 in the duplicator has a function of detecting the duplication preventing mark using mark characteristics such as the presence of halftone dots and the halftone dots overall forming the specific numeral. Thus, the characteristics of the duplication preventing mark to be used in the mark detection can be simplified and thus the detection can be made simply. Further, checking overall formation of halftone dots can prevent halftone image, included in an original image formed on a sheet placed on the original sheet table 11 but being the duplication preventing mark, from being erroneously determined to be the duplication preventing mark.

Figure 13:
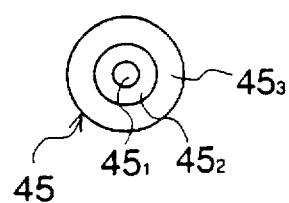

A duplicator in a fourth embodiment of the present invention will now be described with reference to FIG. 13. The duplicator is a color duplicator and uses a duplication preventing mark 45 such as that shown in FIG. 13 instead of the duplication preventing mark 41 shown in FIG. 7. Excepting the differences, in the constructions/functions, made so as to process a color image as an original image formed on a sheet placed on the original sheet table 11 and so as to use the different marks 41 and 45, the duplicators in the first and fourth embodiments of the present invention are substantially identical, except where modification is made according to a particular description which may be made. The mark 45 in the fourth embodiment of the present invention consists of three regions $45_1$ painted yellow, $45_2$, painted blue, and $45_3$, painted red, each region being defined by concentric circles as shown in the figure. The color combination is one of the characteristics of the mark 45.

The reading unit 16 shown in FIG. 3 reads in a color image set on the table 11 so that the image is scanned and separated into the three color components being thus output as the corresponding three color components of color image data. The image processing unit 17 processes the three-color image data. The writing unit 18, being a laser printer, uses the relevant color toners to form the reproduced image on a photosensitive body(s). In the writing unit 18, the thus formed three color-toner images are transferred onto a recording sheet so that the three images are overlaid with one another.

Since a multi-color mark such as that consisting of a plurality of regions painted different colors is used as the duplication preventing mark in the duplicator in the fourth embodiment, the mark detecting unit 24 in the duplicator has a function of detecting the duplication preventing mark using mark characteristics such as the combination of colors used in the plurality of regions. Thus, the characteristics of the duplication preventing mark to be used in the mark detection can be simplified and thus the detection can be made simply. Further, the detection accuracy can be improved. The duplicator in the fourth embodiment may be not only a color duplicator but also a black-and-white duplicator.

Figure 14:
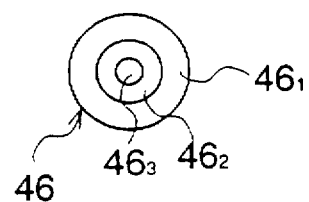

A duplicator in a fifth embodiment of the present invention will now be described with reference to FIG. 14. The duplicator uses a duplication preventing mark 46 such as that shown in FIG. 14 instead of the duplication preventing mark 41 shown in FIG. 7. Excepting the differences, in the constructions/functions, made so as to use the different marks 41 and 46, the duplicators in the first and sixth embodiments of the present invention are substantially identical, except where modification is made according to a particular description which may be made. The mark 46 in the fifth embodiment of the present invention consists of three regions $46_1$, painted high-density gray, $46_2$, painted low-density gray, and $46_3$, painted middle-density gray, each region being defined by concentric circles as shown in the figure. The density combination is one of the characteristics of the mark 46. Since a multi-density mark such as that consisting of a plurality of regions painted different-density grays is used as the duplication preventing mark in the duplicator in the sixth embodiment, the mark detecting unit 24 in the duplicator has a function of detecting the duplication preventing mark using mark characteristics such as the combination of densities used in the plurality of regions. Thus, the characteristics of the duplication preventing mark to be used in the mark detection can be simplified and thus the detection can be made simply. Further, the detection accuracy can be improved.

Figure 15:
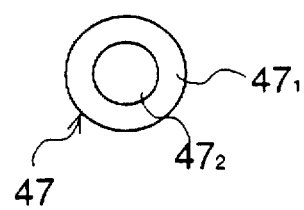

A duplicator in a sixth embodiment of the present invention will now be described with reference to FIG. 15. The duplicator uses a duplication preventing mark 47 such as that shown in FIG. 15 instead of the duplication preventing mark 41 shown in FIG. 7. Excepting the differences, in the constructions/functions, made so as to use the different marks 41 and 47, the duplicators in the first and sixth embodiments of the present invention are substantially identical, except where modification is made according to a particular description which may be made. The mark 47 in the sixth embodiment of the present invention consists of a plurality of regions occupied by different densities of halftone dots. The mark 47, for example, consists of two regions $47_1$, occupied by 100 lines/inch-density halftone dots and $47_2$, occupied by 75 lines/inch-density halftone dots, each region being defined by concentric circles as shown in the figure.

General documents/pictures, which may be used as an original image formed on a sheet placed on the original sheet table 11, may include therein regions occupied by various densities of halftone dots. However, it is in very few cases that a document/picture has, therein, a plurality of regions occupied by different-density halftone dots within a fixed area such as those in the mark 47. Thus, the above-described functions of the duplicator in the sixth embodiment of the present invention can prevent a region, occupied by halftone dots included in a read-in original image but not being the mark 47, from being erroneously determined to be the duplication preventing mark.

Figure 16:
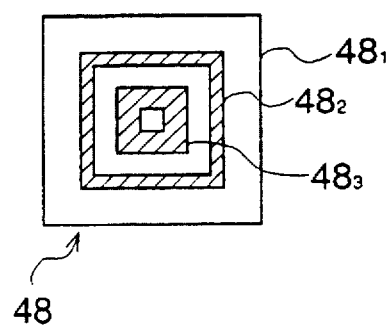

A duplicator in a seventh embodiment of the present invention will now be described with reference to FIG. 16. The duplicator uses a duplication preventing mark 48 such as that shown in FIG. 16 instead of the duplication preventing mark 41 shown in FIG. 7. Excepting the differences, in the constructions/functions, made so as to use the different marks 41 and 48, the duplicators in the first and seventh embodiments of the present invention are substantially identical, except where modification is made according to a particular description which may be made. The mark 48 in the seventh embodiment of the present invention consists of a plurality of lines having different line widths. The mark 48, for example, consists of three lines $48_1$ having a small width, $48_2$ having a middle width, and $48_3$ having a large width. Since the duplicator in the seventh embodiment uses a plurality of lines having different widths as the duplication preventing mark, the mark detecting unit 24 in the duplicator has a function of detecting the duplication preventing mark using mark characteristics such as the combination of line widths. Thus, the characteristics of the duplication preventing mark to be used in the mark detection can be simplified and thus the detection can be made simply. Further, the detection accuracy can be improved.

Figure 17:
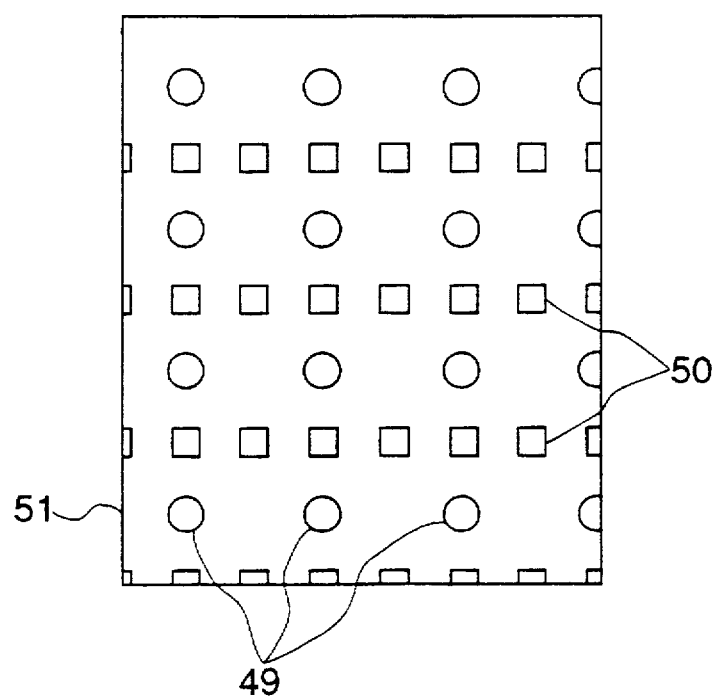
FIG. 17 illustrates a recording sheet on which duplication preventing marks have been recorded by the above duplicator in the eighth embodiment.

A duplicator in a eighth embodiment of the present invention will now be described with reference to FIG. 17. The duplicator uses a combination of a plurality of duplication preventing marks 49 and 50 such as those shown in FIG. 16 instead of the duplication preventing mark 41 shown in FIG. 7. Excepting the differences, in the constructions/functions, made so as to use either the marks 41 or the combination of the marks 49 and 50, the duplicators in the first and eighth embodiments of the present invention are substantially identical. except where modification is made according to a particular description which may be made. The combination of marks 49 and 50 in the eighth embodiment of the present invention consists of a combination of two sorts of marks having different image characters. That is. the sort of marks 49 have a first image character and the sort of marks 50 have a second image character. The two marks 49 and 50 having different image characters are dispersed on a recording sheet 51 as shown in the figure. The different image characters are ones such as shapes of images such as a rectangle 50 and circle 49 for example. All the number of squares (other than the rectangle 51) in the figure represent the marks 50 and all the number of circles represent the mark 49.

Since the duplicator in the eighth embodiment uses a plurality of sorts of marks, an image character of one sort of marks being different from an image character of another sort of marks, as the duplication preventing marks, the mark detecting unit 24 in the duplicator has a function of detecting the duplication preventing mark using mark characteristics such as not only a plurality of sorts of marks but also a plurality of sorts of marks having different image characters. Thus, it can be predicted that a possibility of a case is very little. the case being that a read-in original image includes an image part resembling a mark of one sort among the plurality of sorts of duplication preventing marks. Thus, it can be predicted that it is substantially impossible that a read-in original image includes image parts having all the sorts of the plurality of sorts of duplication preventing marks. Thus, the above-described functions of the duplicator in the eighth embodiment of the present invention can prevent a read-in original image, having an image part resembling but not being identical to a mark of one sort among the plurality of sorts of duplication preventing marks, from being erroneously determined to be an image which includes the duplication preventing marks.

Figure 18:
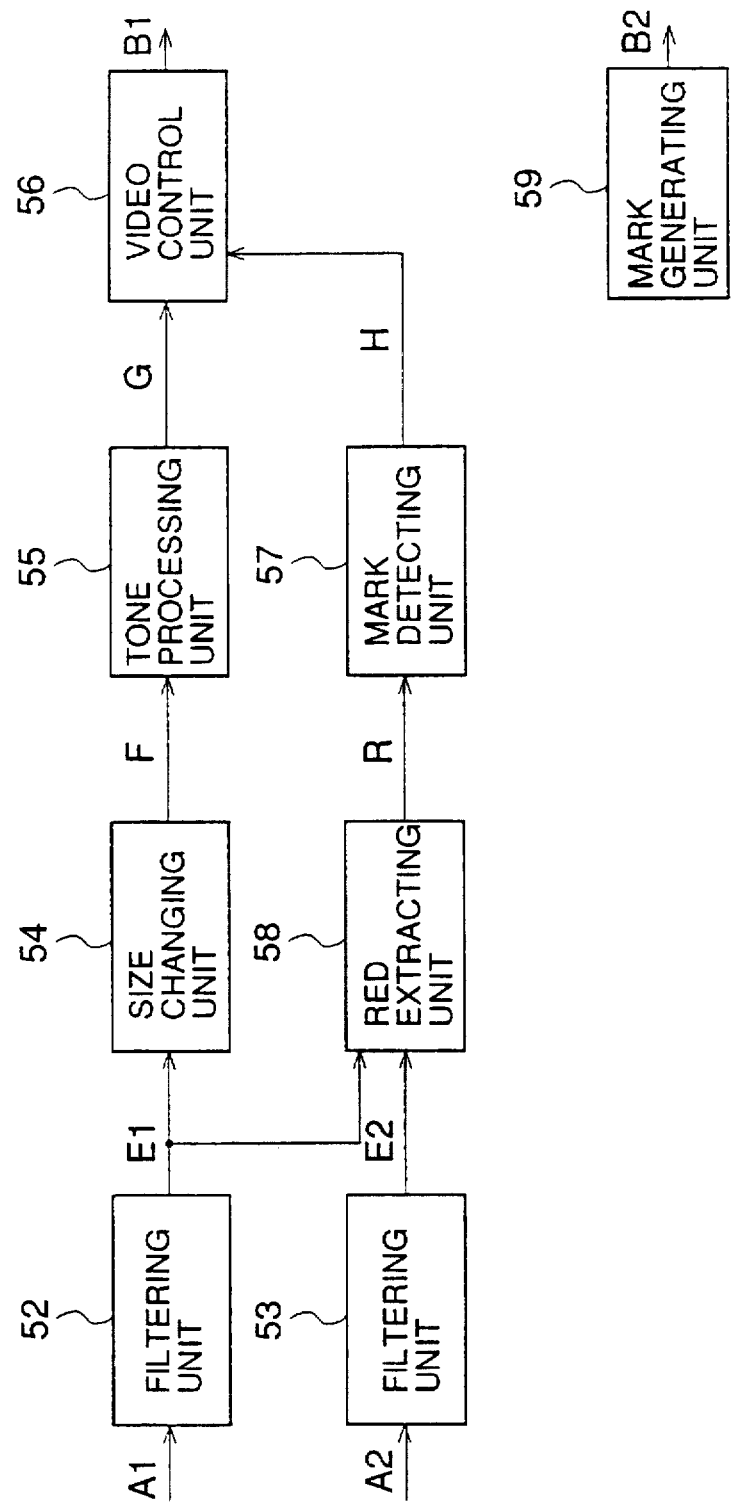
FIG. 18 shows an internal formation of an image processing unit shown in FIG. 3 in the ninth embodiment of a duplicator according to the present invention.

With reference to FIGS. 2, 3 and 18, a duplicator in a ninth embodiment of the present invention will now be described. The duplicator, being a dual-color duplicator, reads in two color, black and red of an image and writes out the corresponding reproduced image. A reading unit 16 shown in FIG. 3 scans an original image formed on a sheet placed on the original sheet table 11 similarly to the duplicator in the first embodiment. The unit 16 uses a green filter and a red filter (not shown in the figures) in reading of the original image so that the color components of the dual-color image are read separately, thus outputting the corresponding respective two series of image data A1 and A2. The image data A1 is obtained as a result of reading the original image through the green filter and the image data A2 is obtained as a result of reading the original image through the red filter. The two series of image data A1 and A2 are supplied to the respective filtering units 52 and 53 as shown in FIG. 18. The filtering units 52 and 53 perform a correction of MTF on the image data A1 and A2, thus supplying the processed image data E1 and E2.

A size changing unit 54 logically (or electronically) processes the data E1 so as to enlarge or reduce the image represented by the data E1 in the main scan direction as it is instructed. The size changing in the sub-scan direction may be performed through appropriately controlling the relative velocity between the image and the CCD line sensor in the reading unit 16. Such velocity control is performed by the control unit 19.

The tone processing unit 55 performs gamma conversion on the image data F supplied by the size changing unit 54 so that the density relationship between the original image and the reproduced image may be a predetermined relationship. The tone processing unit 55 further processes the image data so that the resulting image data may have characteristics appropriate to the characteristics of the writing unit 18, thus supplying the image data G. A video control unit 56 modifies the image data G using signals H and so forth. then supplying image data B1 to the writing unit 18. That is, the video control unit 56 cancels the given image data G if a mark detection signal H is supplied by the mark detecting unit 57 supplying the mark detection signal H if the unit 57 detects a duplication preventing mark. The video control unit 56 thus outputs the image data B1 having the value "0" so that no reproduced image is printed through the writing unit 18.

A red detecting unit 58 shown in FIG. 18 analyzes the image data E1 and E2 given by the filtering units 52 and 53 so as to extract the red component of image from the original image. The mark detecting unit 57 checks the red-component image data R supplied by the red detecting unit 58 and may detect a duplication preventing mark using predetermined characteristics and/or shape of the duplication preventing mark. The unit 58 supplies a mark detection signal H having the value "1" if the unit 58 detects the duplication preventing mark. A mark generating unit 59 has functions similar to those of the above-described mark generating unit 25 but supplies a mark image signal B2 to the writing unit 18 directly. not supplying the signal to the video control unit 56.

The writing unit 18 shown in FIG. 3 has functions for printing out dual-color images. The writing unit 18 uses the image data B1 supplied by the video control unit 56 in printing the relevant image reproduced from the original image on a recording sheet in black. Simultaneously, the writing unit 18 uses the mark image signal B2 supplied by the mark generating unit 59 in printing the relevant duplication preventing mark on the same recording sheet in red. As a result, the original image is reproduced on the recording sheet in black and the duplication preventing mark is printed on the same sheet in red.

Figure 19:
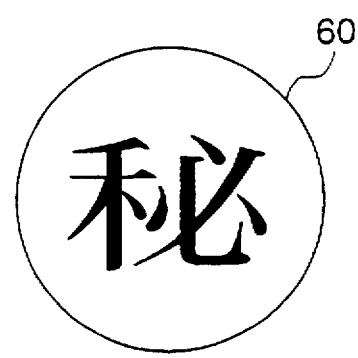
FIGS. 19 and 20 illustrate shapes of duplication preventing marks used in duplicators in the tenth and eleventh embodiments of the present invention.

The duplication preventing mark to be used in the duplicator in the ninth embodiment may be a mark 60 shown in FIG. 19. In this case, the duplication preventing mark 60 is red.

The duplicator in the ninth embodiment thus limits the color of the duplication preventing mark to be red. Thus, the accuracy in the duplication preventing mark detection can be improved.

With reference to FIG. 19, a duplicator in a tenth embodiment of the present invention will now be described. The duplicator uses a duplication preventing mark 60 such as that shown in FIG. 19 instead of the duplication preventing mark 41 shown in FIG. 7. Excepting the differences, in the constructions/functions, made so as to use different marks 41 and 60, the duplicators in the first and tenth embodiments of the present invention are substantially identical, except where modification is made according to a particular description which may be made. The mark 60 in the tenth embodiment of the present invention consists of the Chinese character 秘 with a circle enclosing the character. Generally in Japan, such a mark has been widely used, as a symbol indicating secret, in a form of a stamp. It is also possible and is included in the scope of the present invention to use another mark, instead of the mark shown in FIG. 19, appropriate to particular countries and appropriate to particular firms. In the duplicator, the mark detecting unit 24 can be formed using a well-known OCR (optical character recognition or optical character reading) technology. The duplication preventing mark 60 can be formed on a document by stamping the mark 60 in a conventionally used manner, instead of using the mark generating unit 25, the document being used as an original-image formed sheet to be reproduced through the duplicator. Thus, the document can be prevented from being duplicated through the duplicator since the thus stamped mark 60 is detected by the mark detecting unit 24 in the duplicator.

The duplicator in the tenth embodiment may alternatively have functions of using, instead of the mark 60 shown in FIG. 19, another formation of a mark as the duplication preventing mark. The formation is similar to that shown in FIG. 19 and using halftone dots for painting the inside area defined by the circle enclosing the Chinese character 機. In the case of using such a formation of mark, the mark detecting unit 24 has a function of detecting the halftone dots and needs not have a function of detecting the Chinese character. The Chinese character acts to indicate, to a person, that the document is a confidential document. Further, the duplicator in the tenth embodiment may alternatively have functions of using, another form of mark as the duplication preventing mark. The form is similar to that shown in FIG. 19 and a similar mark is formed using lines having a plurality of different widths.

Figure 20:
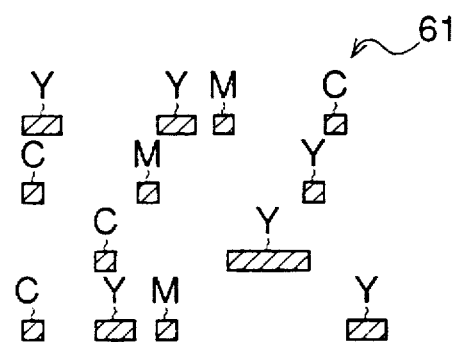

With reference to FIG. 20, a duplicator in a eleventh embodiment of the present invention will now be described. The duplicator uses a duplication preventing mark 61 such as that shown in FIG. 20 instead of the duplication preventing mark 41 shown in FIG. 7. Excepting the differences, in the constructions/functions, made so as to use different marks 41 and 61, the duplicators in the first and eleventh embodiments of the present invention are substantially identical, except where modification is made according to a particular description which may be made. The mark 61 in the eleventh embodiment of the present invention consists of a set of dots dispersed as shown in the figure, each dot consisting of 1 through 4 pixels. The dots are represented by various sizes/formations of rectangles, each rectangle being hatched, in the figure. In the figure, the dots C are cyan dots, dots M are magenta dots and the dots Y are yellow dots. The characteristics of the mark 61 include the arrangement and colors of the dots.

Such a dispersed-minute-dot duplication preventing mark as mark 61 shown in FIG. 20 cannot be seen with the naked eye. Thus, even such a mark is formed in a document to be prevented from being duplicated, the presence of mark in the document does not prevent the document from being clearly/obviously read/seen. In particular, if the duplicator in the tenth embodiment is a color duplicator, in comparison to the case of a black-and-white duplicator, the duplicator often processes documents having pictures/graphics formed therein. In a case of processing such a picture-formed document, if a duplication preventing mark is too obvious in the document, the document is not only prevented from being easily seen due to the presence of the mark but also the value of the picture in the document is lost due to the presence of the mark. Forming a duplication preventing mark in a formation such as the dispersed-minute-dot duplication preventing mark 61 shown in FIG. 20 described above encodes the basic meaning of the duplication preventing mark. By so encoding the basic meaning of the duplication preventing mark, problematic effects of duplication preventing marks can be eliminated. The problematic effects are those mentioned above preventing the document containing the marks from being easily seen.

Figure 21:
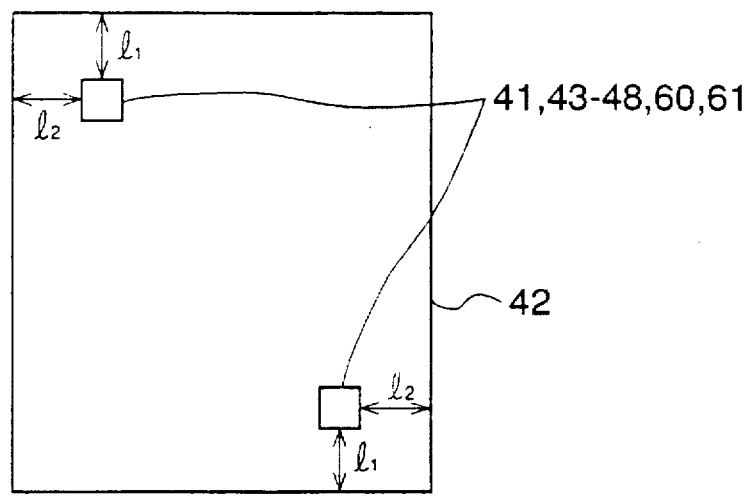
FIG. 21 illustrates a recording sheet on which duplication preventing marks have been recorded by the above duplicator in the twelfth embodiment.

With reference to FIG. 21, a duplicator in a twelfth embodiment of the present invention will now be described.

The duplicator has functions of using predetermined a mark among the above-mentioned duplication preventing marks 41, 43 through 48, 60 and 61. The duplicator has functions of using positions of the duplication preventing marks in a recording sheet 42 as shown in FIG. 21. The duplicator uses such positions of the marks as the characteristics of the duplication preventing marks to be detected by the mark detecting unit 24 and to be generated by the mark generating unit 25, in addition to using the characteristics of the marks themselves, that is, the shapes, colors, or the like of the marks, in the same purpose. Excepting the differences, in the constructions/functions, made so as to use either the mark 41, or both the predetermined mark among the above-mentioned duplication preventing marks 41, 43 through 48, 60 and 61 and the predetermined positions thereof, the duplicators in the first and twelfth embodiments of the present invention are substantially identical, except where modification is made according to a particular description which may be made.

The predetermined positions of the duplication preventing marks shown in FIG. 21 will now be described. The positions shown in FIG. 21 are an example and one of various other positions may be used as the characteristics of the duplication preventing marks detected by the mark detecting unit 24. With reference to FIG. 21, the two marks (each mark being a mark of the marks 41, 43 through 48, 60 and 61) are positioned on the opposite corners, the top-left corner and the bottom-right corner of a recording sheet 42. In detail, the distance along the vertical direction (sub-scan direction y) between the top-left mark and the top-left corner of the sheet 42 is $1_1$, the distance along the horizontal direction (main-scan direction x) between the top-left mark and the top-left corner of the sheet 42 is $1_2$, the distance along the vertical direction between the bottom-right mark and the bottom-right corner of the sheet 42 is $1_1$, the distance along the horizontal direction between the bottom-right mark and the bottom-right corner of the sheet 42 is $1_2$, as shown in the figure. Thus, the predetermined positions (distances $1_1$ and $1_2$) of the duplication preventing marks are added to the characteristics of the duplication preventing marks to be detected by the mark detecting unit 24 and to be generated by the mark generating unit 25 in the duplicator in the twelfth embodiment. As a result, it is possible to improve the accuracy in the duplication preventing mark detecting. By defining the predetermined positions of the marks in that the marks are arranged at the opposite corners of a recording sheet as described above, it is possible to appropriately detect the duplication preventing marks even if a sheet having an original image formed thereon is placed in either opposite directions (a first direction or a second direction rotated by 180° from the first direction) on the original sheet table 11 shown in FIG. 2.

With reference to FIGS. 22, 23A, 23B, 24, 25A, 26B, 26C and 26D, duplicators in thirteenth, fourteenth, fifteenth, sixteenth, seventeenth, eighteenth, nineteenth and twentieth embodiments of the present invention will now be described. Each duplicator of the above duplicators has functions of using respective one of the duplication preventing marks such as those shown in FIGS. 22, 23A, 23B, 24, 25A, 26B, 26C and 26D. Excepting the differences, in the constructions/functions, made so as to use different marks 41 and the above respective mark, the duplicators in the first and each embodiment of the above embodiments of the present invention are substantially identical, except where modification is made according to a particular description which may be made.

Figure 22:
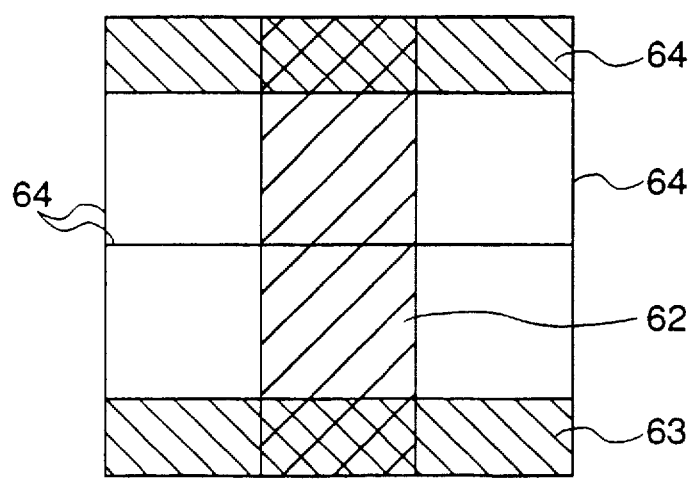

The duplicator in the thirteenth embodiment uses the duplication preventing mark consisting of a plurality of lines having different widths, such as that shown in FIG. 22. The mark shown in FIG. 22 consists of a wide-width vertical line 62, two middle-width horizontal lines 63 and three narrow-width vertical and horizontal lines 64.

Figure 23A:
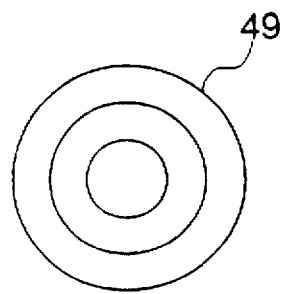
Figure 23B:
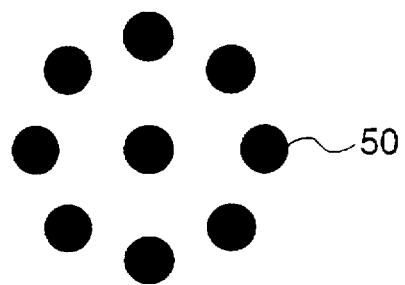

The duplicator in the fourteenth embodiment uses the duplication preventing marks consisting of two different marks such as those shown in FIGS. 23A and 23B. This duplicator in the fourteenth embodiment is an example of the above described duplicator in the eighth embodiment. That is, the marks 49 and 50 shown in FIG. 17 correspond to the marks 49 and 50 shown in FIGS. 23A and 23B.

Figure 24:
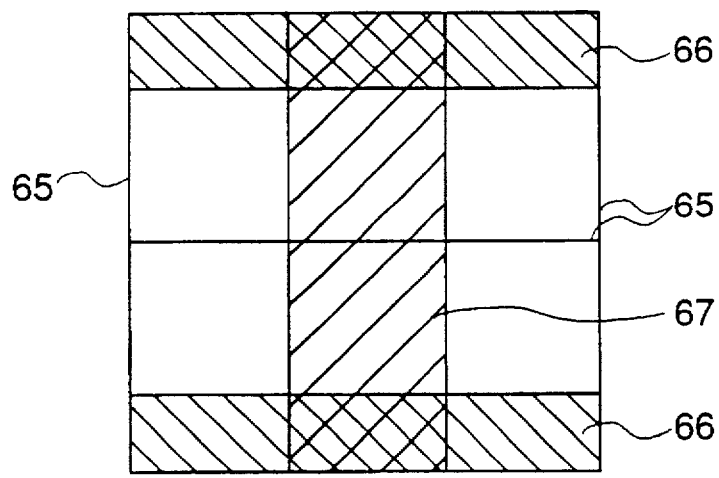

The duplicator in the fifteenth embodiment uses the duplication preventing mark consisting of a plurality of lines having different widths and different densities, such as that shown in FIG. 24. The mark shown in FIG. 24 consists of two vertical and horizontal lines 65, each having a small width and a high density, two horizontal lines 66, each having a middle width and a middle density and a vertical line 67 having a large width and a low density. Further, it is also possible and included in the scope of the present invention that the duplicator in the fifteenth embodiment uses another form of the duplication preventing mark to be detected by the mark detecting unit 24 and to be generated by the mark generating unit 25, instead of the above described mark. The other form is one consisting of a plurality of minute dots having a plurality of different sizes and/or a plurality of different colors and/or a plurality of different pitches between adjacent dots.

The duplicator in the sixteenth embodiment uses the duplication preventing mark such as one of marks shown in FIGS. 25A and 25B. The operating unit 12 shown in FIG. 2 has a function such that an operator may select one of the marks 68 and 69 shown in the figures through the operating unit 12. Such provision of a selectable plurality of marks such as marks 68 and 69 enables an operator to previously allocate the marks different functions such as those indicating different secret levels, that is, indicating how important keeping secret of a relevant document is. The mark detecting unit 24 has functions of detecting the marks 68 and 69 and further distinguishing the two marks. Further, the control unit 19 shown in FIG. 3 has functions of controlling the writing unit 18 so that the control unit 19 responds to the detection signal supplied by the mark detecting unit 24 differently depending on whether the unit 24 detects the mark 63 or mark 69. In an example of the above different manner of response, the control unit 19 merely prevents the writing unit 18 from printing the relevant reproduced image if the mark 69 is detected and the control unit 19 gives a warning sound in addition to preventing the relevant reproduced image to be printed if the unit 24 detects the mark 68. Thus, the duplicator is convenient.

Each of the duplicators in the seventeenth, eighteenth, nineteenth and twentieth embodiments uses an approximately point-symmetrical formation such as a respective one of marks shown in FIGS. 26A, 26B, 26C and 26D, respectively, as the duplication preventing mark to be detected by the mark detecting unit 24 and to be generated by the mark generating unit 25. A point-symmetrical formation is such that a formation is identical after being rotated by 180°. By using such a duplication preventing mark, the mark can be easily detected even if the size of an original image including the mark is changed through the relevant duplicator, as described in the description of the duplicator in the first embodiment with reference to FIGS. 7, 8 and 9.

It is possible and is included in the scope of the present invention that the duplicator has the functions of generating the duplication preventing mark being thus printed together with a relevant reproduced original image but does not have the functions of preventing a reproduced original image having the duplication preventing mark formed therein from being printed out.

Figure 27A:
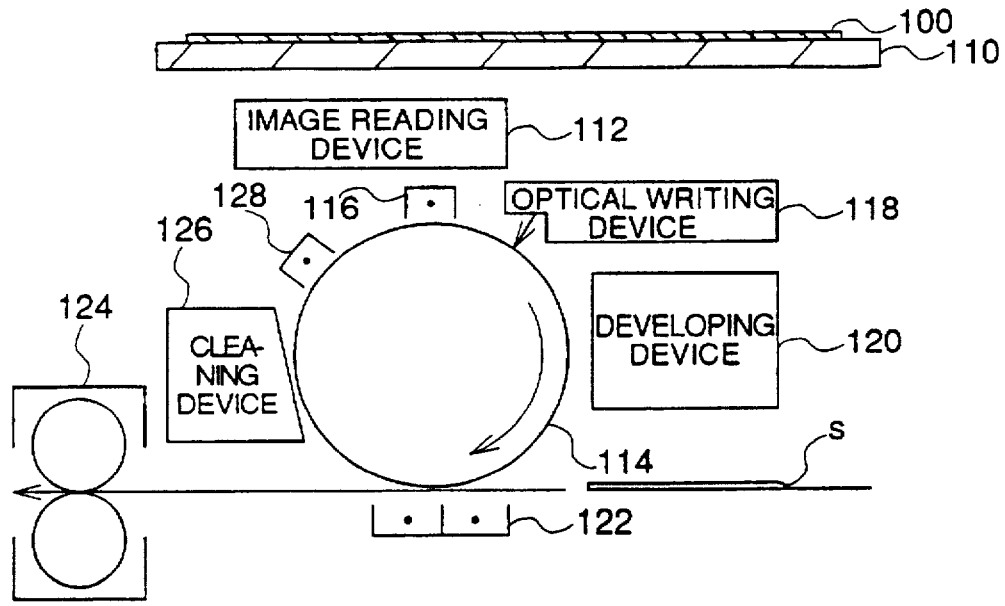
FIG. 27A shows a general construction of a duplicator in a twenty-first embodiment of an image forming apparatus according to the present invention.

With reference to FIG. 27A, processes in an ordinary duplication mode in a digital duplicator in a twenty-first embodiment of the present invention will now be described.

An operator puts a sheet 100 having an original image formed thereon on an original sheet glass 110 and then specifies an image duplication operation to the duplicator. Thus an image reading device 112 reads the original image 100 and thus converts the read image into the signal representing the image. The reading device 112 uses known image reading technology using a CCD. A drum-shaped photosensitive body 114 is rotated in a direction, clockwise, indicated by an arrow shown in the figure. A charger 116 charges the photosensitive body 114 uniformly. An optical writing device 118 writes the relevant reproduced image on the photosensitive body 114 using the above signal. The optical writing device 118 uses a system in that a laser beam scans on the photosensitive body appropriately.

Such an image writing operation forms the relevant electrostatic latent image on the photosensitive body 114. The latent image is developed through the developing device 20 so that the relevant toner image is formed on the photosensitive body 114. The toner image is transferred to a recording sheet S through transferring means 122, the thus transferred toner image being then fixed on the recording sheet through a fixing device 124. The recording sheet having the fixed toner image thereon is then ejected from the duplicator as a copy. The residual toner on the photosensitive body 114 is then removed by a cleaning device 126 and the charge on the photosensitive body 114 is removed by a charge remover 128 in an alternating-current charge removing manner.

Figure 27B:
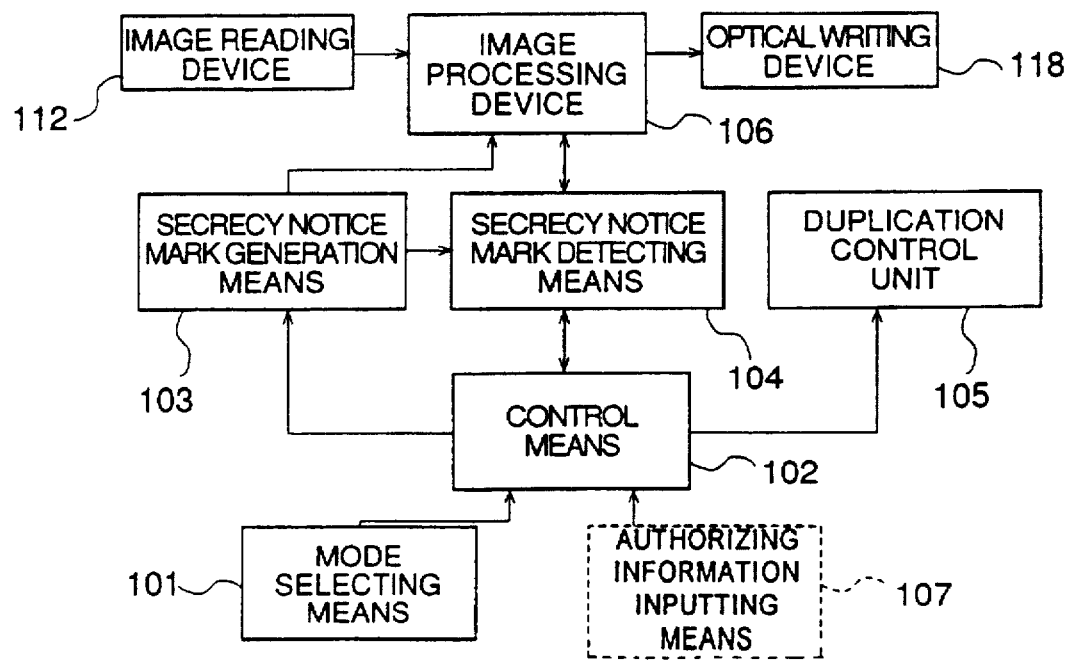
FIG. 27B shows a block diagram illustrating essential functions of the above duplication the twenty-first embodiment.

With reference to FIG. 27B, a functional block diagram of the above duplicator in the twenty-first embodiment of the present invention will now be described. A mode selecting means 101 is a part of an operating unit. Operator's pressing a button, provided in the operation unit and having an indication 'confidential document duplication' formed thereon, causes the mode selecting means 1 to select a 'confidential document duplication mode', the mode selecting means 1 thus supplying a relevant selection signal. After the confidential document duplication mode has been thus selected, control means 102 controls a duplication control unit 105 so that an duplication process according to the above selection signal is started in the duplicator as will now be described.

The above image reading device 12 reads an original image 100 placed on the original sheet glass 110 as mentioned above. The above original image 100 is an 'original confidential image' having no secrecy notice mark formed thereon. The image thus read in is supplied to an image processing device 106 performing a noise removal process and so forth on the image. Thus, the image processing device 106 converts the image into a signal, for writing the relevant image, being supplied to the optical writing device 118.

The above image processing device 106 simultaneously supplies an electronic image (an image represented by an electronic signal) to a secrecy notice mark detecting means 104. Since the above original confidential image has no secrecy notice mark as mentioned above, the secrecy notice mark detecting device 106 detects no secrecy notice mark in the supplied electronic image.

The control means 102 causes a secrecy notice mark generating means 103 to generate a secrecy notice mark or the like from among three, for example, marks previously stored in the confidential generating means 103. The three marks are a 'secrecy', mark, a 'strict secrecy' mark, and a 'firm secrecy' mark, for example, and any one of the three marks may be selected by an operator. In this example, the former two marks, that is, the secrecy mark and strict secrecy mark, are the secrecy notice marks and the last firm secrecy mark is a simple attention mark.

If an operator selects the above strict secrecy mark, the information representing the character series STRICT SECRET and information indicating a printing position for the character series is supplied to the image processing device 106. The printing position may be a predetermined fixed position and alternatively it may be a position selected from among various positions. The image processing device 106 integrates the supplied character series with image information obtained as a result of reading the original confidential image through the image reading device 112 as described above. The thus integrated information is supplied to the optical writing device 118. Processes subsequent to the above processes are identical to those in the ordinary duplication mode as described above. Thus, the image is printed out through the optical writing device 118, the image being identical to the original confidential image and including the character series STRICT SECRET at the above printing position in the image.

If an duplication operation is repeated in the confidential document duplication mode, that is, if an original confidential image such as that mentioned above is replicated more than once in the mode, a secrecy notice mark such as the above character series STRICT SECRET is added to each copy produced by the repeated duplication operations.

Copies, each being produced as a result of adding a secrecy notice mark such as STRICT SECRET to an original confidential image such as that mentioned above as described above, will be referred to as effectively confidential copies, hereinafter. An operation performed in the above duplicator in a case where an effectively confidential copy is used as an original image to be replicated. In the ordinary duplication mode, the effectively confidential copy read in through the image reading device 112 is processed ordinarily in the original processing device, then being supplied to the secrecy notice mark detecting means 104.

The detecting means 104 checks whether or not an electronic image corresponding to the effectively confidential copy includes any of the previously stored secrecy notice marks. This checking is made using a pattern matching technology, for example. The secrecy notice mark generating means 104 generates the above previously stored secrecy notice marks then being supplied to the detecting means 104 for the checking. If the detecting means 104 detects presence of a secrecy notice mark in the electronic image, the means 104 informs the detection to the control means 102. The control means 102 thus controls the duplication control unit 105 so that a duplication operation is prevented from being performed on the electrical image, that is, the duplicator enters into a duplication preventing state. Then, the control means 2 controls the operation unit so that a panel of the operation unit displays 'NO DUPLICATION MADE SINCE DOCUMENT IS CONFIDENTIAL, for example, thereon.

A secrecy notice mark to be detected through the above detecting means 104 is a mark previously formed on an effectively confidential copy such as that mentioned above by means of the secrecy notice mark generating means 103 after selecting from the marks previously stored therein as described above. Since the number of the reference marks (previously stored marks) is thus limited, the detection, that is, the comparison of a confidential copy with the reference marks, can be made easily, thus being made within a short time period.

Lifting the above duplication preventing state so as to enable duplicating of a confidential copy will now be described. There is an authorizing information inputting means 107 shown in FIG. 27A for this purpose. The authorizing information is information to be used to lift the above duplication preventing state. The authorizing information indicates the authorization of the duplication of the effectively confidential copy and thus causes the duplicator to allow the duplication of the relevant effectively confidential copy. This authorizing information thus is kept by authorized persons and may be a code number, ID-card stored information, or the like. Information input through the above authorizing information inputting means is then checked by the control means 102 so that it is determined whether or not the input information is the proper authorizing information. If the input information is the proper authorizing information, the control means 102 controls the duplication control unit 105 so that the above duplication preventing state is lifted.

Among blocks shown in FIG. 27B, all blocks other than the image reading device 112 and the optical writing device 118 can be formed by a computer. If these blocks are formed by a computer, it is possible, merely by providing appropriate software programs, to embody the above-described processes so that the processes can match various practical applications.

Figure 30:
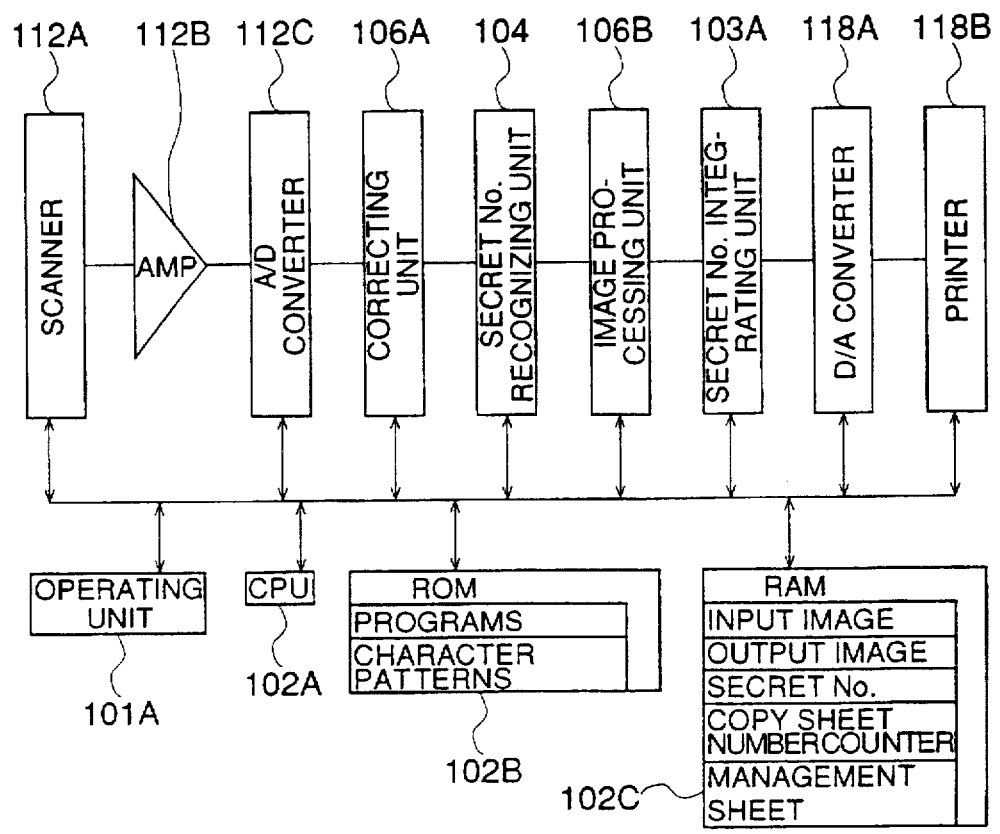
FIG. 30 shows a detailed block diagram in an example of the formation shown in FIG. 27B.

With reference to FIG. 30, the duplicator in the twenty-first embodiment of the present invention will now be detailed. An operating unit 101A is a unit for an operator to specify operations to be performed by the duplicator and includes the mode selecting means 101 shown in FIG. 27B. A scanner 112A, an amplifier 112B, and an analog to digital converter 112C are included in the above image reading device 112. A CPU 102A, a ROM 102B and RAM 102C are included in the above control unit 102.

An image correcting unit 106A for performing a noise removal process and so forth and an image processing unit 106B are included in the above image processing unit 106. A secret number recognizing unit 104 acts as the above secrecy notice mark detecting means 104 and a secret number integrating unit 103A acts as the above secrecy notice mark generating unit 102. A digital to analog converter 118A and a printer 118B are included in the above optical writing device 118.

A concrete duplication example made in the duplicator in the twenty-first embodiment of the present invention will now be described with reference to FIGS. 28A, 28B, 28C and 28D. In this example, an original confidential image 100 of a confidential document, being a letterhead for example, shown in FIG. 28A is replicated by the duplicator in the above confidential document duplication mode. As a result of the replication, copies c1, c2, c3, c4 and c5 shown in FIG. 28B are produced, for example. In this example, the five number of copies c1, c2, c3, c4 and c5 correspond to the number of the five destinations of the copies. Thus, the repeat number of the current duplication operation in the confidential document duplication mode is 5.

Each of the copies c1, c2, . . . , c5 has secret notice marks, being a secrecy mark 'SECRET' MS, enclosed in a rectangle as shown in the figure, and a secret number MN shown in the figure in this example. The secrecy mark 'SECRET' corresponds to the secrecy mark such as that shown in FIG. 19 known in Japan pronounced as maruhi.

The secrecy mark MS is common in all the 5 copies c1 through c5. The secret number MN formed on a copy among the 5 copies is incremented sequentially as the copy is produced repeatedly. That is, the numbers 1 are formed in the first produced copy c1 as shown in the figure, the numbers 2 are formed in the second produced copy c1 (not shown in the figure), . . . , the numbers 5 are formed in the fifth produced copy c5 (not shown in the figure). It is preferable that the secret numbers MN are formed only in the form of an outline of the numeral such as those shown in the figure. In the FIG. 28B example, the total 15 secret numbers MN are printed in the copy c1 as shown in the figure. Thus, secret numbers MN, such as those shown in the figure, present in a copy, do not interfere a reader from reading the contents of the image other than the secret mark MS and secret number MN. Further, the secret numbers are scattered through all the area of each copy of the copies in a predetermined constant density as shown in the figure.

It is preferable in the above confidential document duplication mode that, in addition to the above-described process in which the secret marks MS and secret numbers MN are formed on the copies, a confidential document management sheet such as that shown in FIG. 28C is generated. In the FIG. 28C example, the confidential document management sheet includes a title A, a document sample B, a memorandum C. The document sample B is a top part extracted from the first-page image, of a relevant confidential document, such as the original confidential image shown in FIG. 28A, the top part starting from the top of the confidential document and having a predetermined vertical length from the top as shown in the figure. The memorandum C has contents shown in FIG. 28D therein, the contents being in a form of a table as shown in the figure, the above secret numbers MN being indicated in the left column of the table. Relevant destinations will be filled in the right column of the table. The destinations may be hand-written when the copies are distributed or the destinations may be previously input to the duplicator as one of instructions to be input to the duplicator required when the copies are produced through the duplicator. The sample B is obtained by storing the relevant top part of the first page when the first page of a relevant confidential document is read through the image reading device 112. Instead of using the top part of the first page as the sample B, it is also possible to use a reduced image of the first page for the same purpose.

The contents of such a confidential document management sheet are combination of a part of an original image being produced and secret numbers such as those mentioned above. A program appropriate for producing the confidential document management sheet is previously provided. Using the program and such a combination of the original image part and the secret numbers, the relevant confidential document management sheet is produced after a replicating operation has been completed or when a replicating operation is being completed.

An operation flow of the above-described processes will now be described with reference to FIG. 31. The symbol 'm' shown in a step S1 (the term 'step' being omitted, hereinafter) represents a number of a currently processed page among the total pages of a currently processed document. The duplicator may have an ADF (automatic draft feeder) thereon, the ADF being a device on which pages of document are set, each page thereof being then automatically sequentially transferred into the duplicator to be read page by page. An operator put a document to be replicated on the ADF first if the ADF has been provided. If the start instruction is specified by the operator, then the first page of the document is automatically transferred to the original-sheet glass 110 shown in FIG. 27A from the ADF in this case.

In S2 and S3, an original image positioned on the original-sheet glass 110 is read and is stored in a memory. Suitable image correction operations may be performed on the read image before being stored in the memory. Then, in S4, the read image is checked as to whether or not secrecy notice mark (secrecy character in the figure) is present in the read image. If the secrecy notice mark is not detected in S4, it is determined whether or not the duplicator is in the confidential document duplication mode in S13. If the duplicator is in the ordinary duplication mode, the read image is duplicated in the ordinary manner in S28.

If the duplicator is in the confidential document duplication mode (secrecy duplication mode in the figure) in S13, it is determined in S14 whether or not the image currently being processed corresponds to the first page of the document. If the currently processed image corresponds to the first page of the document, certain conditions are set, in accordance with either the operator's specification made through the operating unit or relevant data given by the CPU as a result of reading from a relevant table, for a secret notice mark, to be added to each page of the document, in S15, S16, S17 and S18. The certain conditions include selection of a secret mark MS of a secrecy notice mark from 'STRICT SECRET' and 'SECRET' as mentioned above, selection of a location (from among the top-right as shown in FIG. 18B, the top-left, or the top-center in the copy) and a character type of the secret mark MS, dot formation, size, halftone density and so forth of the secret numbers MN. It is also possible to eliminate the selection of the location of the mark MS, the position being thus previously determined to be the top right as shown in FIG. 28B for example.

Then, in S19, S20, S21, S22, S23 and S24, the first page of the document is processed/replicated repeatedly until a current repeat number n shown in the figure reaches a preset repeat number, the current repeat number being initially 1 and incremented by 1 each time the process is repeated in S24. The preset repeat number previously set by the operator corresponds to the number as to how many times each page of the document is finally replicated. In each cycle, the first page of the document is duplicated in S22. A secret number MN, such as that mentioned above, appropriate to the current repeat number n, is formed in the duplicated images in S20 and S21 as described above in each repetition cycle.

After the above repetition has been completed for the first page of the document, if the above ADF was previously provided, the duplicator checks whether or not any pages are present in the ADF in S25. If the ADF was not provided in the duplicator, the duplicator always recognizes a document includes only the first page. If any pages of the document are present in the ADF in S25, the above number of a currently processed page among the total pages of the document is incremented by 1. Thus, the above process for the first page is repeated for each page of the remaining pages of the document. Thus, each page of all the pages of the document is replicated in the above present repeat number. The above process for the first page to be repeated as mentioned above is the process consisting of S26, S2, S3, S13, S14, S19, the repetition of S20, S21, S22, S23 and S24 as described above, and S25. After all the pages of the document have been thus replicated, a confidential document management sheet such as that shown in FIG. 28C is output in S27. Thus, the current replication operation has been completed. It is possible to print out relevant authorizing information such as that described above in the confidential document management sheet for a remark.

If the secrecy notice mark is detected in S4, S5 displays, through the above operation unit, that no duplication operation is performed on a original image (document) without authorizing information being input, since the original image corresponds to a confidential document. If information is input as an authorizing information in S6, S7 determines whether or not the thus input information is the proper authorizing information. If the input information is not the proper authorizing information, the current duplication operation is terminated in S12.

If the input information is the proper information in S7, a duplication operation is carried out in S8, S9, S10 and S11. In the duplication operation, since the relevant original image corresponds to the confidential document, the duplicator only once duplicates the original image, and the remaining pages of the relevant document if the ADF was provided, that is, only one copy can be made for each one original page, in S8, for the reason described below. In the duplication operation, the duplicator deletes the secrecy notice mark present in the original image in S9 and a new secrecy notice mark is added to the original image in S10, the resulting image being then printed out in S11. The reason for performing such a deletion of an existing secrecy notice mark and addition of a new mark will now be described. An image quality can be improved as a result of using an image of a mark having been stored in a memory instead of using an image of a mark which has been obtained by optically reading, through a CCD, the mark present on the original.

The reason why only one duplication of an original is allowed in the above duplication operation will now be described. Duplication of such a confidential document should be strictly controlled so as to prevent the relevant secret information from leaking. Thus, effectively confidential copies such as those described above obtained as a result of replicating the relevant original confidential image should not be further duplicated. However, there may be a very exceptional case where an effectively confidential copy should be further duplicated in a rightful reason. Thus, the duplicator in the twenty-first embodiment of the present invention allows the further duplication of an effectively confidential copy. However, the duplication is allowed only if proper authorizing information is input to the duplicator and also only one copy is allowed to be produced in the duplication even if a proper authorizing information is input, due to the above reason.

Figure 29:
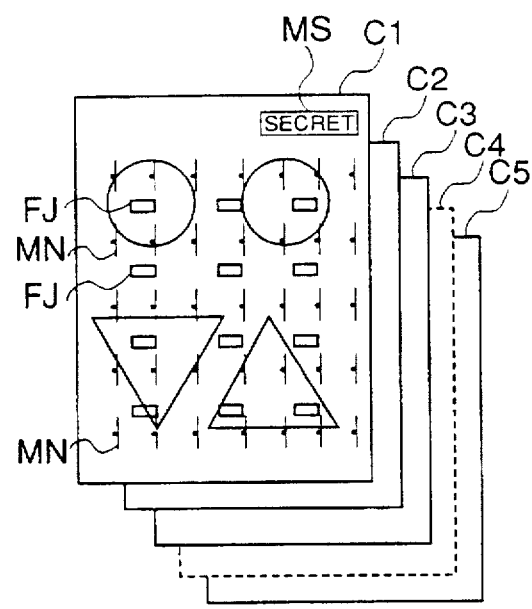
FIG. 29 illustrates sheets obtained as a result of duplicating a confidential document in a duplicator in a twenty-second embodiment of an image forming apparatus according to the present invention, in a manner in which authorizing information is included in a secrecy notice mark.

A duplicator in a twenty-second embodiment of an image forming apparatus according to the present invention will now be described. The difference between the duplicators in the twenty-first and twenty-second embodiments is that the duplicator in the twenty-first embodiment uses a secrecy notice mark consisting of a secret mark MS and a secret number MN such as those shown in FIG. 28B and the duplicator in the twenty-second embodiment uses a secrecy notice mark consisting of authorizing information FJ such as that described above as well as a secret mark MS and secret numbers MN as shown in FIG. 29. In FIG. 29, the two circles located at the top half and two triangles located at the bottom half in the copy c1 represent the image which has been present at a relevant original confidential image before the above marks MS, MN and FJ are added thereto. That is, the circles and triangles represent the essential contents of the original confidential image.

Such authorizing information FJ is first input through authorizing information inputting means such as the authorizing information inputting means 107 shown in FIG. 27B. At the inputting time, the authorizing information is a four-digit number, for example, and is then converted, in the duplicator, into another form in which the authorizing information cannot be read when it is simply seen. The above form is such as yellow characters difficult to be seen, a bar code, a fractal pattern, a scramble figure or the like which is difficult to be interpreted, the thus converted form being thus added to a relevant original image in the duplicator. The formation of authorizing information in inputting time is not limited to the four-digit number and may be one of variations such as a series of alphabetic characters, a series of alphanumeric characters, and so forth.

An operation flow of the above operation in the duplicator in the twenty-second embodiment will now be described with reference to FIGS. 32 and 33. Only differences between the operation flow shown in FIG. 31 and the operation flow shown in FIGS. 32 and 33 will be described. Except for the differences, these two operation flows are substantially identical.

Figure 31:
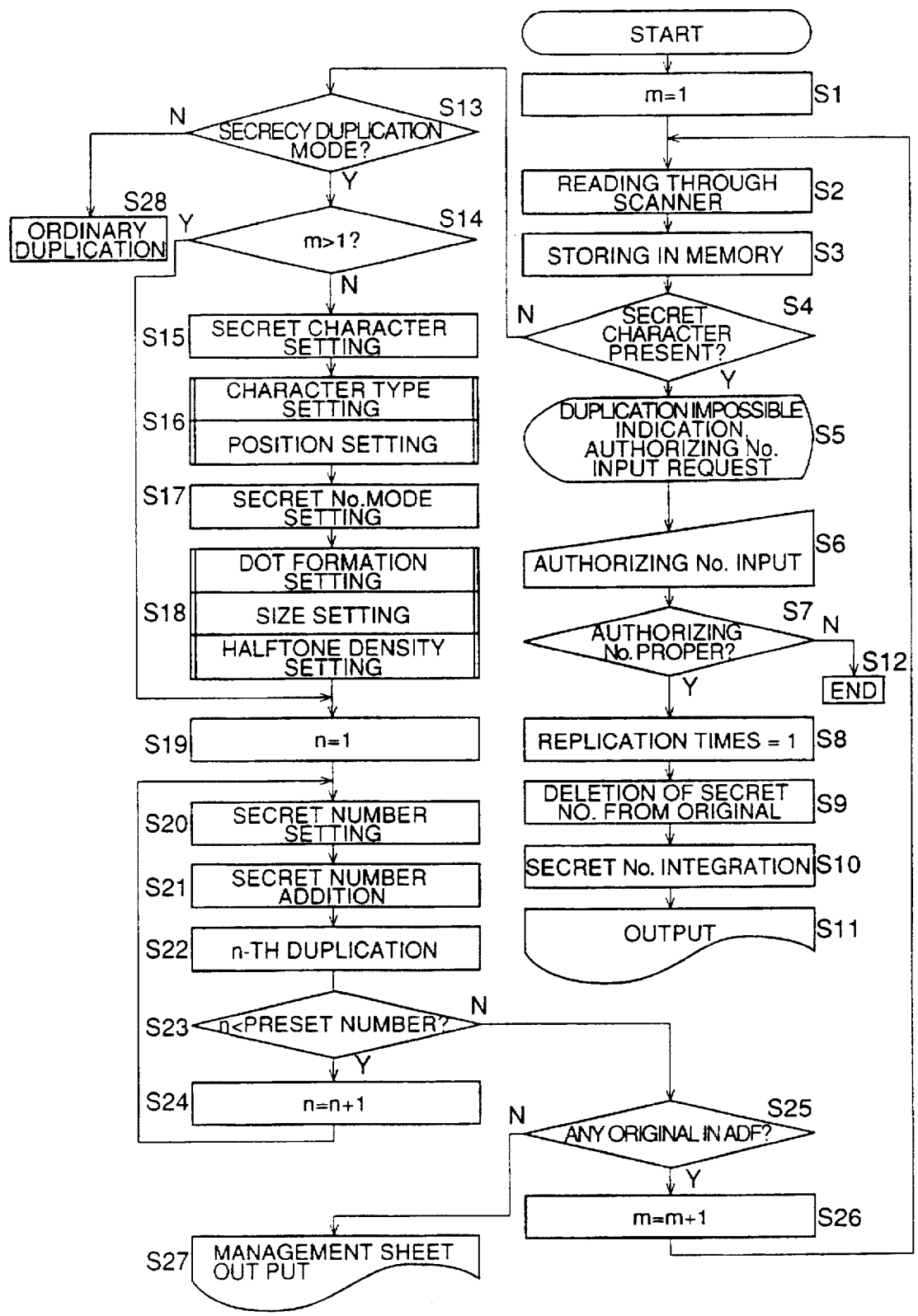
FIG. 31 shows an outline of a duplication operation flow of confidential document duplication mode in the above duplicator in the twenty-first embodiment.
Figure 33:
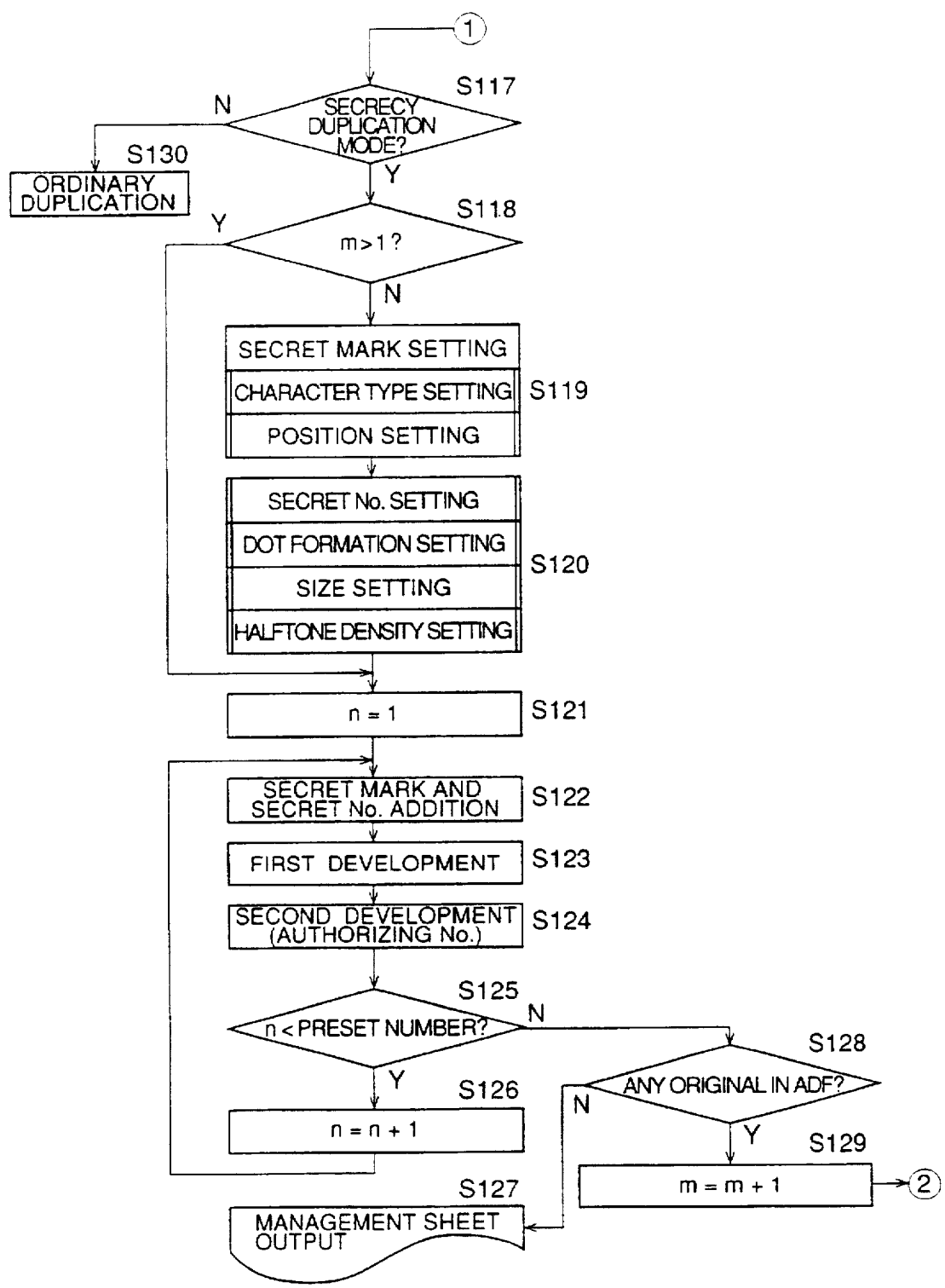

In the duplication step corresponding to the duplication step S22 shown in FIG. 31 carried out by the duplicator in the twenty-first embodiment, the duplicator in the twenty-second embodiment in particular carries out two development operation steps S123 and S124 shown in FIG. 33. In the first development operation step S123, the image consisting of the relevant read-in original image and the secret mark MS and MN added to the original image in S122 is developed in the ordinary development manner. In the second development operation step S124, the above-mentioned authorizing information FJ is developed in a special development manner so that the authorizing information FJ is developed as a yellow image as mentioned above for example. Thus, it is difficult for an unauthorized person to see the thus printed authorizing information.

Figure 32:
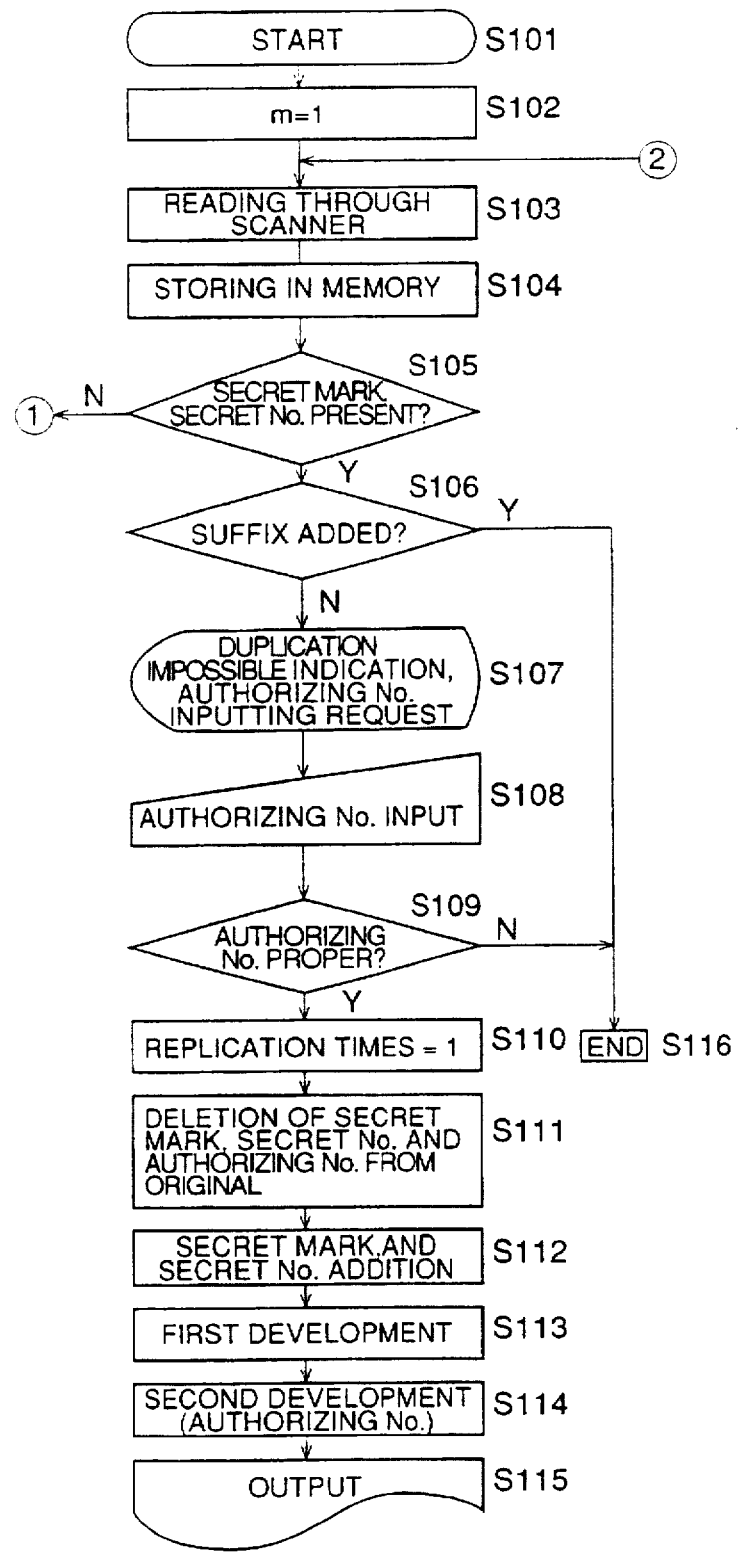
FIGS. 32 and 33 show an outline of a duplication operation flow of confidential document duplication mode in the duplicator in the twenty-second embodiment.

Further, after the secret mark detecting step S105 shown in FIG. 32 corresponding to the step S4 shown in FIG. 31, the duplicator in the twenty-second embodiment in particular carries out a suffix detecting step S106 shown in FIG. 32 if S105 detects the secret notice mark. A suffix is added in S112 to the secret number MN to be added to the duplicated image produced by further duplication of an effectively confidential copy such as that described above. The purpose of adding such a suffix will now be described. It is expected that it will be difficult for the person, originally having produced an original confidential document, to control a copy (referred to as a second copy) produced by further duplicating of an effective confidential copy of the original confidential document. That is, the person may not prevent an unforeseen person from duplicating such a second copy. Thus, second copies should be inhibited from being further duplicated. For this purpose, the duplicator in the twenty-second embodiment adds a suffix to the secret number MN to be added to a second copy. For example of such a suffix, a suffix 'A' is added to the secret number MN such as '1' as shown in FIG. 28B so that the resulting secret number MN is '1A'. If a plurality of second copies are produced from an effectively confidential copy having the secret number MN '1', the second copies have the respective secret numbers MN '1A', '1B', '1C', ..... In this case, 'A', 'B', 'C', .... act as the suffixes.

If such a suffix is detected in S106 shown in FIG. 32, the current duplication operation is terminated in S116 then outputting a message, to the present operator, 'This confidential document cannot be duplicated in this duplicator.

Please request the authorized person to provide the copy.' Thus, a second copy cannot be further duplicated in the duplicator even if the proper authorizing information is input. Thus, the duplicator in the twenty-second embodiment of the present invention is effective to prevent the relevant secret from leaking.

If no such a suffix is detected in S106, process starting from S107, substantially identical to the corresponding process starting from S5 shown in FIG. 31 is carried out. However, in S112, as mentioned above, the duplicator produces a secret number obtained as a result of adding an appropriate suffix such as that mentioned above to the secret number originally included in the read-in image. Then, the duplicator carries out two development operation steps S112 and S113, similar to the above described S123 and S124, for the relevant image.

In addition to the above-described functions of the duplicators in the twenty-first and twenty-second embodiments of the present invention, it is preferable that each of the above duplicators has functions being described. There may be a case where an original confidential document is first duplicated/replicated in the duplicator and after that, second duplication/replication of the original confidential document is demanded. In such a case, it is necessary to check the secret number MN added to the last replicated copy in the first replication occasion. Thus, a secret number MN obtained by incrementing the above checked secret number MN by one is added to the first replicated copy in the second replication occasion. Thus, the all copies produced by the first and second replication occasions have the properly sequential secret numbers MN. In order to enable the above operation. It is necessary for the duplicator to have functions allowing operator's inputting of an initial secret number MN, other than 1, the thus input initial secret number being then used as a secret number to be added to the first copy. The secret number to be added to the current copy is then incremented by one as the subsequent copy is produced as described above.

Figure 34:
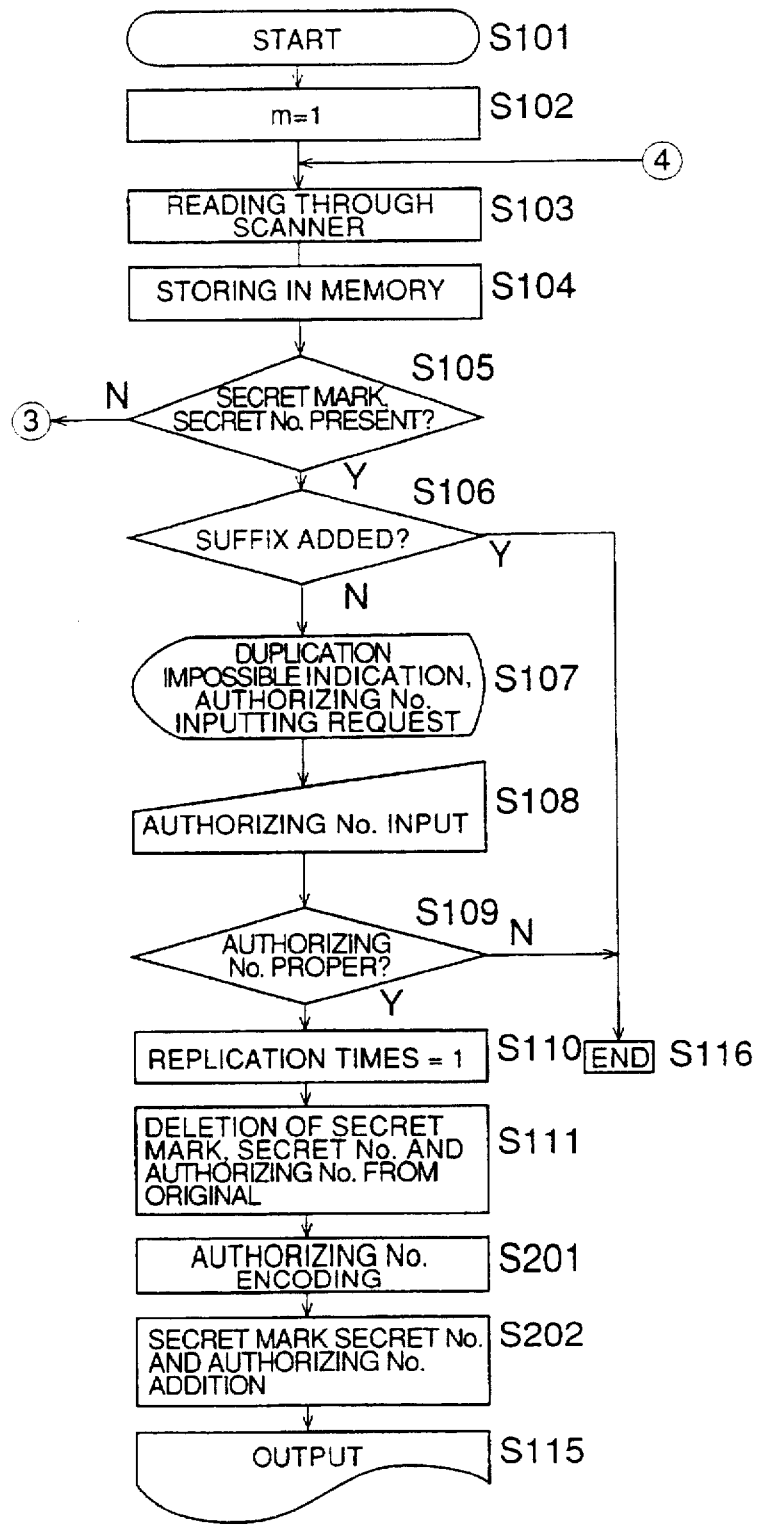
FIGS. 34 and 35 show an outline of a duplication operation flow of confidential document duplication mode in the duplicator in a twenty-third embodiment of an image forming apparatus according to the present invention.
Figure 35:
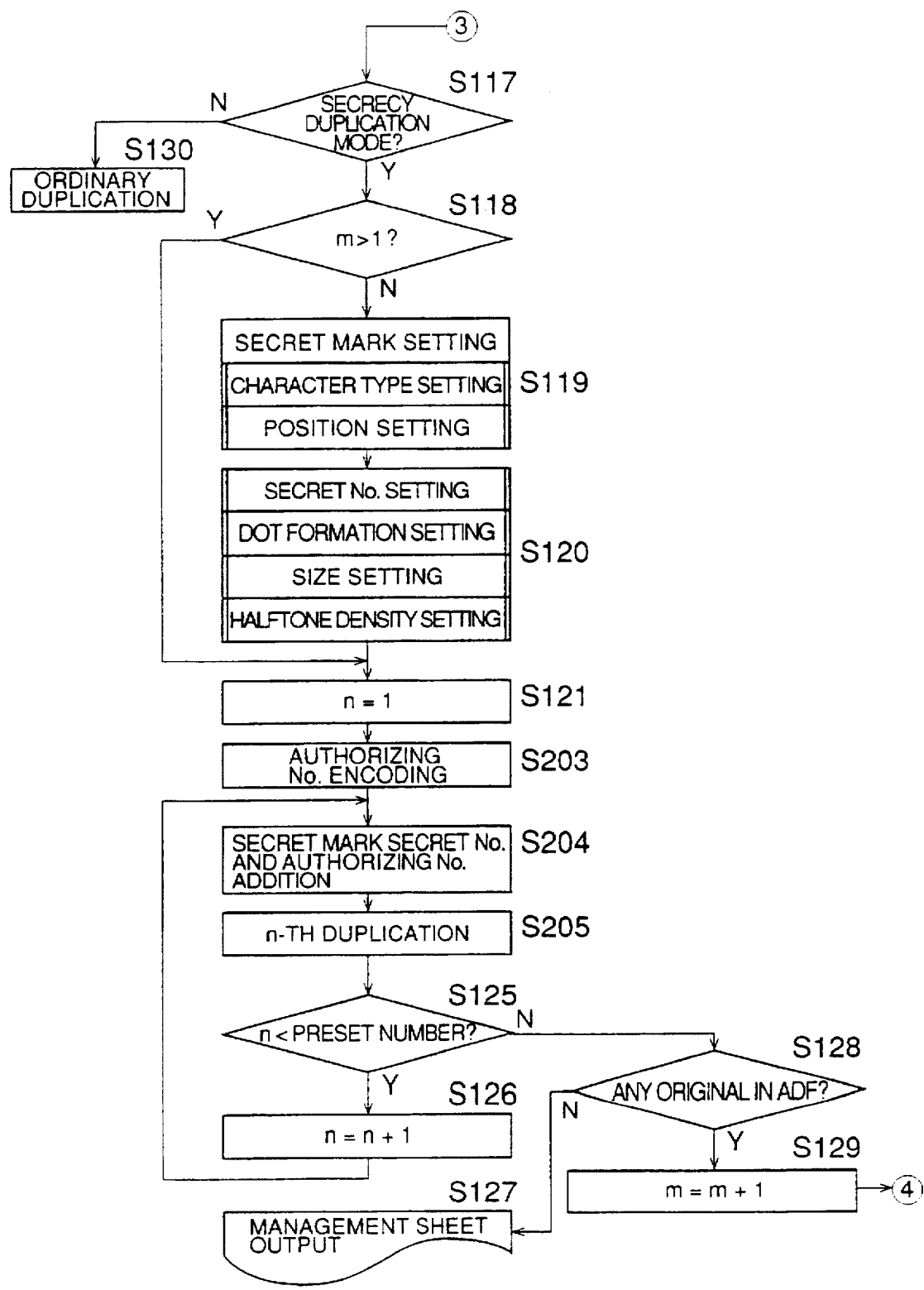

A duplicator in a twenty-third embodiment of an image forming apparatus according to the present invention will now be described with reference to FIGS. 33 and 34. Excepting differences, as will be described, between the duplicators in the twenty-second and twenty-third embodiments, these two duplicators are substantially identical. The differences are that instead of developing authorizing information such as that described above as a yellow image in the duplicator in the twenty-second embodiment as mentioned above, the duplicator in the twenty-third embodiment encodes such authorizing information either in S203 before the thus encoded authorizing information is added to the image in S204 or in S201 before the encoded authorizing-information addition step S202. As a result of the authorizing-information encoding, it is not needed to carry out two development operation steps and a single development operation step either S115 or S205, is sufficient in the duplicator in the twenty-third embodiment since a special color image such as a yellow image is not needed. By encoding authorizing information, an unauthorized person cannot read the printed authorizing information.

Further, each of the duplicators in the twenty-second and twenty-third embodiments uses a suffix such as described above for the purpose of preventing second copies such as those described above from being duplicated as described above. However, instead of using a suffix, it is also possible to use another method as will be described for the same purpose in the two duplicators. Either before S114 shown in FIG. 32 relevant authorizing number (authorizing information) is encoded so that the thus encoded authorizing number is present in the thus produced second copy or in S201 shown in FIG. 34 relevant authorizing number (authorizing information) is further encoded so that the thus further encoded authorizing number is present in the thus produced second copy. If the thus produced second copy is attempted to be further duplicated in each duplicator, S109 determines that the authorizing number present in the copy is not a proper one, that is, the authorizing number is not the valid number, accordingly. Thus, second copies are prevented from being further duplicated.

Duplicators in twenty-fourth, twenty-fifth, twenty-sixth, twenty-seventh, twenty-eighth, twenty-ninth and thirtieth embodiments of an image forming apparatus according to the present invention will now be described with reference to FIGS. 36A, 36B, 37, 38, 39, 40, 41, 42, 43, 44A through 44J, 45A through 45J, 46A through 46J, 47A through 47J and 48A through 48H.

Figure 36A:
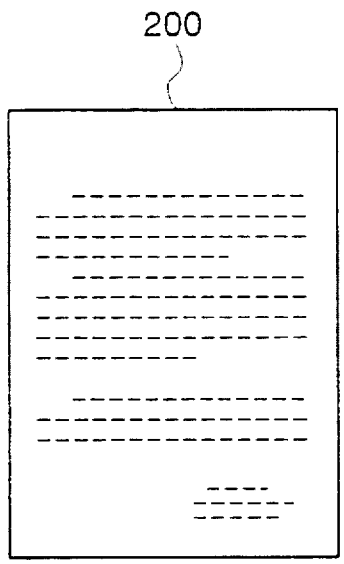
FIGS. 36A and 36B illustrate an original confidential document and sheets obtained as a result of duplicating the above confidential document by means of any one of duplicators in a twenty-fourth, twenty-fifth, twenty-sixth, twenty-seventh, twenty-eighth, twenty-ninth and thirtieth embodiments of an image forming apparatus according to the present invention.
Figure 36B:
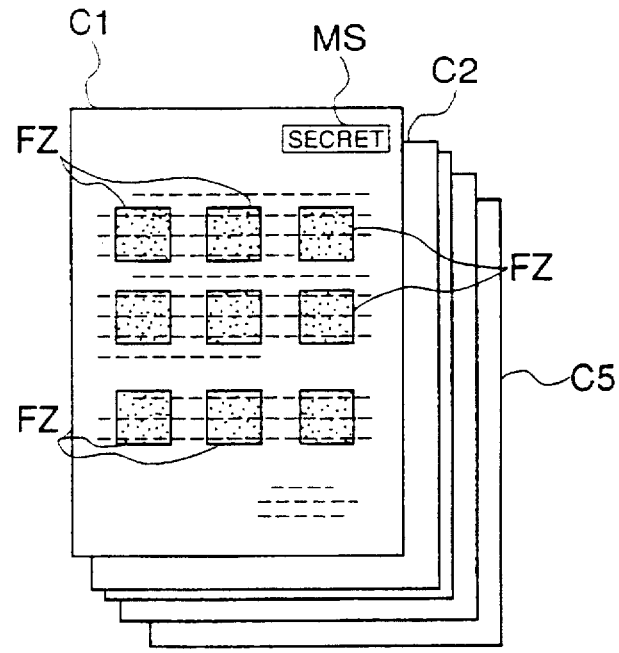

FIG. 36A shows an original confidential document 200. Each of the duplicators in the twenty-fourth through thirtieth embodiments produces effectively confidential copies such as those c1, c2, . . . shown in FIG. 36B from the document 200. Each of the copies c1, c2, . . . has an image formed thereon identical to the original image present in the document 200 together with authorizing figures FZ integrated with the image identical to the original image as shown in FIG. 36B. It is also possible for each duplicator to have functions of further adding a secret mark MS and/or secret number(s) MN such as those shown in FIG. 29 and described above, as shown in FIG. 36B. A process needed for adding such mark/number MS/MN is identical to that described above so that the description thereof will be omitted. A process needed for forming/recording of such an authorizing figure as that FZ will now be described. As described below, such an authorizing figure may have a function of lifting a once entered duplication preventing situation and may have a function of preventing a read-in image including the authorizing figure from being duplicated. Thus, the authorizing figure may act as a preventing/authorizing figure (prevent/authorize figure).

Figure 37:
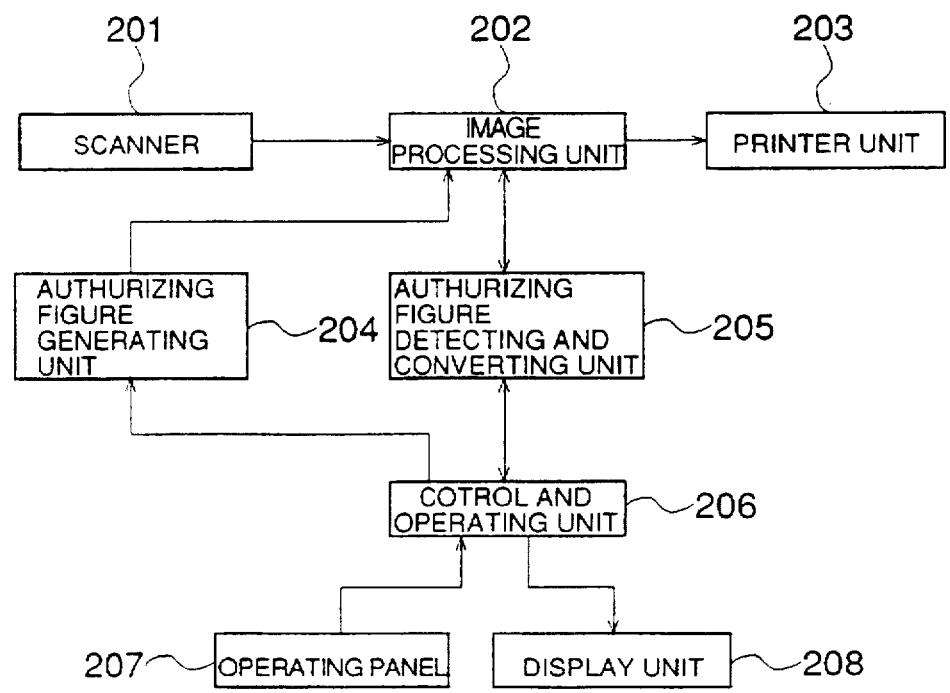
FIG. 37 shows a block diagram illustrating essential functions common to duplicators in the twenty-fourth, twenty-fifth, twenty-sixth, twenty-seventh, twenty-eighth, twenty-ninth and thirtieth embodiments.
Figure 38:
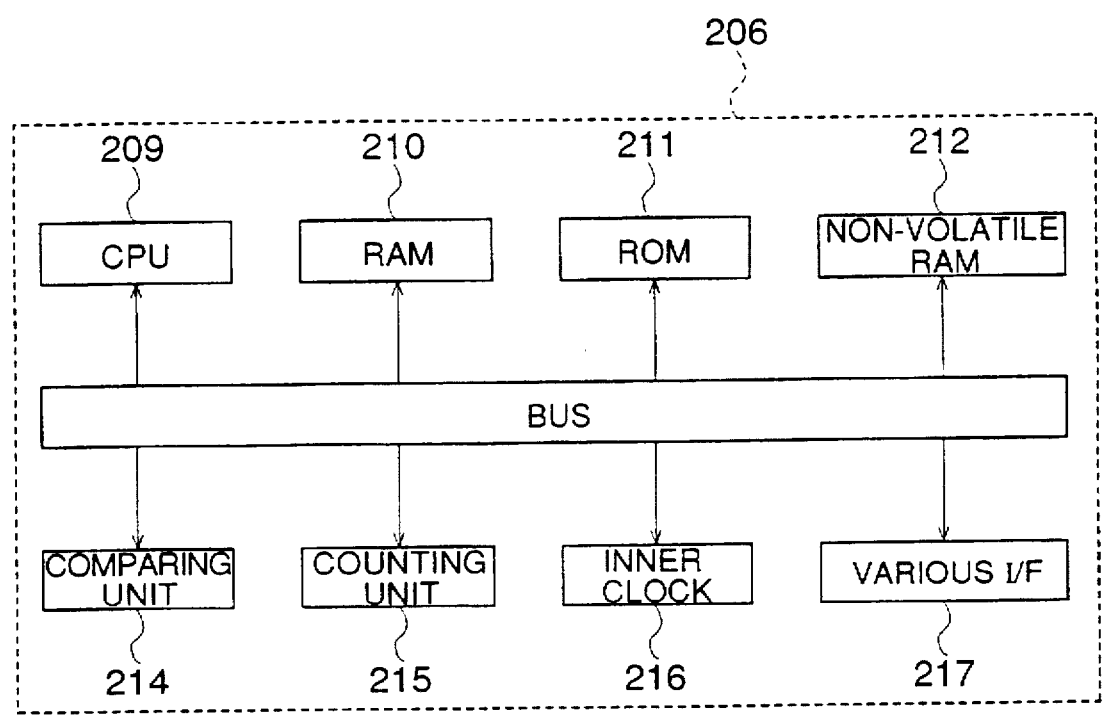
FIG. 38 shows a block diagram of a control/operation unit shown in FIG. 37.
Figure 39:
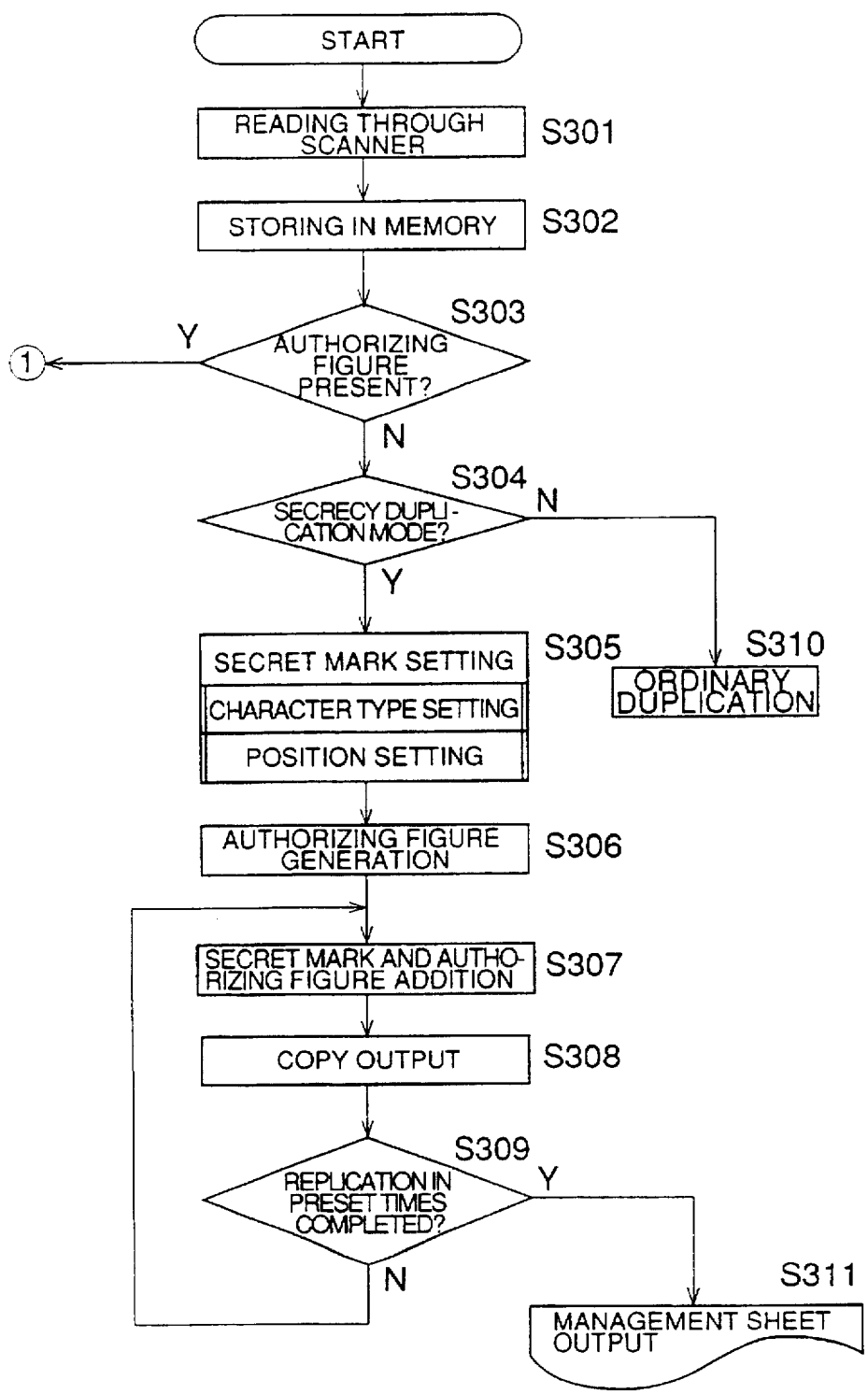
FIG. 39 shows an outline of a partial image forming operation flow common to the above duplicators in the twenty-fourth, twenty-fifth, twenty-sixth, twenty-seventh, twenty-eighth, twenty-ninth and thirtieth embodiments.
Figure 40:
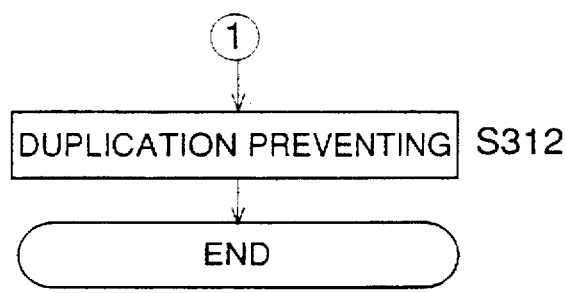
FIGS. 40, 41 and 42 show outlines of partial image forming operation flows in the above duplicator in the above twenty-six, twenty-seventh, and twenty-eighth embodiments.

Each duplicator has a construction substantially identical to that shown in FIG. 27A. With reference to FIGS. 37, 38 and 39, a common operation flow for embodying respective functions of the above embodiments will now be described. Since the duplicator in the twenty-fourth embodiment does not necessarily search for such an authorizing figure, an authorizing figure detecting and converting unit 205 is necessarily provided in the duplicator. Thus, an image processing unit 202 is assumed to directly communicate with a control and operating unit 206, hereinafter.

With reference to FIG. 37, an operating panel 207 is used for an operator to specify a confidential document duplication mode such as that described above. If the operator thus specifies the confidential document duplication mode, the control and operating unit 206 receives the relevant signal from the operating panel 207 so as to cause a current duplication mode in the duplicator to be the confidential document duplication mode. Thus, the operating panel 207 and control and operating unit 206 together constitute mode selecting means.

The operating panel 207 is formed so that an operator may input various sorts of information to the duplicator. The various sorts of information include authorizing-figure information, duplication-instruction information such as replication number (as to how many copies are required from the original), addition of a secrecy notice mark, copy-image density, size changing ratio and so forth. In the FIG. 36B example, the above replication number has been specified as 5 so that the 5 copies c1, c2, . . . , c5 are produced. The operating panel 207 supplies the thus input various sorts of information to the control and operating unit 206 thus controlling components of the duplicator appropriately according to the various sorts of information. The components to be controlled include an authorizing information generating unit 204 thus generating an appropriate authorizing figure. Thus, the operating panel 207 and control and operating unit 206 together constitute authorizing-figure information inputting means. Further, the control and operating unit 206 and authorizing figure generating unit 204 together constitute converting means converting authorizing-figure information input through the above authorizing-figure information inputting means into an authorizing figure signal.

A scanner 201 corresponding to the image reading device 112 shown in FIG. 27A reads an original image accordingly in S301 shown in FIG. 39. The image information representing the image present on the original confidential document 200 read through the scanner 201 is sent to the image processing unit 202 and thus undergoes suitable correction such as gamma correction and shading correction in the unit 202. The resulting image information is stored in a memory provided in the image processing unit 202 as read-in signal in S302 shown in FIG. 39.

An authorizing figure signal generated by the authorizing figure generating unit 204 is integrated with the above read-in signal through the image processing unit 202 so as to be supplied to a printer unit 203 thus writing the relevant image on a recording sheet. Thus, the image processing unit 202 and printer unit 203 together constitute writing means corresponding to the optical writing device 118 shown in FIG. 27A.

In S303 shown in FIG. 39, it is checked whether or not an authorizing figure is present in the read-in image. However, as mentioned above, the duplicator in the twenty-fourth embodiment does not necessarily carry out S303. If S303 is omitted, S305 is carried out after the completion of S302. In this example, that is, in the example in which the read-in original confidential document is the document 200 shown in FIG. 36A, the relevant original image does not have an authorizing figure accordingly. Thus, S304 is carried out. S304 determines whether or not the duplicator is in the confidential document duplication mode. The copies shown in FIG. 36B will be produced after the authorizing figures FZ is added therein, if the duplicator is in the confidential document duplication mode. Thus, in accordance with operator's specification, S305 selects one of secret mark from among SECRET, STRICT SECRET, FIRM SECRET, and so forth, for example, and sets printing form/manner of the thus selected mark such as a character type, printing position and so forth of the mark. However, as mentioned above, in each embodiment of the twenty-fourth through thirtieth embodiment, the addition or non-addition of such a secret mark basically depends on the operator's specification.

S306 shown in FIG. 39 produces an authorizing figure signal through the authorizing figure generating unit 204 as mentioned above, in S306. The thus produced signal is integrated with the above read-in signal, as mentioned above, then being further integrated with the signal representing the above secret mark, if the mark has been demanded, in S307. The above signal integration is made in the above memory provided in the image processing unit 202. The resulting signal is sent to the printer unit 203 shown in FIG. 37.

The printer unit 203 writes an image represented by the thus input signal on a recording sheet in S308. Thus, the effectively confidential copy c1 shown in FIG. 36B is obtained. In S307 through S309, such production of an effectively confidential copy through image writing in the printer unit 203 is repeated until the number of the repetition times reaches a preset number previously set by an operator through the operating panel 207 shown in FIG. 37. Thus, the current replication process has been completed.

As shown in FIG. 36B, each of the resulting effectively confidential copies has thereon authorizing figures FZ in addition to an image identical to an image present in a relevant original confidential document. Thus, the presence of such authorizing figures may prevent the effectively confidential copy from being seen clearly. In order to prevent such a problem, it is preferable to form/print such authorizing figures in a low halftone density. Similar to the duplicators in the twenty-first and twenty-second embodiments, the duplicator in each of the twenty-fourth through thirtieth embodiments may have a function of outputting a confidential document management sheet such as that described above in S311 which may be omitted in each of the duplicators in the twenty-fourth through thirtieth embodiments.

If the duplicator is not in the confidential document duplication mode in S304, a current duplication process is carried out in the ordinary manner in S310.

With reference to FIG. 38, the control and operating unit 206 shown in FIG. 37 includes a CPU 209, a RAM 210, a ROM 211, a non-volatile RAM 212, a comparing unit 214, a counting unit 215, an internal clock 216, various interfaces (I/F) 217 (provided for the operating panel 207, scanner 201, printer unit 203 and so forth to communicate with the control and operating unit 206 and a bus 213 provided for the above units to couple with one another. However, the above comparing unit 214 and counting unit 215 are not provided in the duplicators in the twenty-fourth and twenty-fifth embodiments.

The duplicator in the twenty-fourth embodiment has the construction described above and approximately common to the duplicators in the twenty-fourth through thirtieth embodiments.

The duplicator in the twenty-fifth embodiment has a construction identical to the construction of the above-described duplicator in the twenty-fourth embodiment. However, the duplicator in the twenty-fifth embodiment has features for the formation of authorizing figures such as those described above as will be described later with reference to FIGS. 43, 44A through 44J, 45A through 45J, 46A through 46J, 47A through 47J and 48A through 48H.

The duplicator in the twenty-six embodiment will now be described. Features of the duplicator are that the duplicator includes authorizing figure detecting means and control means, and that the control means prevents a current duplication operation if the authorizing figure detecting means detects an authorizing figure. Thus, the duplicator necessarily includes the authorizing figure detecting and converting unit 205 shown in FIG. 37. However, in the duplicator the unit 205 does not have a function of converting. Excepting having the above features, the duplicator is substantially identical to the duplicator in the twenty-fourth embodiment. The description common between the duplicators in the twenty-fourth and twenty-sixth embodiments will be omitted.

The duplicator in the twenty-sixth embodiment, after S303 detects an authorizing figure through the authorizing figure detecting and converting unit 206, a relevant signal is sent to the control and operating unit 206 acting as the above control means. The unit 206 thus prevents the current duplication operation from being executed in S312 shown in FIG. 40.

There may be a case where such a duplicator has a function of duplicating only a part of an original image set on a original-sheet glass such as the original-sheet glass 110 shown in FIG. 27A. Further, it may be that in the above case, an original confidential document is set on the original sheet glass, the document having an authorizing figure within an area of the document. If the duplicator uses the above function so that the duplicator only reads in a part of the document, the part not including the area within which the authorizing figure is present, the authorizing figure cannot be detected in S303. As a result, even the original confidential document cannot be prevented from being duplicated in the duplicator. In order to avoid such a problem, it is preferable for a duplicator, forming an authorizing figure, to scatter a plurality of authorizing figures in an effectively confidential copy. For example of preferable authorizing figure formation, as shown in FIG. 36B, each authorizing figure FZ is a square having dimensions several cm×several cm and 9 figures FZ are scattered in a page as shown in the figure.

The duplicator in the twenty-seventh embodiment will now be described. Features of the duplicator are that the duplicator includes authorizing figure detecting means, authorizing-figure information inputting means, reverse-converting means, comparing unit and control means. If the authorizing figure detecting means detects an authorizing figure, such as described above, in a read-in image, the reverse-converting means reverse converts the thus detected authorizing figure into the authorizing-figure information which should be an origin of the detected authorizing figure. The comparing unit compares the thus obtained authorizing-figure information with authorizing-figure information being input through the authorizing-figure information inputting means. If the two sorts of authorizing-figure information correspond to one another, the control means allows duplication of the read-in image. Thus, the duplicator necessarily includes the authorizing figure detecting and converting unit 205 shown in FIG. 37. Excepting having the above features, the duplicator is substantially identical to the duplicator in the twenty-fourth embodiment. The description common between the duplicators in the twenty-fourth and twenty-seventh embodiments will be omitted.

With reference to FIG. 37, the authorizing figure detecting and converting unit 205 acting as the authorizing figure detecting means checks a signal supplied by the scanner 201 via the image processing unit 202. The checking being carried out in S303 shown in FIG. 39 is to check whether or not a read-in image, converted into the read-in signal in the scanner 201, includes an authorizing figure FZ. If S303 detects an authorizing figure FZ as a result, the authorizing figure detecting and converting unit 205 acting as the reverse-converting means extracts the authorizing figure FZ from the read-in signal and reverse-converts the extracted figure into authorizing-figure information which should be an origin of the extracted figure, as mentioned above. The thus obtained authorizing-figure information, referred to as detected authorizing-figure information, is supplied to the comparing unit 215 in the control and operating unit 206.

Figure 41:
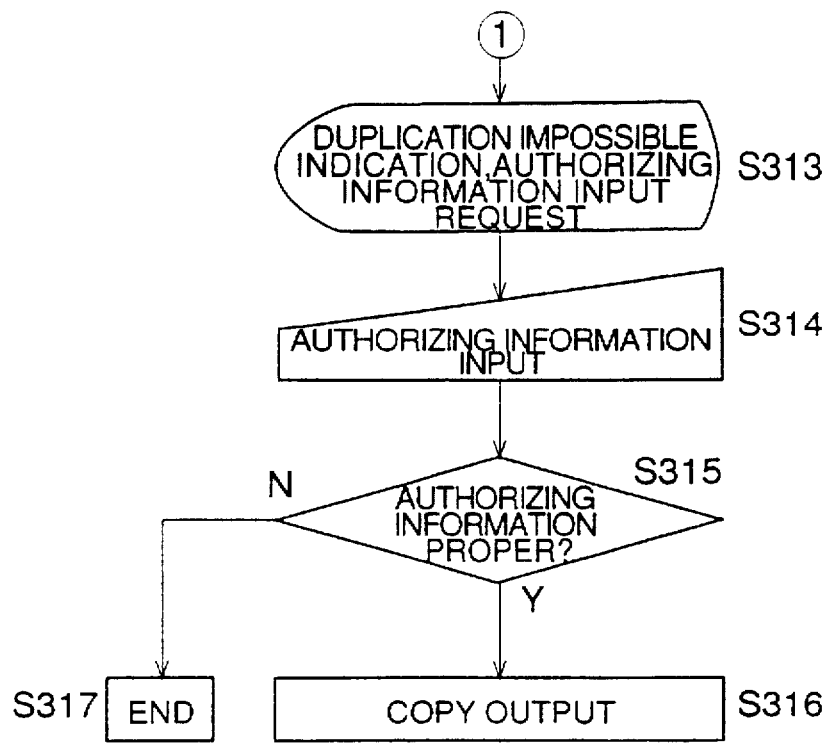
Figure 42:
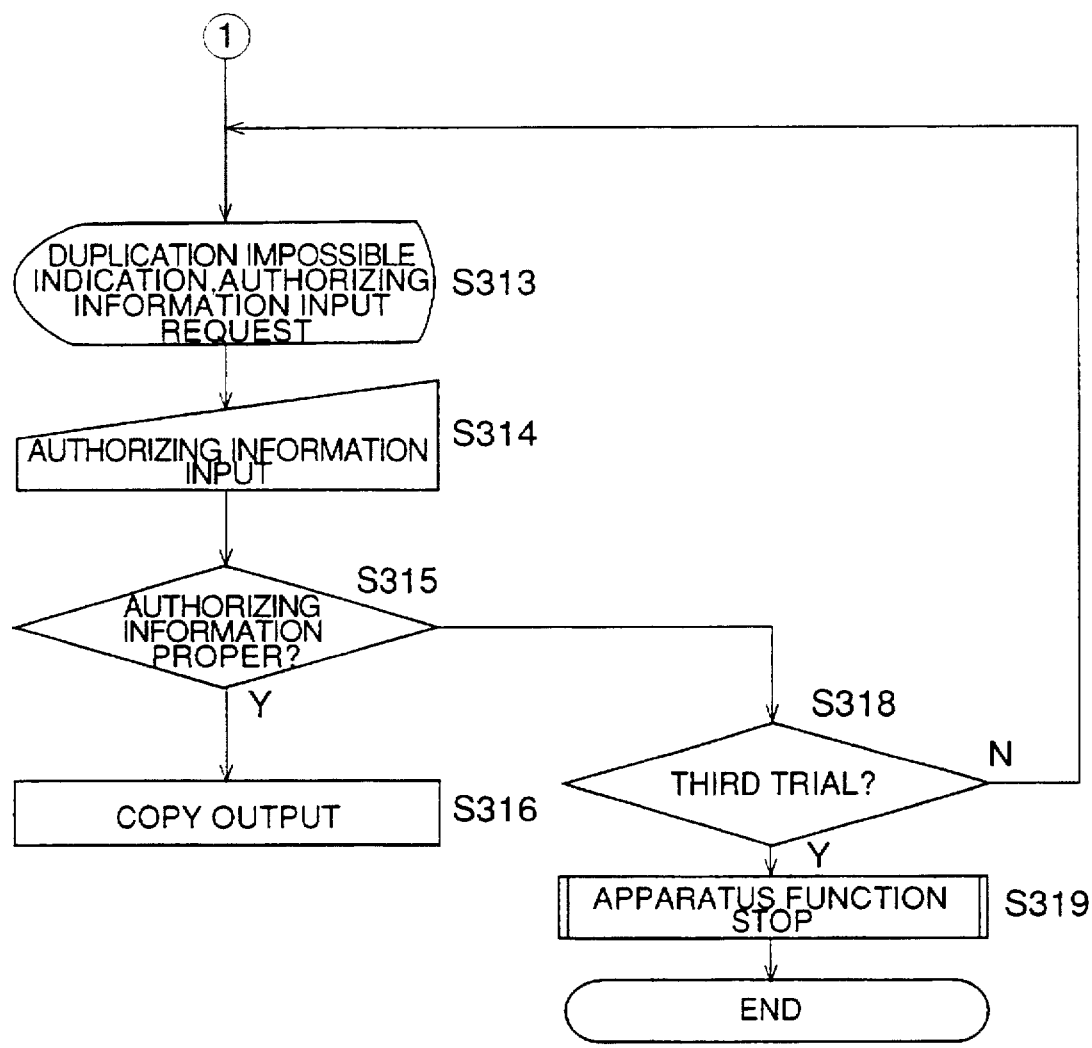

After S303 detects the authorizing figure FZ, S313 shown in FIG. 41 displays contents, through display unit 208 shown in FIG. 37, that 'Duplication is impossible since the read-in image is a confidential document,' and also that 'Please input authorizing-figure information.' If the present operator inputs information in response to the above displaying in S314, the thus input information is supplied to the comparing unit 215 in the control and operating unit 206. The comparing unit 215 compares, in S315, the detected authorizing-figure information with the thus input information. If the two sorts of information correspond to one another, the control and operating unit acting as the control means allows duplication of the read-in image, a copy of the image being thus output in S316. If the two sorts of information do not correspond to one another in S315, the control and operating unit 206 prevents the read-in image from being duplicated, the current process being thus terminated in S317.

The duplicator in the twenty-eighth embodiment will now be described. The duplicator necessarily includes the counting unit 215, shown in FIG. 38, in the control and operating unit 206. Excepting having steps as will be described, the duplicator is substantially identical to the duplicator in the twenty-fourth embodiment. The description common between the duplicators in the twenty-fourth and twenty-eighth embodiments will be omitted.

If S303 detects an authorizing figure FZ as a result of checking through the authorizing figure detecting and converting unit 205 as described above, the authorizing figure detecting and converting unit 205 acting as the reverse-converting means obtains authorizing-figure information which should be an original of the detected authorizing figure, as described above. After S303 detects the authorizing figure FZ, S313 shown in FIG. 42 displays contents, through display unit 208 shown in FIG. 37, that 'Duplication is impossible since the read-in image is a confidential document.' and also that 'Please input authorizing-figure information.' If the present operator inputs information in response to the above displaying in S314, the comparing unit 215 compares, in S315, the above-obtained authorizing-figure information with the thus input information as described above. If the two sorts of information correspond to one another, the control and operating unit acting as the control means allows duplication of the read-in image, a copy of the image being thus output in S316. If the two sorts of information do not correspond to one another in S315, the control and operating unit 206 prevents the read-in image from being duplicated and simultaneously the counting unit 215 in the control and operating unit 206 first counts the time the two sorts of information do not correspond. The control and operating unit 206 then checks in S318 whether or not the counted number reaches three. Since the current counted number is one, S313 is then carried out as described above.

If an operator again inputs information in S314 in response to the authorizing-figure information inputting request in S313, the above authorizing-figure information checking step S315 is performed on the thus input information as described above. It may be that the counting unit 215 has counted three times the two sorts of information do not correspond, that is, information, not corresponding to the authorizing-figure information obtained from the detected authorizing figure, is input three times. If so, S318 detects the three times and thus S319 causes the functions of the duplicator to be stopped or shuts the duplicator down. Generally speaking, it is expected that an even authorized person may input erroneous authorizing information by mistake. However, it cannot be expected that such a mistake is repeated three times. Rather, it can be expected that such a repeated improper information inputting fact means that a person attempts to duplicate an effectively confidential copy having an authorizing figure formed therein through trial and error, the person not knowing authorizing-figure information relevant to the authorizing figure. Thus, the duplicator stops its functions of duplicating in the case as described above.

The duplicator in the twenty-ninth embodiment will now be described. The duplicator in the twenty-ninth embodiment has a construction identical to that of the above-described duplicator in the twenty-eighth embodiment. However, in addition to the identical construction, the duplicator in the twenty-ninth embodiment has functions of storing information when the duplicator stops its functions of duplication due to a repeated improper information inputting fact such as described above. The information to be stored is information specifying the relevant read-in image, the improper information having been input as the authorizing-figure information and the date of occurrence of the above fact (which can be determined using the internal clock 216 shown in FIG. 38. The storage may be made using the non-volatile RAM 212 shown in FIG. 38. Excepting having such functions, the duplicator is substantially identical to the duplicator in the twenty-fourth embodiment. The description common between the duplicators in the twenty-fourth and twenty-ninth embodiments will be omitted.

The thus stored information is effective information in search for the person who has attempted to duplicate the effectively confidential copy without knowing the proper authorizing-figure information. Such a person may be a person who does not know such functions of the duplicator as that different authorizing-figure information is required to duplicate an effectively confidential copy having a different authorizing figure. That is, the person may erroneously understand that an authorizing-figure information which the person once used can be used for any effectively confidential copies. If so, it is necessary to correct such erroneous understanding by explaining the correct functions of the duplicator as a result of retrieving the person's name. However, there may be various cases causing such repeated improper information inputting fact. Thus, it is preferable that the thus stored information will be used for reference only.

Further, the above function stoppage state or shutdown state of the duplicator due to such a repeated improper information inputting, is a serviceman calling state. The serviceman calling state is a state in which the duplicator cannot be retuned to the normal usable state unless a predetermined serviceman properly handles the duplicator. It may be a case where the duplicator has functions through which a user can use the duplicator as the user loads some sort of identification card. In such a case, since such an identification card contains information specifying the particular user, the duplicator preferably stores, in the non-volatile RAM 212 together with the above mentioned information, the information for specifying the particular user when the duplicator's functions are stopped due to a repeated improper information inputting fact. Thus, the serviceman can get such information and give it to a manager of the duplicator.

The duplicator in the thirtieth embodiment will now be described. Excepting having functions as will be described, the duplicator is substantially identical to the duplicator in the twenty-fourth embodiment. The description common between the duplicators in the twenty-fourth and thirtieth embodiments will be omitted.

There may be a case where an effectively confidential copy, such as the copy c1 shown in 36B described above, is duplicated in the duplicator in a confidential document duplication mode such as described above. In order to prevent the relevant secret from leaking, such a duplicating operation should be properly managed. In such a case, the duplicator carries out a process such as that shown in S301, S302, S303, shown in FIG. 39, S313, S314, S315 and S316 or S317, shown in FIG. 41, appropriately, as described above with reference to FIGS. 39 and 41.

Through the process, an authorizing figure, such as the figure FZ, detected in the read-in original image, such as the copy c1, is reverse-converted into an authorizing-figure information appropriately and also information input in S314 as authorizing-figure information is converted into an authorizing-figure signal. Such reverse-converting/converting operations are carried out since the duplicator is in the confidential document duplication mode.

However, since such a effectively confidential copy already has an authorizing figure as described above, it is not necessary to form another authorizing figure to the copy. In order to prevent such doubly authorizing figure addition, control means such as that described above cancels output of converting means such as that described above in the duplicator in the thirtieth embodiment.

It is also possible in the duplicator that even in such a case of further duplication of an effectively confidential copy, a confidential document management sheet such as that described above is output. If the management sheet is output in the case, the management sheet contains information only regarding the currently carried out duplication/replication operation. Thus, the information to be contained in the management sheet is information input in the current operation.

However, it is also possible that such a management sheet contains information regarding not only a current operation but also a previous operation regarding a common original confidential document. Thus, a first management sheet is produced regarding the previous operation and a second management sheet is produced for both the previous operation and current operation. The second management sheet will be referred to as a revised management sheet. Such a way of management sheet formation is possible in a case where a plurality of image forming apparatuses are interconnected via a network such as a LAN and the apparatuses are managed by a computer. For an example of such a way of management sheet formation, an original confidential document is replicated so that n (n=5 in the FIG. 36B example) effectively confidential copies are produced in a first operation through the duplicator. Then, either one of the n effectively confidential copies is replicated or the original confidential document is replicated so that further m copies, also referred to as effectively confidential copies even for the copies replicated from the effectively confidential copy, are produced. In such a case, a revised management sheet such as that described above contains information regarding the n copies produced in the first operation and information regarding the m copies produced in the second operation. In the revised management sheet, numbering (of secret number MN such as that described above) of the m copies can be made so that the numbers of the m copies start from n+1. Thus, it can be possible to prevent effectively confidential copies originally produced from a common original confidential document from having same a secret number MN.

The features of the duplicator in the twenty-fifth embodiment regarding formation of authorizing figures such as those described above as will now be described later with reference to FIGS. 43, 44A through 44J, 45A through 45J, 46A through 46J, 47A through 47J and 48A through 48H.

The duplicator forms an authorizing figure based on authorizing-figure information input through authorizing-figure information inputting means such as that described above. In the embodiment, such authorizing-figure information consists of a combination of four-digits numerals available between '0000' and '9999', total ten-thousand combinations. Such a very large number of combinations prevents a person not knowing a proper number of such authorizing-figure information from obtaining, by accident through trial and error, the proper number easily.

Figure 43:
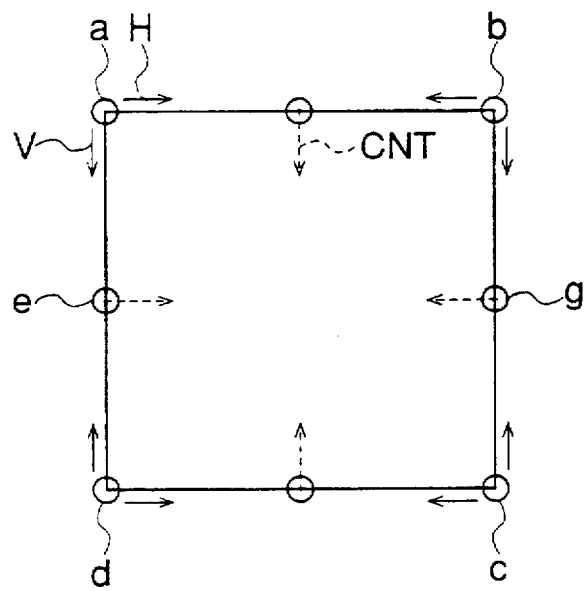

With reference to FIG. 43, an outline shape of such an authorizing figure used in the duplicator in the twenty-fifth embodiment will now be described. The outline shape is determined using 8 points a, b, c, d, e, f, g and h as shown in the figure. The basic outline shape is a rectangle shown in the figure. The 4 points a, b, c and d correspond to the 4 vertexes of the rectangle and each of the remaining 4 points e, f, g and h correspond to the middle point of the respective one of the 4 sides of the rectangle.

In formation of a final authorizing figure, the four vertex points a, b, c and d may move either vertically or horizontally as indicated by solid-line arrows shown in FIG. 43. The vertical movement (along each of the vertical sides, in the figure, of the rectangle) will be referred to as the symbol V and the horizontal movement (along each of the horizontal sides, in the figure, of the rectangle) will be referred to as the symbol H. Further, the top two points a and b may move in V only downward by the distance, ¼ of the length of each of the vertical sides of the rectangle. The bottom two points c and d may move in V only upward by the distance, ¼ of the length of each of the vertical sides of the rectangle. The left two points a and d may move in H only rightward by the distance, ¼ of the length of each of the horizontal sides of the rectangle. The right two points b and c may move in H only leftward by the distance, ¼ of the length of each of the horizontal sides of the rectangle.

Each of the four side middle points e, f, g and h may move only in a direction (indicated by broken-line arrows) toward the center of the rectangle by the distance, ¼ of the length of each side of the rectangle. Each of such centerward movements will be referred to as CNT.

Lifting-figure information is referred to by 'ABCD', each of the symbol A, B, C and D referring to a digit among 0 through 9.

The first symbol A determines V of the vertex points a, b, c and d in a manner which may be previously determined arbitrarily. For example such a manner, a manner as shown in the following list is assumed:

| A | 1 | 2 | 3 | 4 | 5 | 6 | 7 | 8 | 9 | 0 |
|---|---|---|---|---|---|---|---|---|---|---|
| a | 0 | V | 0 | V | V | 0 | V | V | V | V |
| b | 0 | 0 | V | V | 0 | V | V | V | V | 0 |
| c | 0 | 0 | 0 | 0 | V | 0 | 0 | V | V | 0 |
| d | 0 | 0 | 0 | 0 | 0 | V | V | 0 | V | V |

In the above list, the top line indicates the available digits for the symbol A. The second, third, fourth and bottom lines indicate relevant responding movement of the vertex points a, b, c and d, the symbol 0 referring to no movement and the symbol V referring to the vertical movement in the above-described manner. FIGS. 44A, 44B, 44C, 44D, 44E, 44F, 44G, 44H, 44I and 44J show the outline shapes of the authorizing figures resulting from shifting the vertexes a, b, c, and d of the rectangle shown in FIG. 43 according to the above list when the first digit A of authorizing-figure information is 1, 2, 3, 4, 5, 6, 7, 8, 9, and 0. In FIGS. 44A through 44J, the side middle points e, f, g, and h are fixed and each of the outline shapes is formed as a result of forming straight lines between adjacent points sequentially in the order of the thus determined 8 points a, b, c, d, e, f, g, and h. The arrows shown in FIGS. 44A through 44J indicate the V movement. For example of the formation of the outline shapes, if A=9, each of the points a, b, c, and d moves in V by ¼ the rectangle side length, the points a and b moving downward and the points c and d moving upward. As a result the resulting outline shape is a hexagon as shown in FIG. 44I.

Similarly, the second digit B of authorizing-figure information determines the H movement of the above vertex points a, b, c and d in a manner which may be previously determined arbitrarily. For example such a manner, a manner as shown in the following list is assumed:

| B | 1 | 2 | 3 | 4 | 5 | 6 | 7 | 8 | 9 | 0 |
|---|---|---|---|---|---|---|---|---|---|---|
| a | 0 | H | 0 | H | H | 0 | H | H | H | H |
| b | 0 | 0 | H | H | 0 | H | H | H | H | 0 |
| c | 0 | 0 | 0 | 0 | H | 0 | 0 | H | H | 0 |
| d | 0 | 0 | 0 | 0 | 0 | H | H | 0 | H | H |

In the above list, the top line indicates the available digits for the symbol B. The second, third, fourth and bottom lines indicate relevant responding movement of the vertex points a, b, c and d, the symbol 0 referring to no movement and the symbol H referring to the horizontal movement in the above-described manner. FIGS. 45A, 45B, 45C, 45D, 45E, 45F, 45G, 45H, 45I and 45J show the outline shapes of the authorizing figures resulting from shifting the vertexes a, b, c and d of the rectangle shown in FIG. 43 according to the above list when the second digit B of authorizing-figure information is 1, 2, 3, 4, 5, 6, 7, 8, 9 and 0. In FIGS. 45A through 45J, the side middle points e, f, g and h are fixed and each of the outline shapes is formed as a result of forming straight lines between adjacent points sequentially in the order of the thus determined 8 points a, b, c, d, e, f, g and h. The arrows shown in FIGS. 45A through 45J indicate the H movement. For example of the formation of the outline shapes, if B=9, each of the points a, b, c and d moves in H by ¼ the rectangle side length, the points a and d moving rightward and the points b and c moving leftward. As a result the resulting outline shape is a hexagon as shown in FIG. 45I.

Such vertical movement and horizontal movement of each the points a, b, c and d determined by the first two digits A and B is, as a result, added to one another in the vector addition manner.

The last symbol D determines the above-described CNT movement of the side middle points e, f, g and h in a manner which may be previously determined arbitrarily. For example such a manner, a manner as shown in the following list is assumed:

| CNT | 1 | 2 | 3 | 4 | 5 | 6 | 7 | 8 | 9 | 0 |
|---|---|---|---|---|---|---|---|---|---|---|
| e | 0 | T | 0 | T | 0 | T | T | T | T | 0 |
| f | 0 | 0 | T | 0 | T | T | 0 | T | T | 0 |
| g | 0 | 0 | 0 | T | 0 | T | T | T | 0 | T |
| h | 0 | 0 | 0 | 0 | T | 0 | T | T | 0 | T |

In the above list, the top line indicates the available digits for the symbol D. The second, third, fourth and bottom lines indicate relevant responding movement of the side middle points e, f, g and h, the symbol 0 referring to no movement and the symbol T referring to the CNT movement in the above-described manner. FIGS. 47A, 47B, 47C, 47D, 47E, 47F, 47G, 47H, 47I and 47J show the outline shapes of the authorizing figures resulting from shifting the side middle points e, f, g and h of the rectangle shown in FIG. 43 according to the above list when the last digit D of authorizing-figure information is 1, 2, 3, 4, 5, 6, 7, 8, 9 and 0. In FIGS. 47A through 47J, the vertex points a, b, c and d are fixed and each of the outline shapes is formed as a result of forming straight lines between adjacent points sequentially in the order of the thus determined 8 points a, b, c, d, e, f, g and h. The arrows shown in FIGS. 47A through 47J indicate the V movement. For example of the formation of the outline shapes, if D=8, each of the points e, f, g and h moves in CNT by ¼ the rectangle side length. As a result the resulting outline shape is a hexagon as shown in FIG. 47H.

The third digit C of authorizing-figure information determines a shape of an internal figure to be formed inside an outline shape determined as described above using the three digits A, B and D. The digit C also determines presence of such an internal figure. Thus, the final authorizing figure consisting of the outline shape and internal figure, if it is determined present, is determined. Such an internal figure is determined in conjunction with five fixed points k, l, m, n and o such as those shown in FIGS. 46A through 46J. As shown in FIGS. 46A through 46J, the points k, l, m and n are points disposed in the middle of the basic rectangle shown in FIG. 43. In each of FIGS. 46A through 46J, the basic rectangle is shown as the square enclosing the points k, l, m and n. The points k, l, m and n are disposed so that forming straight lines between adjacent points sequentially in the order of k, l, m and n forms a rhombus as shown in FIG. 46A. The point o is the center of the basic rectangle.

If C=1, for example, the internal figure is the rhombus having the vertexes k, l, m and n as shown in FIG. 46A. If C=2, the internal figure is a triangle having the vertexes k, n and l. If C=3, the internal figure is a triangle having the vertexes l, m and n. If C=9, the internal figure is a circle passing through the points k, l, m, and n. If C=0, no internal figure is present.

With reference to FIGS. 48A through 48H, examples of authorizing figures determined by the above four digits A, B, C and D in the above-described manner will now be described. In each of the examples, the space present between the outline shape and the internal figure is painted by halftone dots indicated by ordinary dots in the figures. The authorizing figures shown in FIGS. 48A, 48B, 48C, 48D, 48E, 48F, 48G and 48H are determined by the authorizing-figure information [1234], [2345], [3456], [4567], [5678], [2222], [9999] and [0000]. If the authorizing-figure information is [2222], for example, all the 8 points are fixed excepting that the point a moves in V and also in H and the point f moves in CNT as shown in FIG. 48F. Further, the internal figure is the triangle shown in FIG. 46B. Thus, the resulting authorizing figure is that shown in FIG. 48F.

It is preferable that such an authorizing figure has dimensions such as those several cm×several cm, that is, 5 through 6 cm×5 through 6 cm, for example. Further, it is preferable that such 4 through 16 authorizing figures are scattered in a page of an effectively confidential copy.

Further, detecting of such an authorizing figure to be carried out in the several embodiments described above may be carried out as follows. Reading only several features of such an authorizing figure is sufficient. Examples of such several features include a closed loop figure feature in which a figure is enclosed by an external frame, an internal figure and an outline shape feature, a space inside an object figure is painted by halftone dots feature, a plurality of figures feature, each consisting of an internal figure and an outline shape, or the like. Appropriate combination of such features may improve detection accuracy. Thus, it is possible to distinguish such an authorizing figure from general figures which may have been present in an original document/image before such an authorizing figure is added.

Figure 49:
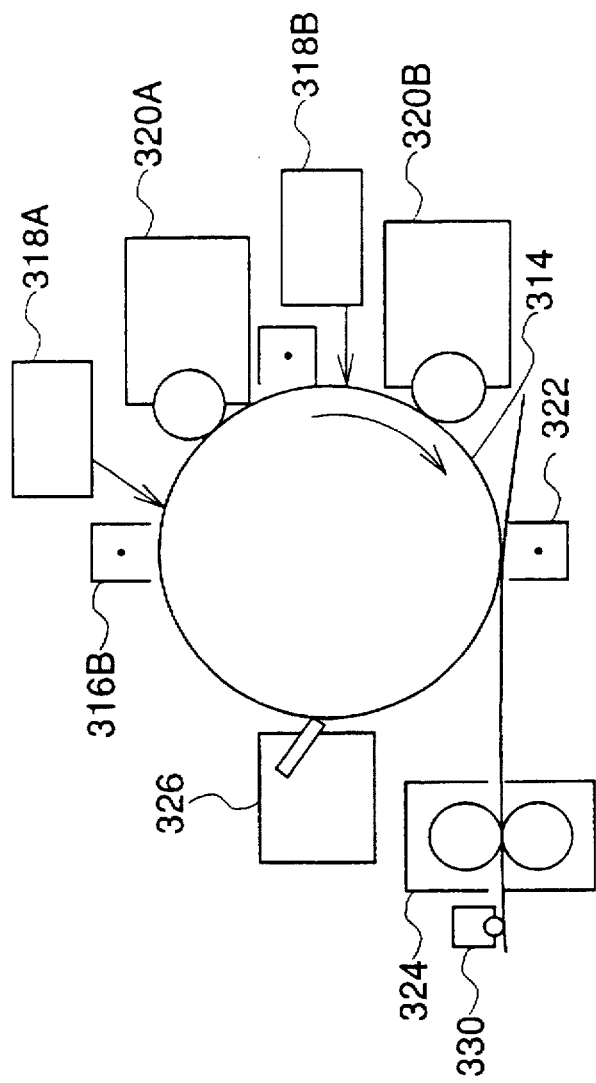
FIG. 49 shows a general construction of a duplicator in a thirty-first embodiment of an image forming apparatus according to the present invention.

With reference to FIG. 49, a duplicator in a thirty-first embodiment of an image forming apparatus according to the present invention will now be described. The duplicator in the thirty-first embodiment is an embodiment including a method of adding a secret mark such as that described above to an effectively confidential copy such as that described above. Thus, it is possible to combine the duplicator in the thirty-first embodiment with another duplicator having been described and having a function of adding such a secret mark on an effectively confidential copy so that the other duplicator carries out the function through the above method used in the duplicator in the thirty-first embodiment.

A drum-shaped photosensitive body 314, a charger 316, transferring means 322, a fixing device 324 and a cleaning device 326 shown in FIG. 49 have functions substantially identical to those of the components 114, 116, 122, 124 and 126 shown in FIG. 27A. Further, the duplicator in the thirty-first embodiment includes double optical writing devices 318A and 318B instead of the optical writing device 118 shown in FIG. 27A. The duplicator in the thirty-first embodiment includes double developing devices 320A and 320B instead of the developing device 120 shown in FIG. 27A. However, the optical writing devices 118, 318A and 318B have basically the same functions and the developing devices 120, 320A and 320B have basically the same functions. Thus, only functions particular to the duplicator in the thirty-first embodiment will be described and the description of the common basic printing functions made with reference to FIG. 27A will be omitted.

The duplicator has two modes of adding the secret mark and an operator can select one mode thereof arbitrarily through appropriate specification keys provided in an operation unit such as that 12 show in FIGS. 2 and 3 provided on the duplicator in the thirty-first embodiment. Operation of the duplicator performed if the operator selects a first mode will now be described, the operation described being a part relevant to the secret-mark adding function.

The above devices 318A and 320A are devices for printing an image, including an image identical to a respective read-in image, to be printed black. For this purpose, the relevant image signal is supplied to the optical writing device 318A so that the relevant electrostatic latent image is formed on the photosensitive body 314. The developing device 320A has ordinary black toner being used to form the toner image on the photosensitive body 314 corresponding to the latent image.

On the other hand, the above devices 318B and 320B are devices for printing an image of such a secret mark to be printed yellow or infrared. For this purpose, the relevant image signal is supplied to the optical writing device 318B so that the relevant electrostatic latent image is formed on the photosensitive body 314. The developing device 320A has special yellow or infrared toner being used to form the toner image on the photosensitive body 314 corresponding to the latent image.

The photosensitive body 314 is rotated similar to that 114 show in FIG. 27A. Thus, as the photosensitive body 314 rotates, the latent image of the image including the read-in image is formed through the first optical writing device 318A, then the first developing device 320A develops the latent image with the black toner, then the second optical writing device 318B forms the latent image of the secret mark at a predetermined position of the thus formed black-toner image, and then the second developing device 320B develops the latent image of the secret mark using the special toner. Thus, the toner image consisting of the black toner image including read-in image and the special-toner secret-mark image are formed on the photosensitive body 314. The double-toner image is then transferred to a recording sheet through the transfer means 322 and then fixed through the fixing device 324. In this case where the first mode has been selected, a stamper 330 is not used and the recording sheet with the formed image is ejected from the duplicator.

In a case where the second mode has been selected, the above second optical writing device 318B and developing device 320B do not function and the latent image is formed on the photosensitive body 314 through the above first optical writing device 318A and developing device 320A. As a result, the image including the read-in image is formed on a recording sheet. Then, the stamper 330 stamps a predetermined secret mark at a predetermined position of the recording sheet.

Further, it is possible to use a developing method using double optical writing devices such as 318A and 318B and double developing devices such as 320A and 320B in embodying the first developing step S113 shown in FIG. 32 or S123 shown in FIG. 33 and the second developing step S114 shown in FIG. 32 or S124 shown in FIG. 33 in the duplicator in the twenty-second embodiment.

Further, the present invention is not limited to the above described embodiments, and variations and modifications may be made without departing from the scope of the present invention.

What is claimed is:

1. An image forming apparatus for duplicating an image, comprising:
   mode selecting means for selecting a confidential document duplicating mode;
   secrecy notice mark adding means for adding a secrecy notice mark in a read-in image in said confidential document duplicating mode;
   secrecy notice mark detecting means for checking whether said secrecy notice mark is present in a read-in image;
   control means for preventing a read-in image from being duplicated and from being stored in memory if said secrecy notice mark detecting means has detected said secrecy notice mark; and
   authorizing information inputting means for inputting authorizing information from outside, which information lifts the prevention of said read-in image from being duplicated, said prevention having come into effect by said control means,
   wherein said secrecy notice mark adding means adds said authorizing information to said read-in image.

2. The image forming apparatus according to claim 1, wherein:
   said control means checks whether or not the authorizing information input through said authorizing information inputting means is the valid information; and
   said control means lifts the prevention, of said read-in image from being duplicated, effected by said control means, if it has been checked that the authorizing information input through said authorizing information inputting means is the valid information.

3. The image forming apparatus according to claim 2, wherein the duplicating operation, the prevention of which has been lifted by said control means is a repeat prevented duplication operation in which the duplication of said read-in image is prevented from being repeated.

4. The image forming apparatus according to claim 1, wherein said secrecy notice mark adding means further adds a serial number to said read-in image when said read-in image is duplicated as a result of the lifting of the prevention by said controlling means, said serial number corresponding to a duplication repetition order in which said read-in image is duplicated.

5. The image forming apparatus according to claim 1, wherein the authorizing information is added by said secrecy notice mark adding means to said read-in image so that the thus added authorizing information is converted into a form in which said added authorizing information cannot be read by a simple view.

6. The image forming apparatus according to claim 1, further comprising management information outputting means for outputting management information if duplicating is carried out in said confidential document duplication mode, said management information comprising part of the data representing a read-in image and serial numbers corresponding to a duplication-repetition number.

7. An image forming apparatus, having a function of image duplication, comprising:
   mode selecting means for selecting a confidential document duplicating mode;
   secrecy notice mark adding means for adding a secrecy notice mark in a read-in image in said confidential document duplicating mode;
   secrecy notice mark detecting means for checking whether said secrecy notice mark is present in a read-in image; and
   control means for preventing a read-in image from being duplicated if said secrecy notice mark detecting means has detected said secrecy notice mark,
   wherein said secrecy notice mark adding means deletes the secrecy notice mark present in said read-in image and adds a serial number and authorizing information after said control means lifts the prevention of said read-in image duplication, due to said authorizing information input.

8. The image forming apparatus according to claim 7, wherein a second secrecy notice mark consisting of said serial number and said authorizing information is different from the first secrecy notice mark such that said control means prevents a read-in image from being duplicated if said second secrecy notice mark has been detected, the duplication prevention being effected even if the authorizing information has been input.

9. An image forming apparatus for duplicating an image, comprising:
   confidential document duplication mode selecting means for selecting a confidential document duplication mode;
   inputting means for inputting prevent/authorize figure information said prevent/authorize figure information representing a prevent/authorize figure;
   converting means for converting said prevent/authorize figure information into a prevent/authorize figure signal;

printing means for, in said confidential document duplication mode, adding the data representing a read-in image and the prevent/authorize figure represented by the prevent/authorize figure signal; and wherein:

the prevent/authorize figure prevents the printed image including said prevent/authorize figure from being further duplicated and from being stored in memory; and the prevent/authorize figure information lifts the prevention of further duplication in response to valid authorizing information.

10. An image forming apparatus, having a function of image duplicating, comprising:

confidential document duplication mode selecting means for selecting a confidential document duplication mode;

inputting means for inputting prevent/authorize figure information, said prevent/authorize figure information representing a prevent/authorize figure;

converting means for converting said prevent/authorize figure information into a prevent/authorize figure signal;

printing means for, in said confidential document duplication mode, adding the data representing a read-in image and said prevent/authorize figure represented by the signal resulting from the addition; and wherein:

the prevent/authorize figure has a function of preventing the printed image including said prevent/authorize figure from being further duplicated;

the prevent/authorize figure comprises a polygon which may contain another internal figure therein, said polygon being formed from a rectangle; and the prevent/authorize figure information comprises four codes, a first code indicating a manner in which the four vertexes of said rectangle move horizontally to form said polygon, a second code indicating a manner in which the four vertexes of said rectangle move vertically to form said polygon, a third code indicating a manner in which four mid points, each being the mid point of a respective one the four edges of said rectangle, moves to form said polygon, a fourth code indicating presence/non-presence of said internal figure and a shape of said internal figure.

11. An image forming apparatus for duplicating an image, comprising:

prevent/authorize figure detecting means for detecting a prevent/authorize figure present in a read-in image; and control means for preventing the read-in image from being duplicated and from being stored in memory whenever the read-in image has been detected to include the prevent/authorize figure; and wherein prevent/authorize figure information representing the prevent/authorize figure lifts the duplication prevention in response to valid authorizing information.

12. An image forming apparatus for duplicating an image, comprising:

prevent/authorize figure detecting means for detecting a prevent/authorize figure present in a read-in image;

inverse converting means for converting the prevent/authorize figure into prevent/authorize information representing said prevent/authorize figure, if it has been detected;

authorizing information inputting means for inputting authorizing information; and determining means for determining whether or not the input authorizing information corresponds to said prevent/authorize figure information; and control means for preventing said read-in image from being duplicated and from being stored in memory if said determining means has determined that said authorizing information does not correspond to said prevent/authorize figure information, and allowing said read-in image to be duplicated if said determining means has determined that said authorizing information corresponds to said prevent/authorize figure information.

13. The image forming apparatus according to claim 12, further comprising counting means for counting the times the authorizing information has been repeatedly input; and wherein said control means stops the duplication function of said image forming apparatus if the number counted by said counting means has reached a predetermined number.

14. The image forming apparatus according to claim 13, further comprising storing means for storing information indicating said read-in image, said authorizing information and a current date, when said control means stops the duplication of said image forming apparatus.

15. An image forming apparatus for duplicating an image, comprising:

confidential document duplication mode selecting means for selecting a confidential document duplication mode;

inputting means for inputting prevent/authorize figure information, said prevent/authorize figure information representing a prevent/authorize figure;

converting means for converting said prevent/authorize information into a prevent/authorize figure signal;

printing means for, in said confidential document duplication mode, adding the data representing a read-in image and the prevent/authorize figure signal, and printing the read-in image having said prevent/authorize figure resulting from the addition;

prevent/authorize figure detecting means for detecting a prevent/authorize figure, such as the prevent/authorize figure represented by said prevent/authorize figure information present in a read-in image;

inverse converting means for converting said prevent/authorize figure, which has been detected, into the prevent/authorize information representing said prevent/authorize figure;

determining means for determining whether or not authorizing information, which may be input through said prevent/authorize figure information inputting means, corresponds to said prevent/authorize figure information representing the prevent/authorize figure information detected in said read-in image; and control means for preventing said read-in image from being duplicated and from being stored in memory if said determining means has determined that said authorizing information does not correspond to said prevent/authorize figure information, and allowing said read-in image to be duplicated if said determining means has determined that said authorizing information corresponds to said prevent/authorize figure information, said control means preventing the output of said converting means from being printed together with said read-in image if said control means thus allows the duplication of said read-in image.

* * * * *